US012222478B2

(12) United States Patent
Yamashita et al.

(10) Patent No.: US 12,222,478 B2
(45) Date of Patent: Feb. 11, 2025

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventors: Masashi Yamashita, Tokyo (JP); Tomoki Ito, Kawasaki (JP); Tomonori Kuribayashi, Yokohama (JP); Keigo Koida, Kawasaki (JP); Satoshi Miwa, Yokohama (JP); Yoko Komatsubara, Yokohama (JP); Katsuya Watanabe, Yokohama (JP); Azuna Nonaka, Yokohama (JP); Ayumu Makida, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 17/636,862

(22) PCT Filed: Aug. 26, 2020

(86) PCT No.: PCT/JP2020/032107
§ 371 (c)(1),
(2) Date: Feb. 19, 2022

(87) PCT Pub. No.: WO2021/039815
PCT Pub. Date: Mar. 4, 2021

(65) Prior Publication Data
US 2022/0269055 A1     Aug. 25, 2022

(30) Foreign Application Priority Data
Aug. 30, 2019   (JP) .............................. JP2019-157742

(51) Int. Cl.
*G02B 15/14*      (2006.01)
*G02B 13/00*      (2006.01)

(52) U.S. Cl.
CPC ... *G02B 15/145121* (2019.08); *G02B 13/006* (2013.01)

(58) Field of Classification Search
CPC   G02B 9/64; G02B 13/006; G02B 15/145113; G02B 15/145121; G02B 15/145523; G02B 15/1461
See application file for complete search history.

(56) References Cited

U.S. PATENT DOCUMENTS

| 7,079,328 B2 | 7/2006 | Kuba |
| 8,114,796 B2 | 2/2012 | Ritter et al. |

(Continued)

FOREIGN PATENT DOCUMENTS

| CN | 108689599 A | 10/2018 |
| JP | 61-40839 A | 2/1986 |

(Continued)

OTHER PUBLICATIONS

International Preliminary Report on Patentability from International Patent Application No. PCT/JP2020/032107, Mar. 10, 2022.

(Continued)

*Primary Examiner* — Jack Dinh
(74) *Attorney, Agent, or Firm* — Potomac Law Group, PLLC

(57) ABSTRACT

An optical system (LS) has a lens (L11) that satisfies the following conditional expressions.

$-0.010 < ndLZ - (2.015 - 0.0068 \times vdLZ)$ $50.00 < vdLZ < 65.00 \quad 0.545 < \theta gFLZ$ $-0.010 < \theta gFLZ - (0.6418 - 0.00168 \times vdLZ)$ (Continued)

where ndLZ is the refractive index to the d line of the lens, vdLZ is the Abbe number with respect to the d line of the lens, and θgFLZ is the partial dispersion ratio of the lens.

15 Claims, 42 Drawing Sheets

(56) References Cited

U.S. PATENT DOCUMENTS

| | | | |
|---|---|---|---|
| 9,395,520 | B2 | 7/2016 | Kawamura et al. |
| 9,417,441 | B2 | 8/2016 | Miyazaki |
| 10,437,026 | B2 | 10/2019 | Shibata et al. |
| 2004/0130647 | A1 | 7/2004 | Kuba |
| 2004/0259714 | A1 | 12/2004 | Fujiwara et al. |
| 2006/0150682 | A1 | 7/2006 | Fujiwara et al. |
| 2009/0231708 | A1 | 9/2009 | Shibata et al. |
| 2011/0194191 | A1 | 8/2011 | Shibata et al. |
| 2012/0275032 | A1 | 11/2012 | Shibata et al. |
| 2014/0085732 | A1 | 3/2014 | Shibata et al. |
| 2015/0109669 | A1 | 4/2015 | Kawamura et al. |
| 2015/0226946 | A1 | 8/2015 | Miyazaki |
| 2019/0265503 | A1 | 8/2019 | Saito |
| 2019/0265504 | A1 | 8/2019 | Saito |
| 2020/0018937 | A1 | 1/2020 | Yamada et al. |

FOREIGN PATENT DOCUMENTS

| | | |
|---|---|---|
| JP | 2004-205796 A | 7/2004 |
| JP | 2006-52119 A | 2/2006 |
| JP | 2008-143773 A | 6/2008 |
| JP | 2008-176271 A | 7/2008 |
| JP | 2015-108811 A | 6/2015 |
| JP | 2015-166851 A | 9/2015 |
| JP | 2016-155745 A | 9/2016 |
| JP | 2016-194609 A | 11/2016 |
| JP | 2016-212288 A | 12/2016 |
| JP | 2019-104670 A | 6/2019 |
| JP | 2019-204001 A | 11/2019 |
| JP | 2020-012911 A | 1/2020 |

OTHER PUBLICATIONS

Office Action issued Nov. 15, 2022, in Japanese Patent Application No. 2021-542948.
International Search Report from International Patent Application No. PCT/JP2020/032107, Nov. 24, 2020.
Office Action issued Apr. 4, 2023, in Japanese Patent Application No. 2021-542948.
Office Action issued Jan. 26, 2011, in Japanese Patent Application No. 2007-259401.
Office Action issued May 25, 2023, in Chinese Patent Application No. 202080059645.6.
Office Action issued Aug. 22, 2023, in Japanese Patent Application No. 2021-542948.
Office Action issued Dec. 17, 2024, in Japanese Patent Application No. 2023-182927.

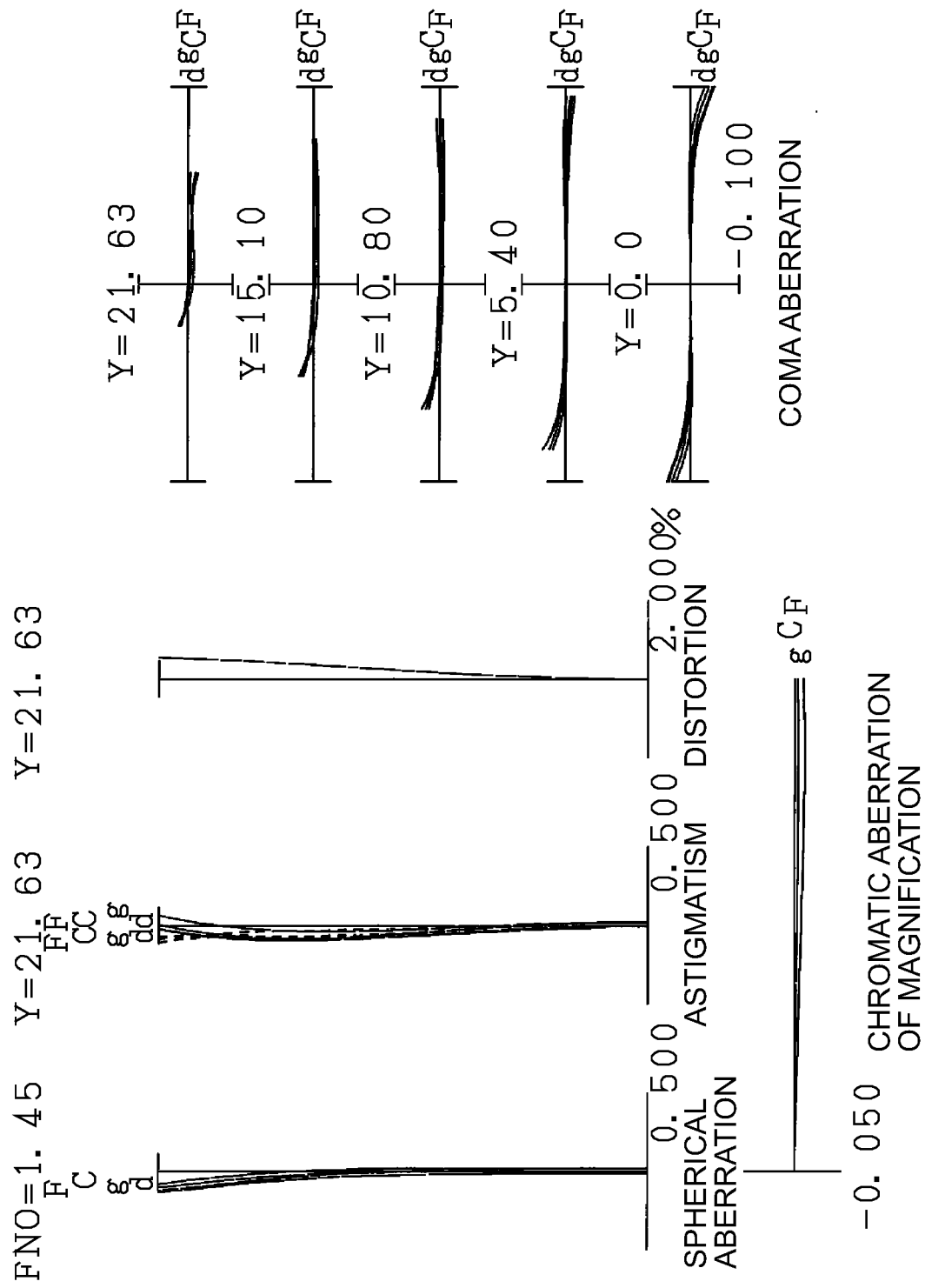

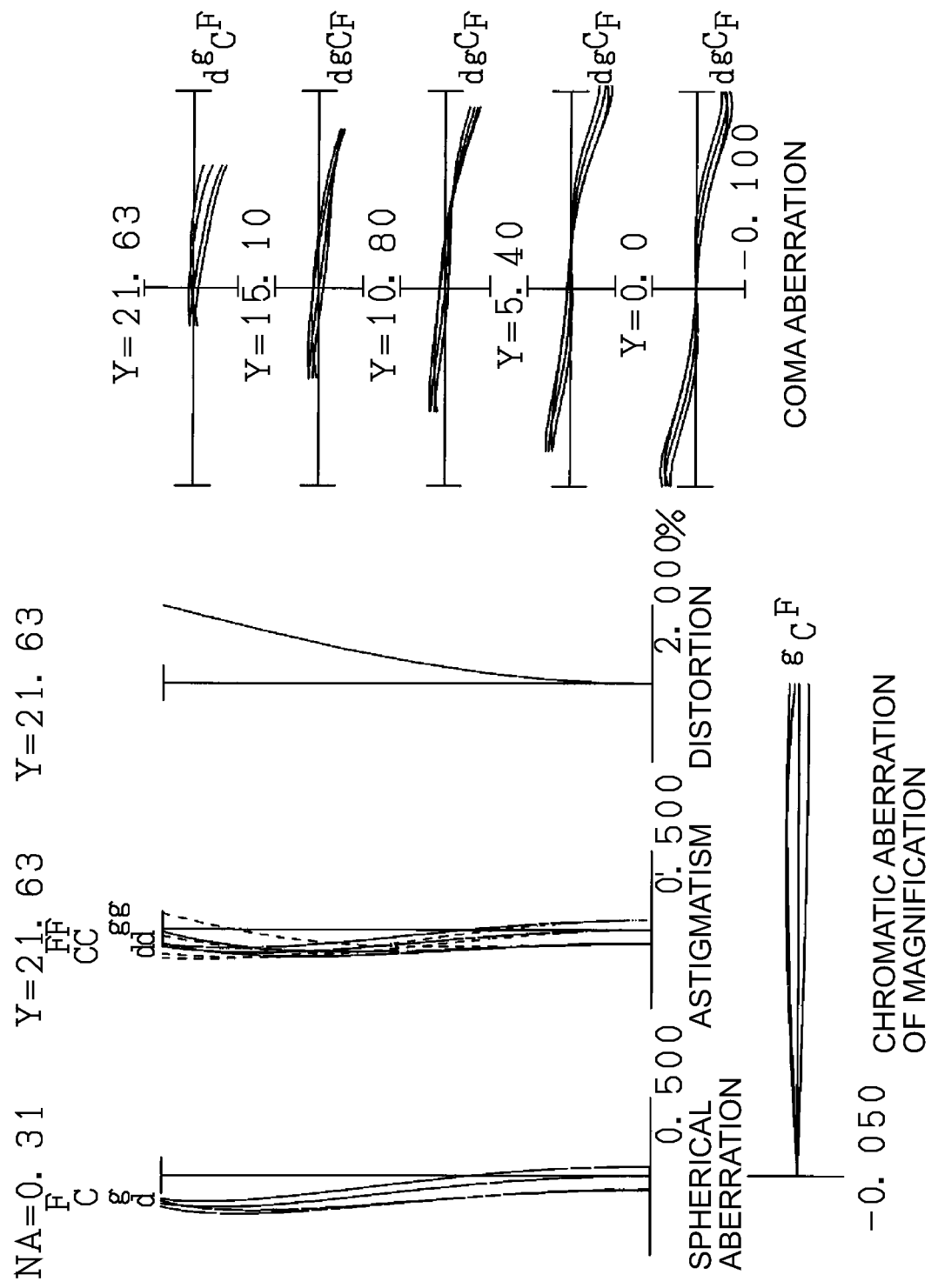

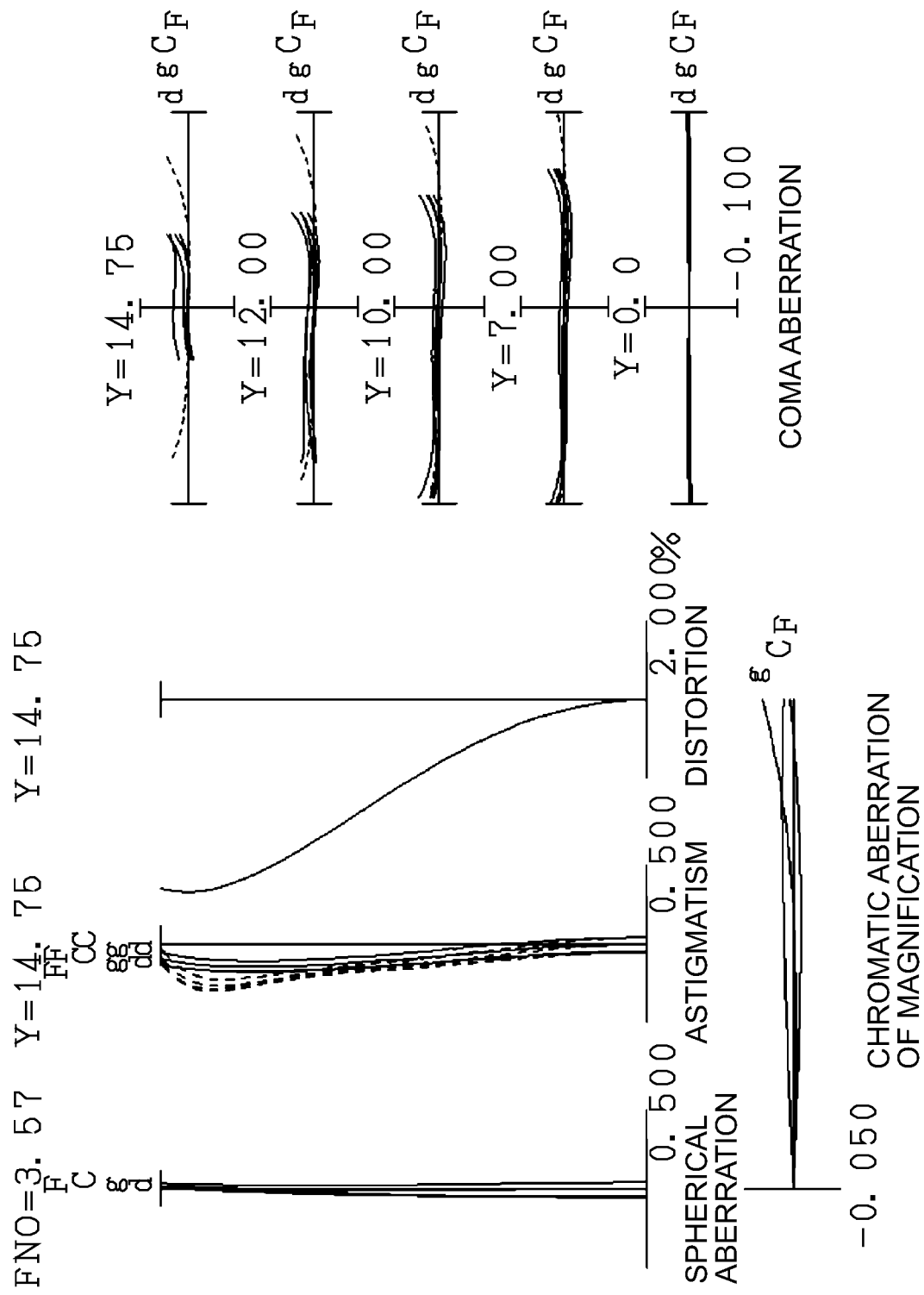

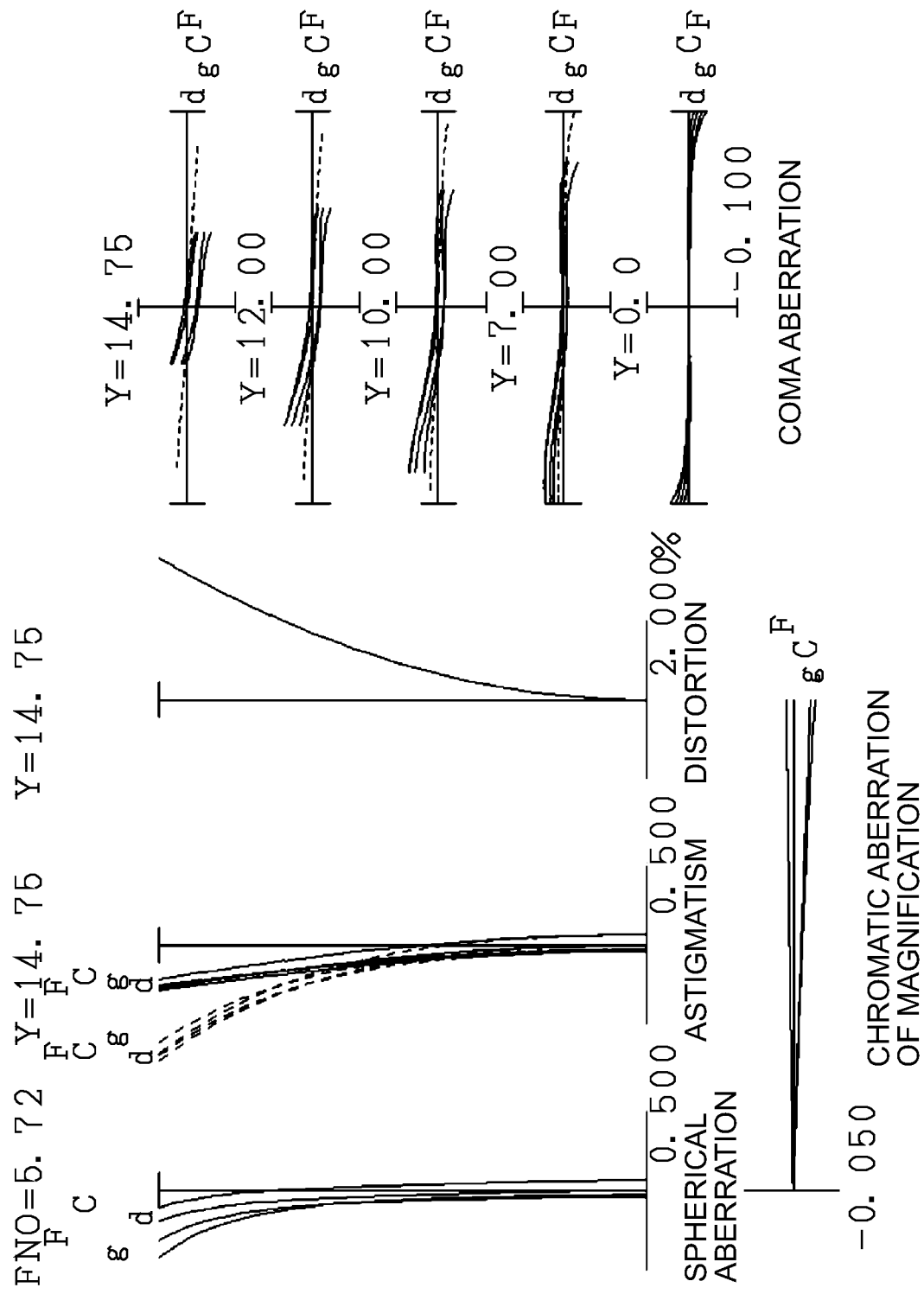

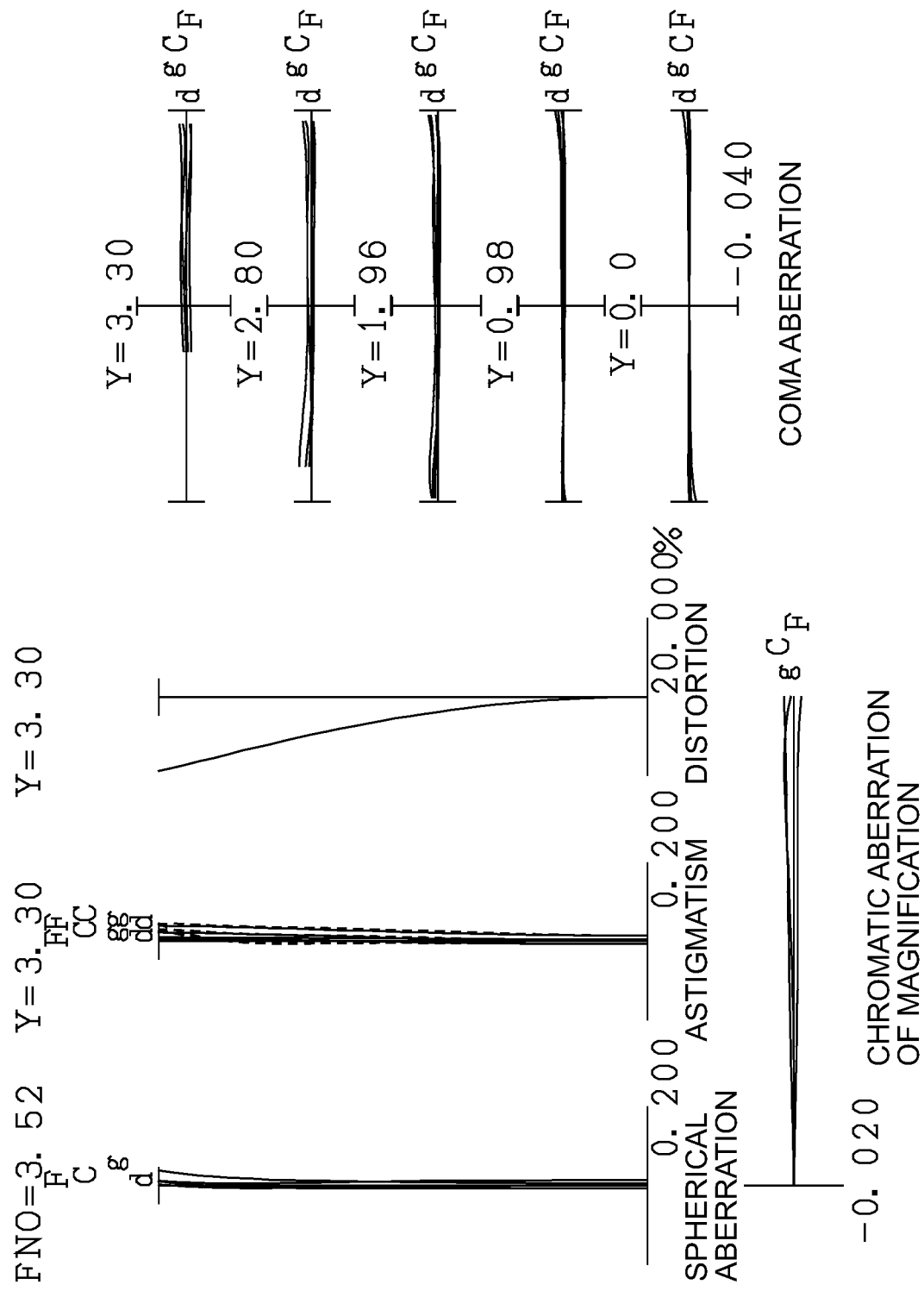

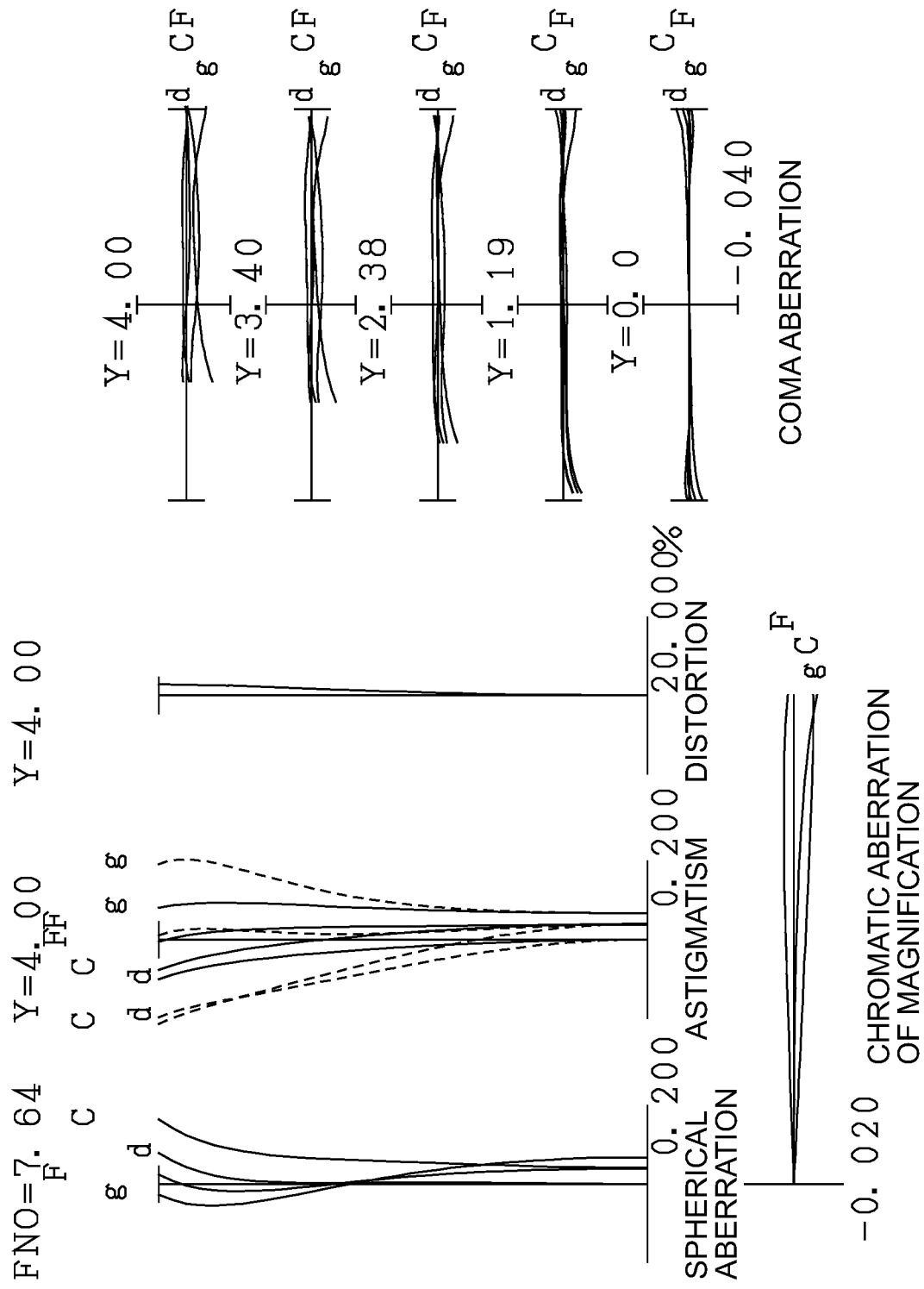

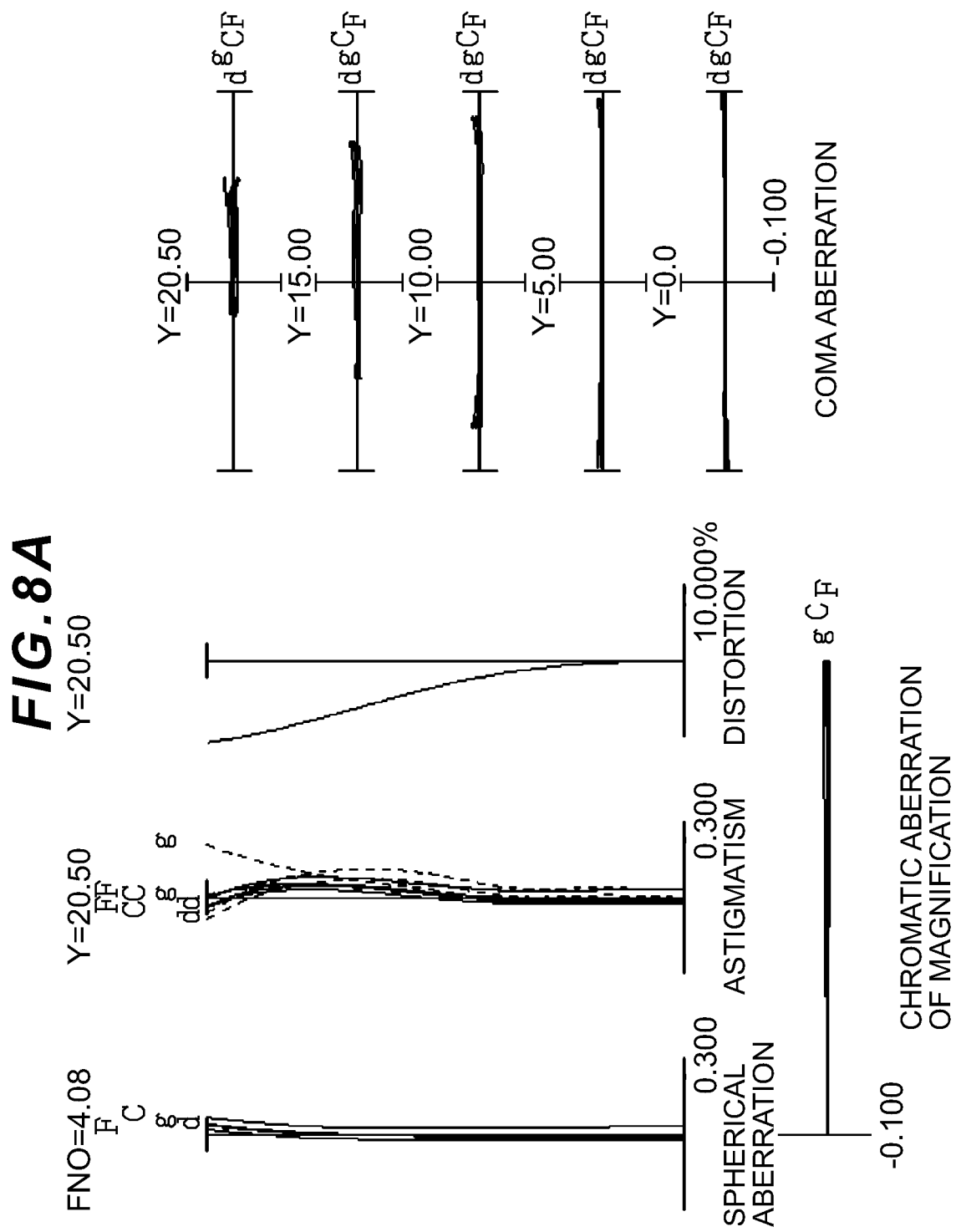

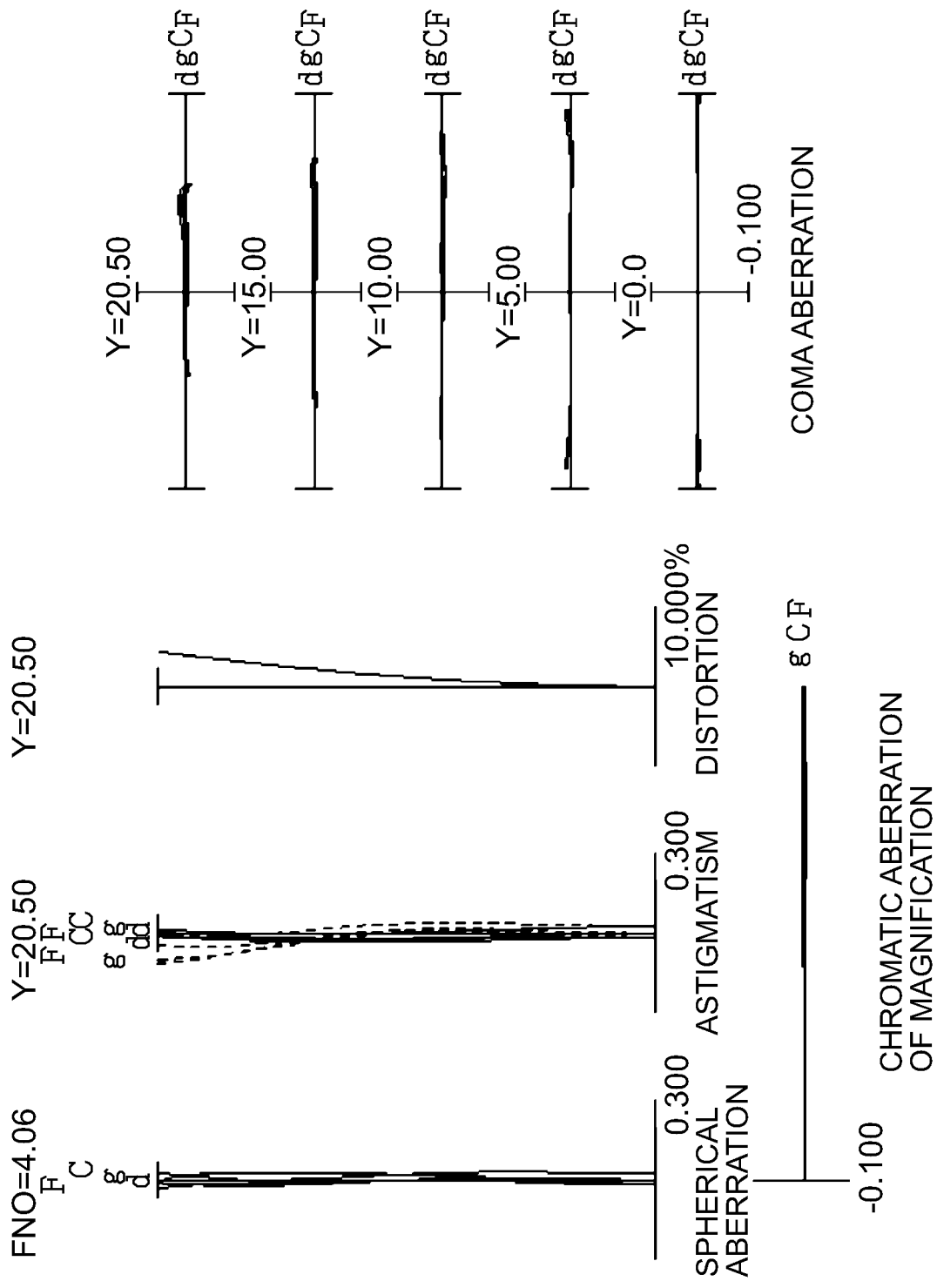

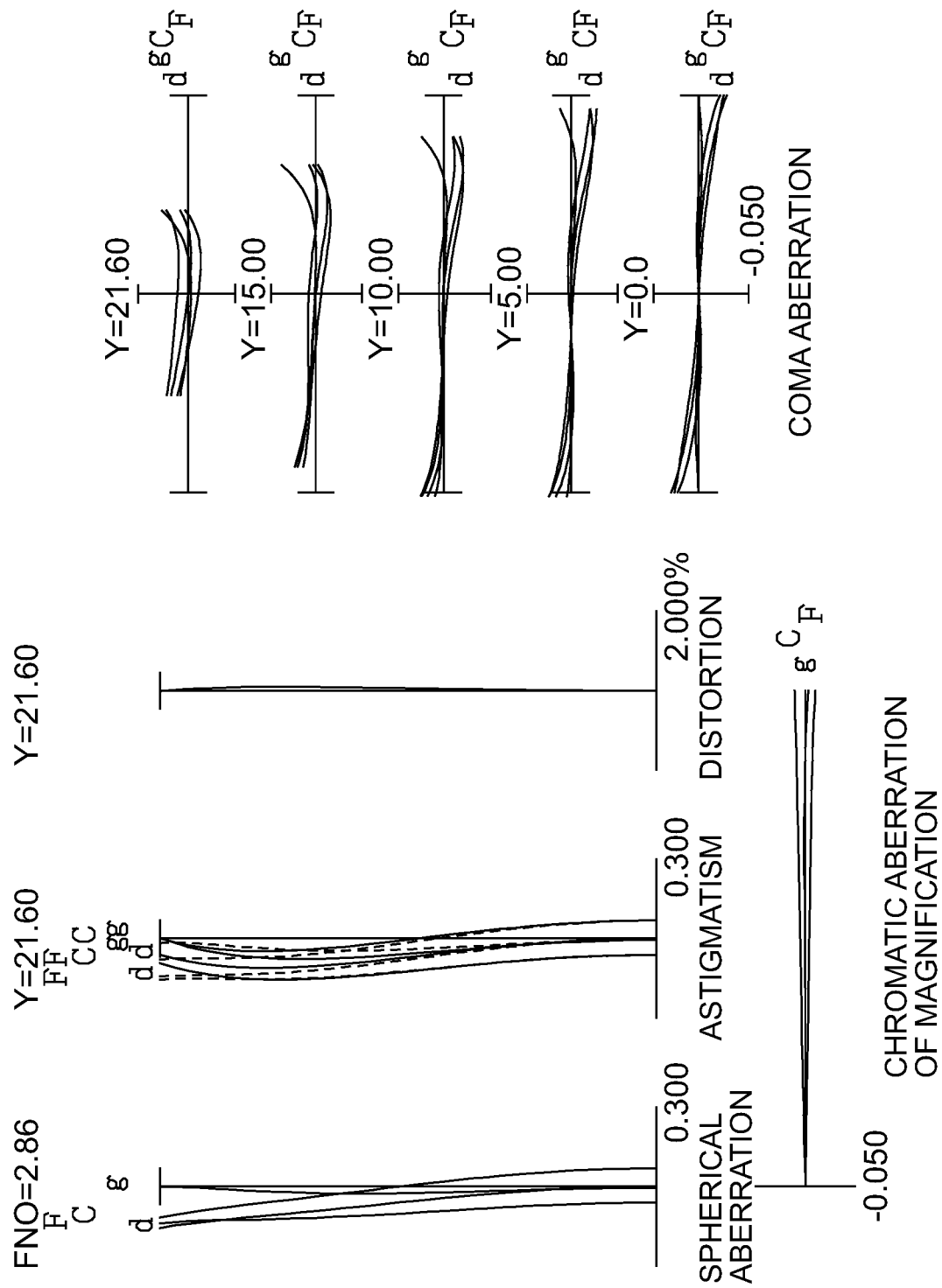

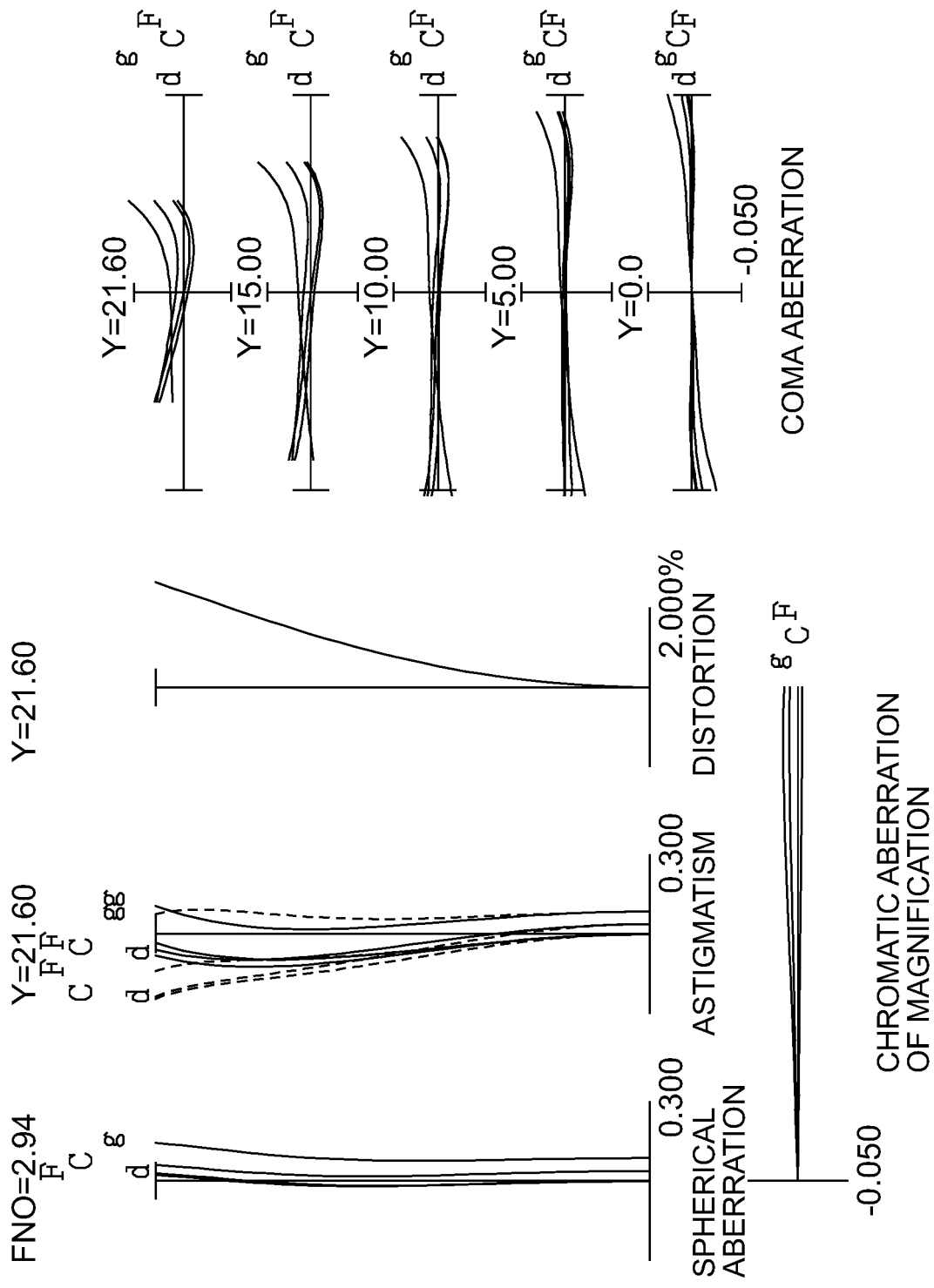

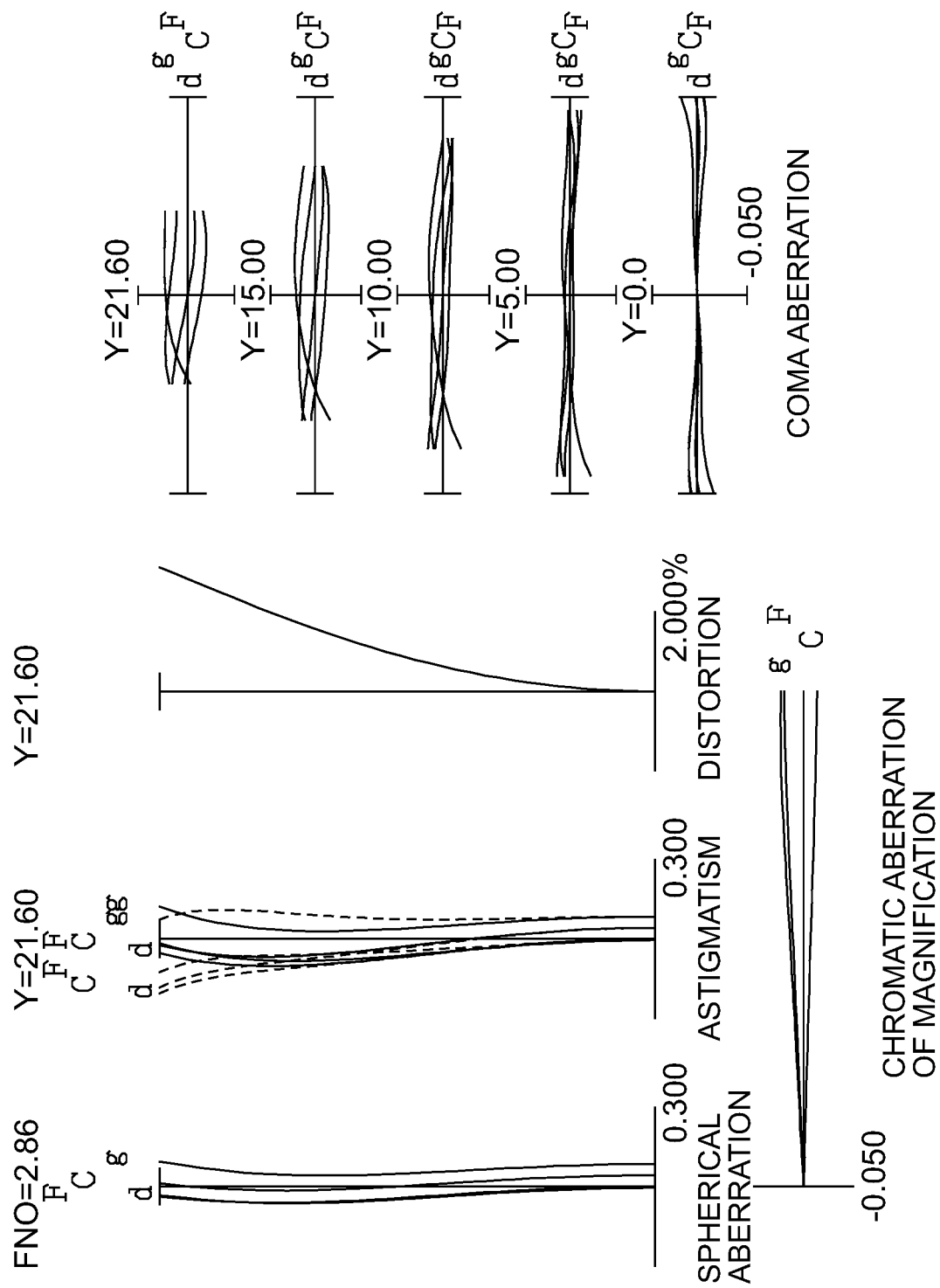

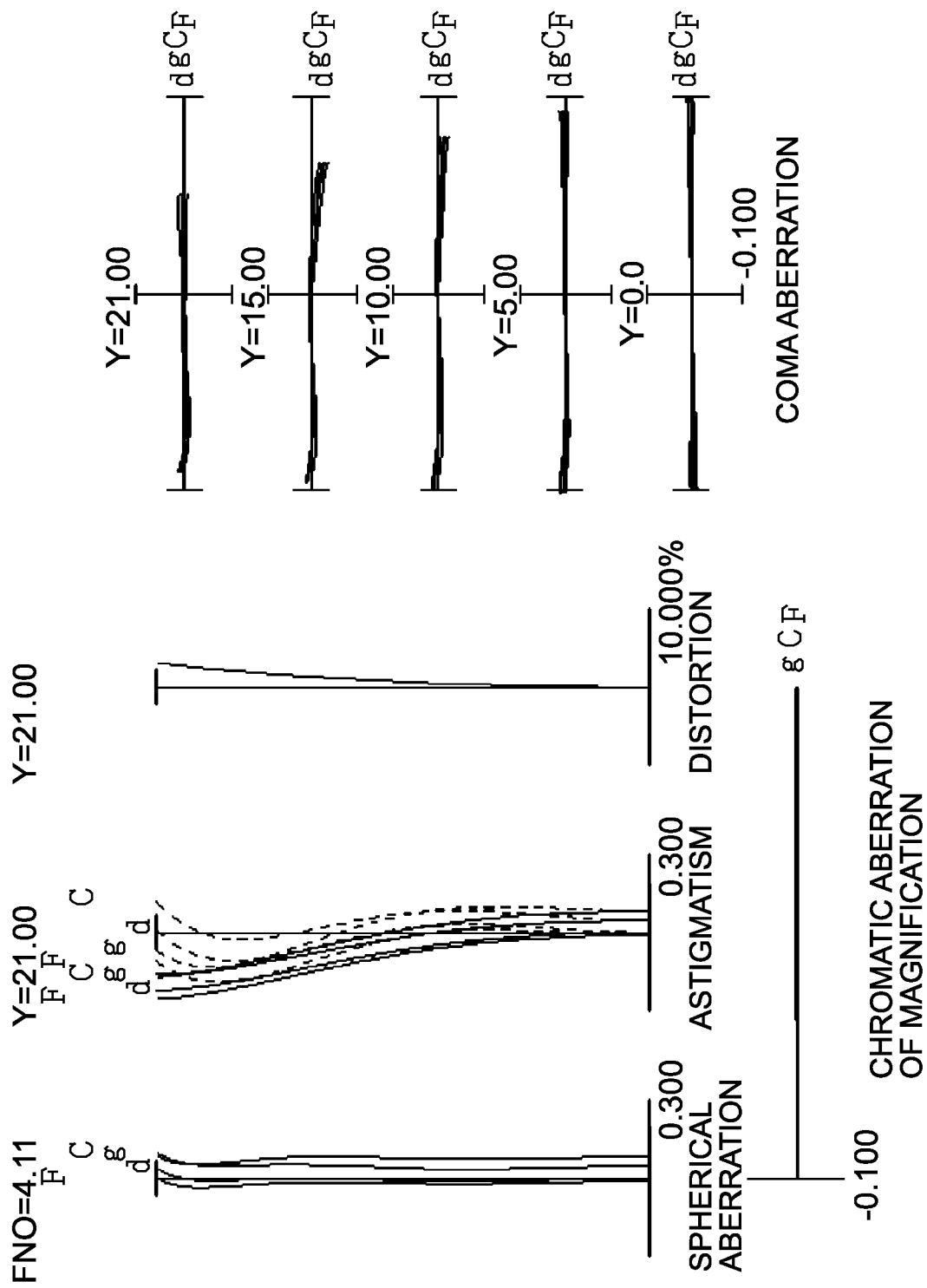

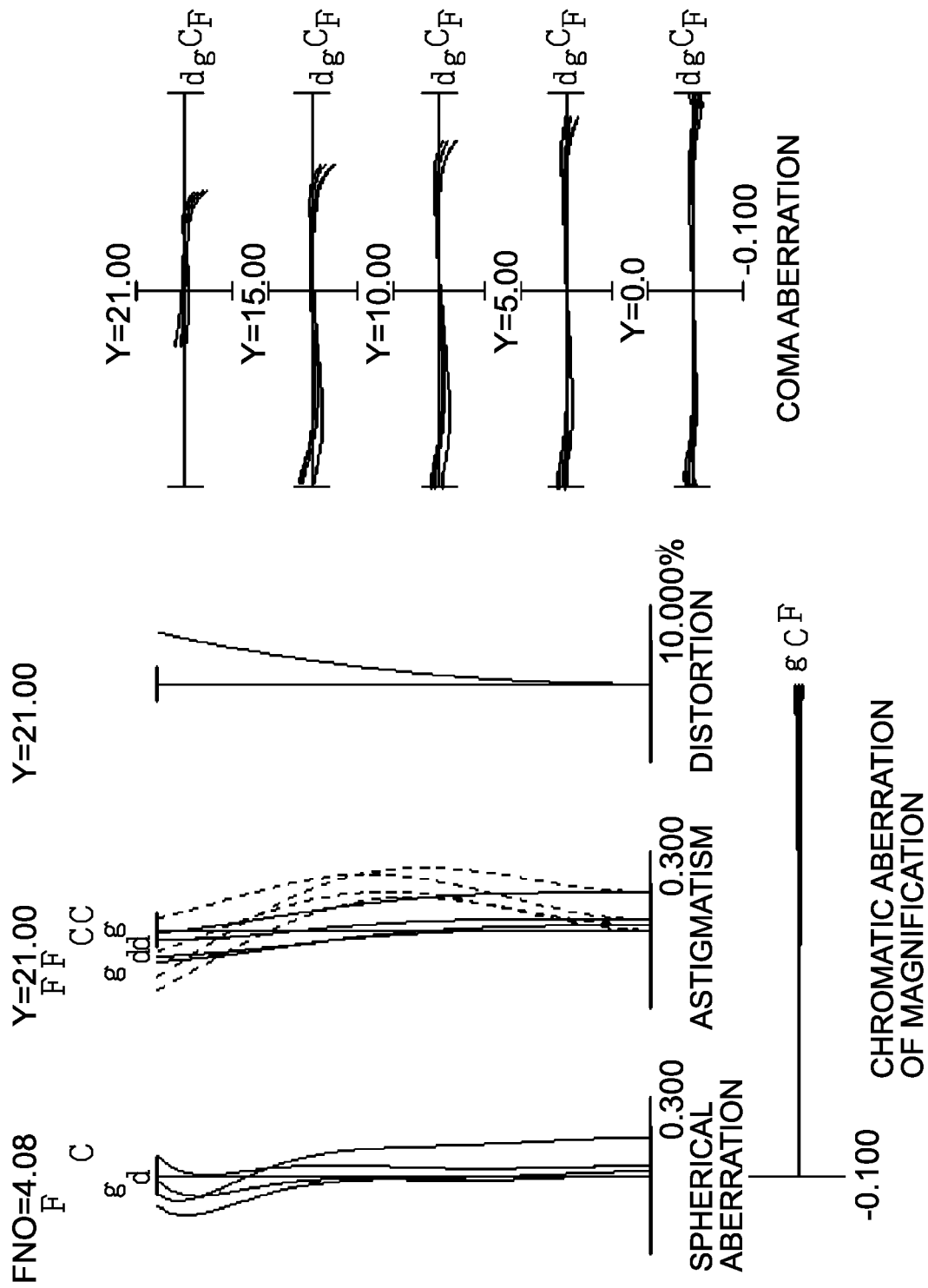

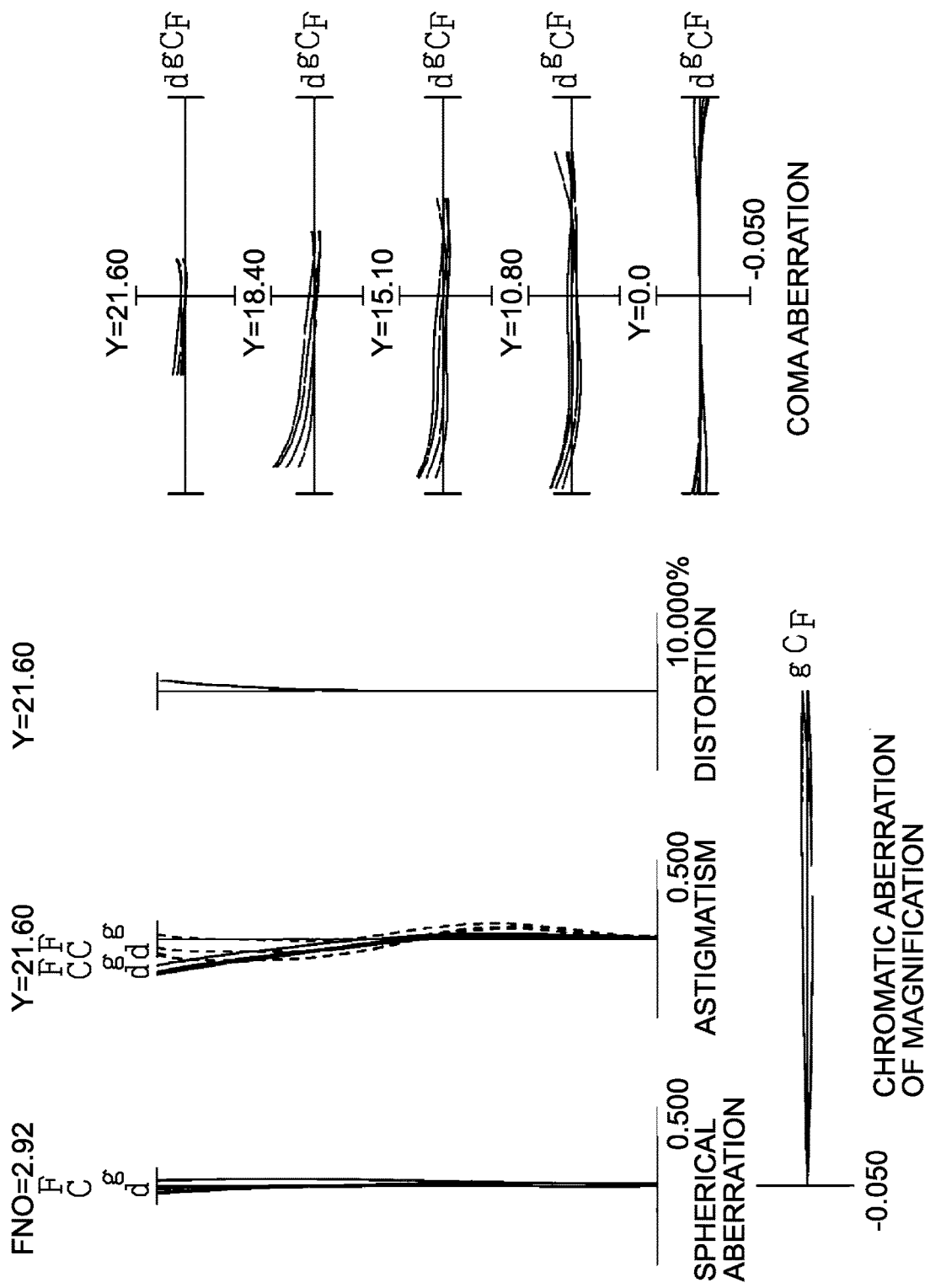

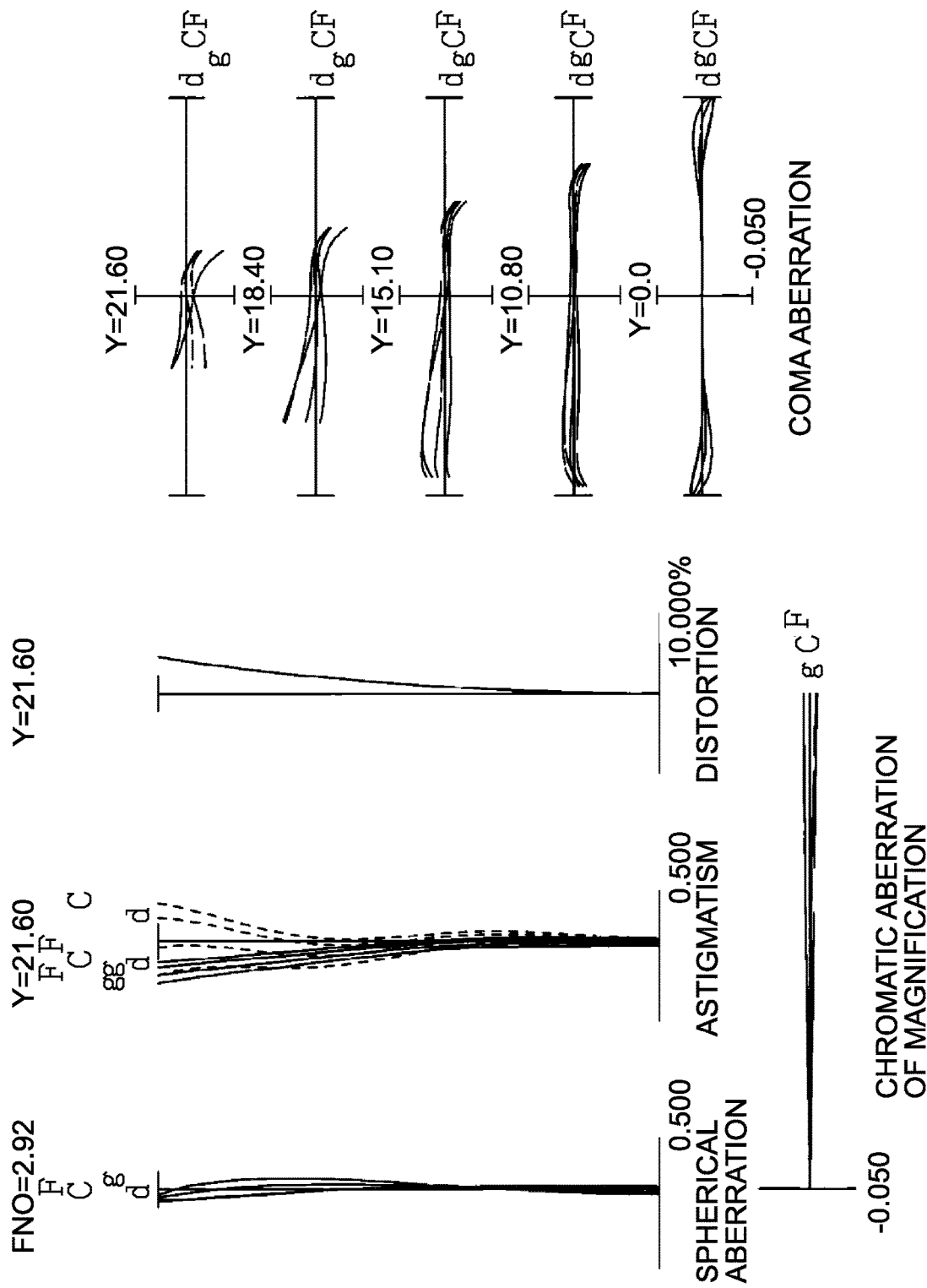

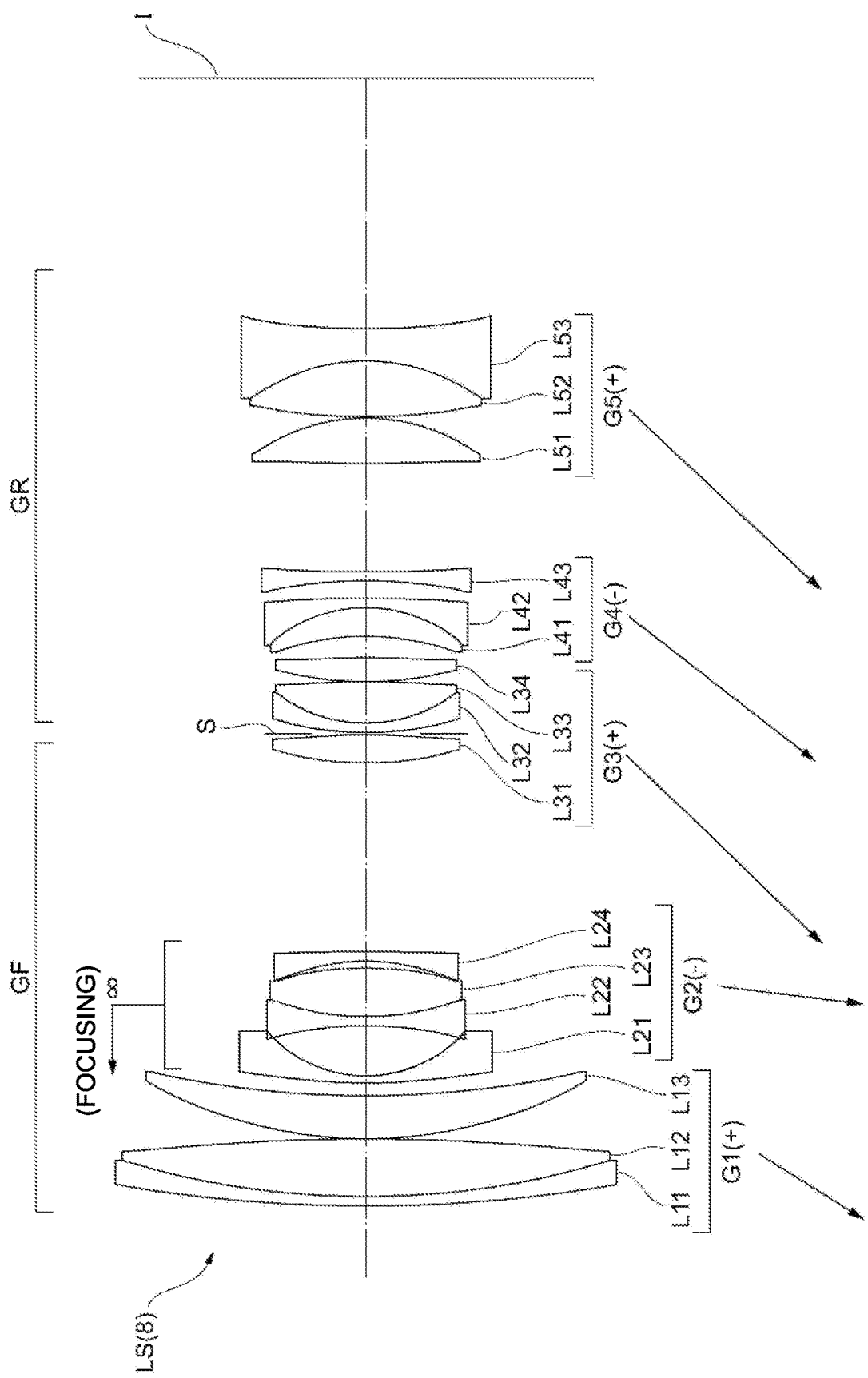

OPTICAL SYSTEM, OPTICAL APPARATUS AND METHOD FOR MANUFACTURING THE OPTICAL SYSTEM

TECHNICAL FIELD

The present invention relates to an optical system, an optical apparatus and a method for manufacturing the optical system.

TECHNICAL BACKGROUND

In recent years, the image resolutions of imaging elements included in imaging apparatuses, such as digital cameras and video cameras, have been improved. It is desired that a photographing lens provided in an imaging apparatus including such an imaging element be a lens of which not only the reference aberrations (aberrations for single-wavelength aberrations), such as the spherical aberration and the coma aberration, be favorably corrected, but also chromatic aberrations be favorably corrected so as not to cause color bleeding for a white light source, and which have a high resolution. In particular, for correction of the chromatic aberrations, it is desirable that not only primary achromatism be achieved but also secondary spectrum be favorably corrected. As means for correcting the chromatic aberrations, for example, a method of using a resin material having anomalous dispersion characteristics (for example, see Patent literature 1) has been known. As described above, accompanied by the recent improvement in imaging element resolution, a photographing lens with various aberrations being favorably corrected has been desired.

PRIOR ARTS LIST

Patent Document

Patent literature 1: Japanese Laid-Open Patent Publication No. 2016-194609(A)

SUMMARY OF THE INVENTION

An optical system according to the present invention comprises a lens, the lens satisfying the following conditional expressions:

$-0.010 < ndLZ - (2.015 - 0.0068 \times vdLZ)$, $50.00 < vdLZ < 65.00$, $0.545 < \theta gFLZ$, $-0.010 < \theta gFLZ - (0.6418 - 0.00168 \times vdLZ)$ where ndLZ: a refractive index of the lens for d-line,
vdLZ: an Abbe number of the lens with reference to d-line, and
θgFLZ: a partial dispersion ratio of the lens, defined by a following expression when a refractive index of the lens for g-line is ngLZ, a refractive index of the lens for F-line is nFLZ, and a refractive index of the lens for C-line is nCLZ:

$\theta gFLZ = (ngLZ - nFLZ)/(nFLZ - nCLZ)$.

An optical apparatus according to the present invention comprises the optical system described above.

A method for manufacturing an optical system according to the present invention arranges each lens in a lens barrel so that the optical system comprises a lens that satisfies the following conditional expressions:

$-0.010 < ndLZ - (2.015 - 0.0068 \times vdLZ)$, $50.00 < vdLZ < 65.00$, $0.545 < \theta gFLZ$, $-0.010 < \theta gFLZ - (0.6418 - 0.00168 \times vdLZ)$ where ndLZ: a refractive index of the lens for d-line,
vdLZ: an Abbe number of the lens with reference to d-line, and
θgFLZ: a partial dispersion ratio of the lens, defined by a following expression when a refractive index of the lens for g-line is ngLZ, a refractive index of the lens for F-line is nFLZ, and a refractive index of the lens for C-line is nCLZ:

$\theta gFLZ = (ngLZ - nFLZ)/(nFLZ - nCLZ)$.

BRIEF DESCRIPTION OF THE DRAWINGS

FIGS. 2A, 2B and 2C are graphs respectively showing various aberrations of the optical system according to First Example upon focusing on infinity, upon focusing on an intermediate distant object and upon focusing on a short distant object;

FIGS. 4A, 4B and 4C are graphs respectively showing various aberrations of the optical system according to Second Example upon focusing on infinity in the wide-angle end state, the intermediate focal length state and the telephoto end state;

FIGS. 6A, 6B and 6C are graphs respectively showing various aberrations of the optical system according to Third Example upon focusing on infinity in the wide-angle end state, the intermediate focal length state and the telephoto end state;

FIGS. 8A, 8B and 8C are graphs respectively showing various aberrations of the optical system according to Fourth Example upon focusing on infinity in the wide-angle end state, the intermediate focal length state and the telephoto end state;

FIGS. 10A, 10B and 10C are graphs respectively showing various aberrations of the optical system according to Fifth Example upon focusing on infinity in the wide-angle end state, the intermediate focal length state and the telephoto end state;

FIGS. 12A, 12B and 12C are graphs respectively showing various aberrations of the optical system according to Sixth Example upon focusing on infinity in the wide-angle end state, the intermediate focal length state and the telephoto end state;

FIGS. 14A, 14B and 14C are graphs respectively showing various aberrations of the optical system according to Seventh Example upon focusing on infinity in the wide-angle end state, the intermediate focal length state and the telephoto end state;

FIG. 15 is a lens configuration diagram of an optical system in a state upon focusing on infinity according to Eighth Example;

DESCRIPTION OF THE EMBODIMENTS

Figure 21:
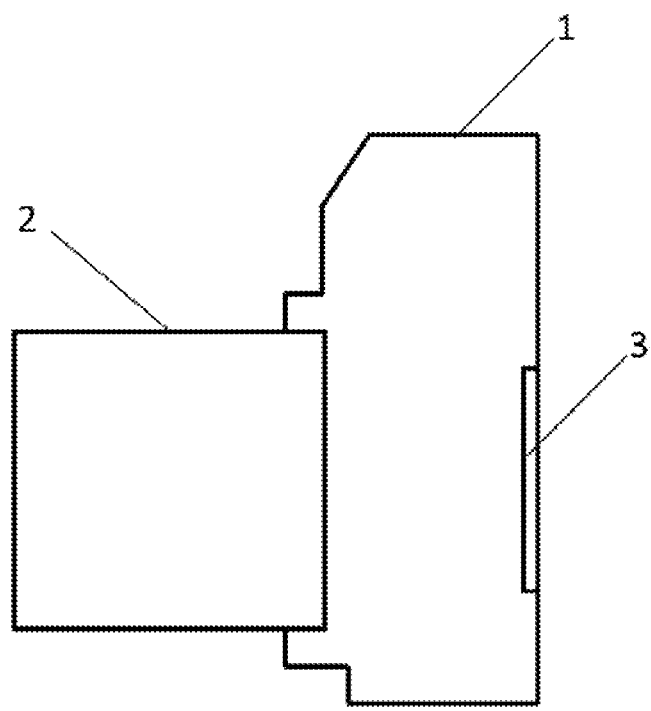
FIG. 21 shows a configuration of a camera that includes the optical system according to this embodiment.

Hereinafter, preferable embodiments according to the present invention are described. First, a camera (optical apparatus) that includes an optical system according to this embodiment is described with reference to FIG. 21. As shown in FIG. 21, the camera 1 is a digital camera that includes the optical system according to this embodiment, as a photographing lens 2. In the camera 1, light from an object (photographic subject), not shown, is collected by the photographing lens 2, and reaches an imaging element 3. Accordingly, the light from the photographic subject is captured by the imaging element 3, and is recorded as a photographic subject image in a memory, not shown. As described above, a photographer can take the image of the photographic subject through the camera 1. Note that this camera may be a mirrorless camera, or a single-lens reflex camera that includes a quick return mirror.

Figure 1:
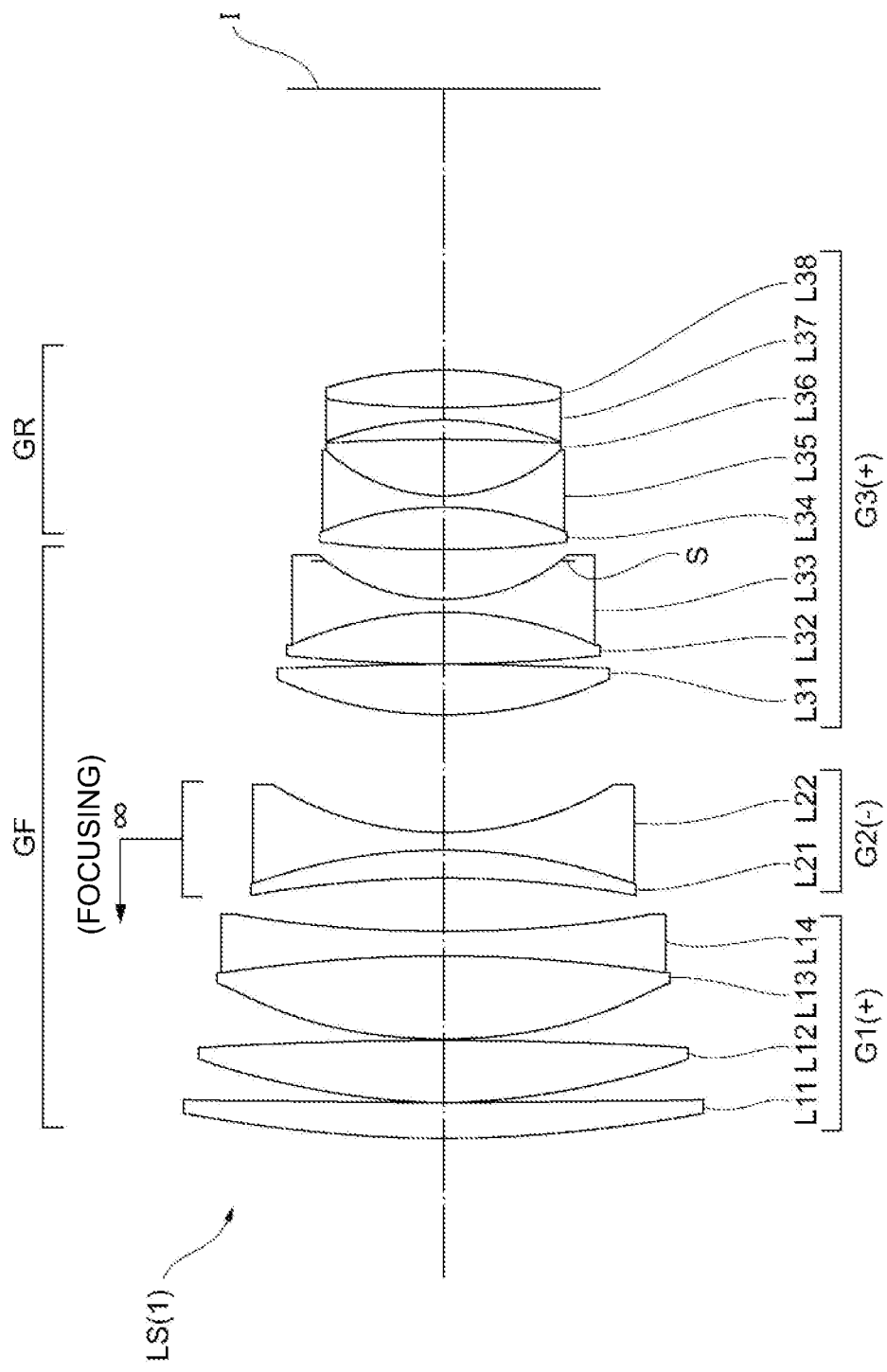
FIG. 1 is a lens configuration diagram of an optical system in a state upon focusing on infinity according to First Example.

As shown in FIG. 1, an optical system LS(1) as an example of the optical system (photographing lens) LS according to this embodiment comprises a lens (L11) that satisfies the following conditional expressions (1) to (4). In this embodiment, for discrimination from the other lenses, the lens that satisfies the conditional expressions (1) to (4) is sometimes called as a specified lens.

$$-0.010 < ndLZ - (2.015 - 0.0068 \times vdLZ) \quad (1),$$

$$50.00 < vdLZ < 65.00 \quad (2),$$

$$0.545 < \theta gFLZ \quad (3),$$

$$-0.010 < \theta gFLZ - (0.6418 - 0.00168 \times vdLZ) \quad (4)$$

where ndLZ: a refractive index of the specified lens for d-line, vdLZ: an Abbe number of the specified lens with reference to d-line, and θgFLZ: a partial dispersion ratio of the specified lens, defined by a following expression when a refractive index of the specified lens for g-line is ngLZ, a refractive index of the specified lens for F-line is nFLZ, and a refractive index of the specified lens for C-line is nCLZ:

$$\theta gFLZ = (ngLZ - nFLZ)/(nFLZ - nCLZ).$$

Note that the Abbe number vdLZ of the specified lens with reference to d-line is defined by the following expression:

$$vdLZ = (ndLZ - 1)/(nFLZ - nCLZ).$$

According to this embodiment, the optical system where for correction of chromatic aberrations, in addition to primary achromatization, the secondary spectrum is favorably corrected, and the optical apparatus that includes this optical system can be achieved. The optical system LS according to this embodiment may be an optical system LS(2) shown in FIG. 3, an optical system LS(3) shown in FIG. 5, an optical system LS(4) shown in FIG. 7, an optical system LS(5) shown in FIG. 9, or an optical system LS(6) shown in FIG. 11. The optical system LS according to this embodiment may be an optical system LS(7) shown in FIG. 13, an optical system LS(8) shown in FIG. 15, an optical system LS(9) shown in FIG. 17, or an optical system LS(10) shown in FIG. 19.

The conditional expression (1) defines an appropriate relationship between the refractive index of the specified lens for d-line and the Abbe number with reference to d-line. By satisfying the conditional expression (1), correction of the reference aberrations, such as the spherical aberration and the coma aberration, and correction of the primary chromatic aberration can be favorably performed.

If the corresponding value of the conditional expression (1) falls outside of the range, the correction of the chromatic aberrations becomes difficult. By setting the lower limit value of the conditional expression (1) to −0.005, the advantageous effects of this embodiment can be further secured. To further secure the advantageous effects of this embodiment, the lower limit value of the conditional expression (1) may be set to −0.001, 0.000, 0.003, 0.005 or 0.007, or further to 0.008.

Note that the upper limit value of the conditional expression (1) may be set to less than 0.150. Accordingly, correction of the reference aberrations, such as the spherical aberration and the coma aberration, and correction of the primary chromatic aberration (achromatization) can be favorably performed. In this case, by setting the upper limit value of the conditional expression (1) to 0.100, the advantageous effects of this embodiment can be further secured. To further secure the advantageous effects of this embodiment, the upper limit value of the conditional expression (1) may be set to 0.080, 0.060 or 0.050, or further to 0.045.

The conditional expression (2) defines an appropriate range of the Abbe number of the specified lens with reference to d-line. By satisfying the conditional expression (2), correction of the reference aberrations, such as the spherical aberration and the coma aberration, and correction of the primary chromatic aberration (achromatization) can be favorably performed.

If the corresponding value of the conditional expression (2) falls outside of the range, the correction of the chromatic aberrations becomes difficult. By setting the lower limit value of the conditional expression (2) to 50.50, the advantageous effects of this embodiment can be further secured. To further secure the advantageous effects of this embodiment, the lower limit value of the conditional expression (2) may be set to 51.00, 51.50 or 52.00, or further to 52.40.

By setting the upper limit value of the conditional expression (2) to 64.00, the advantageous effects of this embodiment can be further secured. To further secure the advantageous effects of this embodiment, the upper limit value of the conditional expression (2) may be set to 63.00, 62.50, 62.00, 61.50, 61.00 or 60.00, or further to 59.50.

The conditional expression (3) appropriately defines the anomalous dispersion characteristics of the specified lens. By satisfying the conditional expression (3), for correction of chromatic aberrations, in addition to primary achromatization, the secondary spectrum can be favorably corrected.

If the corresponding value of the conditional expression (3) falls outside of the range, the correction of the chromatic aberrations becomes difficult. By setting the lower limit value of the conditional expression (3) to 0.547, the advantageous effects of this embodiment can be further secured. To further secure the advantageous effects of this embodiment, the lower limit value of the conditional expression (3) may be set to 0.548 or 0.549, or further to 0.550.

The conditional expression (4) appropriately defines the anomalous dispersion characteristics of the specified lens. By satisfying the conditional expression (4), for correction of chromatic aberrations, in addition to primary achromatization, the secondary spectrum can be favorably corrected.

If the corresponding value of the conditional expression (4) falls outside of the range, the correction of the chromatic aberrations becomes difficult. By setting the lower limit value of the conditional expression (4) to −0.005, the advantageous effects of this embodiment can be further secured. To further secure the advantageous effects of this embodiment, the lower limit value of the conditional expression (4) may be set to −0.001.

Note that the upper limit value of the conditional expression (4) may be set to less than 0.040. Accordingly, correction of the reference aberrations, such as the spherical aberration and the coma aberration, and correction of the primary chromatic aberration (achromatization) can be favorably performed. In this case, by setting the upper limit value of the conditional expression (4) to 0.030, the advantageous effects of this embodiment can be further secured. To further secure the advantageous effects of this embodiment, the upper limit value of the conditional expression (4) may be set to 0.025, or further to 0.020.

Preferably, the optical system LS according to this embodiment consists of: the aperture stop S; a front group GF disposed closer to an object than the aperture stop S; and a rear group GR disposed closer to an image than the aperture stop S, wherein the front group GF may include the specified lens, and satisfy the following conditional expression (5):

$$-10.00 < |fLZ|/fF < 10.00 \qquad (5)$$

where fLZ: a focal length of the specified lens, and
fF: a focal length of the front group GF; in a case where the optical system LS is a zoom optical system, the focal length of the front group GF in the wide angle end state.

The conditional expression (5) defines an appropriate relationship between the focal length of the specified lens and the focal length of the front group GF. By satisfying the conditional expression (5), the reference aberrations, such as the spherical aberration and the coma aberration, can be favorably corrected.

If the corresponding value of the conditional expression (5) falls outside of the range, the correction of the reference aberrations, such as the spherical aberration and the coma aberration, becomes difficult. By setting the lower limit value of the conditional expression (5) to −9.50, the advantageous effects of this embodiment can be further secured. To further secure the advantageous effects of this embodiment, the lower limit value of the conditional expression (5) may be set to −9.00, −8.50, −8.00, −7.00, −5.00, −3.00, −1.50, −0.05 or 0.05, or further to 0.10.

By setting the upper limit value of the conditional expression (5) to 8.50, the advantageous effects of this embodiment can be further secured. To further secure the advantageous effects of this embodiment, the upper limit value of the conditional expression (5) may be set to 7.50, 6.50, 5.00 or 4.00, or further to 3.00.

The optical system LS according to this embodiment may consist of: the aperture stop S; a front group GF disposed closer to an object than the aperture stop S; and a rear group GR disposed closer to an image than the aperture stop S, wherein the rear group GR may include the specified lens, and satisfy the following conditional expression (6):

$$-10.00 < |fLZ|/fR < 10.00 \qquad (6)$$

where fLZ: a focal length of the specified lens, and
fR: a focal length of the rear group GR; in a case where the optical system LS is a zoom optical system, the focal length of the rear group GR in the wide angle end state.

The conditional expression (6) defines an appropriate relationship between the focal length of the specified lens and the focal length of the rear group GR. By satisfying the conditional expression (6), the reference aberrations, such as the spherical aberration and the coma aberration, can be favorably corrected.

If the corresponding value of the conditional expression (6) falls outside of the range, the correction of the reference aberrations, such as the spherical aberration and the coma aberration, becomes difficult. By setting the lower limit value of the conditional expression (6) to −9.50, the advantageous effects of this embodiment can be further secured. To further secure the advantageous effects of this embodiment, the lower limit value of the conditional expression (6) may be set to −9.00, −8.50, −8.00, −7.00, −5.00, −3.00, −1.50, −0.05 or 0.05, or further to 0.10.

By setting the upper limit value of the conditional expression (6) to 8.50, the advantageous effects of this embodiment can be further secured. To further secure the advantageous effects of this embodiment, the upper limit value of the conditional expression (6) may be set to 7.50, 6.50, 5.00 or 4.00, or further to 3.00.

In the optical system LS according to this embodiment, it is desirable that the specified lens satisfy the following conditional expression (7):

$$0.10 < |fLZ|/f < 15.00 \qquad (7)$$

where fLZ: a focal length of the specified lens, and f: a focal length of the optical system; in a case where the optical system LS is a zoom optical system, the focal length of the optical system in the wide angle end state.

The conditional expression (7) defines an appropriate relationship between the focal length of the specified lens and the focal length of the optical system LS. By satisfying the conditional expression (7), the reference aberrations, such as the spherical aberration and the coma aberration, can be favorably corrected.

If the corresponding value of the conditional expression (7) falls outside of the range, the correction of the reference aberrations, such as the spherical aberration and the coma aberration, becomes difficult. By setting the lower limit value of the conditional expression (7) to 0.20, the advantageous effects of this embodiment can be further secured. To further secure the advantageous effects of this embodiment, the lower limit value of the conditional expression (7) may be set to 0.30, 0.40 or 0.45, or further to 0.50.

By setting the upper limit value of the conditional expression (7) to 14.20, the advantageous effects of this embodiment can be further secured. To further secure the advantageous effects of this embodiment, the upper limit value of the conditional expression (7) may be set to 12.00, 10.00 or 8.50, or further to 7.50.

In the optical system LS according to this embodiment, the specified lens may satisfy the following conditional expression (3-1), $$0.555 < \theta gFLZ \quad (3\text{-}1)$$

The conditional expression (3-1) is an expression similar to the conditional expression (3), and can exert advantageous effects similar to those of the conditional expression (3). By setting the lower limit value of the conditional expression (3-1) to 0.556, the advantageous effects of this embodiment can be further secured. To further secure the advantageous effects of this embodiment, it is preferable to set the lower limit value of the conditional expression (3-1) to 0.557.

In the optical system LS according to this embodiment, the specified lens may satisfy the following conditional expression (4-1), $$0.010 < \theta gFLZ - (0.6418 - 0.00168 \times vdLZ) \quad (4\text{-}1)$$

The conditional expression (4-1) is an expression similar to the conditional expression (4), and can exert advantageous effects similar to those of the conditional expression (4). By setting the lower limit value of the conditional expression (4-1) to 0.011, the advantageous effects of this embodiment can be further secured. To further secure the advantageous effects of this embodiment, it is preferable to set the lower limit value of the conditional expression (4-1) to 0.012.

Note that the upper limit value of the conditional expression (4-1) may be set to less than 0.030. Accordingly, advantageous effects similar to those of the conditional expression (4) can be achieved. In this case, by setting the upper limit value of the conditional expression (4-1) to 0.028, the advantageous effects of this embodiment can be further secured. To further secure the advantageous effects of this embodiment, the upper limit value of the conditional expression (4-1) may be set to 0.025 or 0.023, or further to 0.020.

In the optical system LS according to this embodiment, it is desirable that the specified lens satisfy the following conditional expression (8):

$$DLZ > 0.400 \text{ [mm]} \quad (8)$$

where DLZ: a thickness of the specified lens on an optical axis.

The conditional expression (8) appropriately defines the thickness of the specified lens on the optical axis. By satisfying the conditional expression (8), the various aberrations, such as the coma aberration, and the chromatic aberrations (the longitudinal chromatic aberration and the chromatic aberration of magnification), can be favorably corrected.

If the corresponding value of the conditional expression (8) falls outside of the range, the correction of the various aberrations, such as the coma aberration and the chromatic aberrations (the longitudinal chromatic aberration and the chromatic aberration of magnification), becomes difficult. By setting the lower limit value of the conditional expression (8) to 0.450 [mm], the advantageous effects of this embodiment can be further secured. To further secure the advantageous effects of this embodiment, the lower limit value of the conditional expression (8) may be set to 0.490 [mm], 0.550 [mm], 0.580 [mm], 0.650 [mm], 0.680 [mm], 0.750 [mm], 0.800 [mm], 0.850 [mm], 0.880 [mm], 0.950 [mm], 0.980 [mm], 1.050 [mm], 1.100 [mm], 1.140 [mm], 1.250 [mm], or further to 1.350 [mm].

In the optical system LS according to this embodiment, preferably, the specified lens is a single lens, or one lens of two lenses of a cemented lens consisting of the two lenses cemented to each other. Use of glass as the material of the lens has smaller variation in optical characteristics due to temperature than that of resin. In this embodiment, glass can be used as a material of the specified lens. Accordingly, even in the case where the specified lens has a lens surface in contact with air (i.e., a single lens, or one lens of two lenses of a cemented lens consisting of the two lenses cemented to each other), it is preferable because variation in optical characteristics due to temperature is small.

In the optical system LS according to this embodiment, it is desirable that at least one lens surface of an object-side lens surface and an image-side lens surface of the specified lens be in contact with air. Use of glass as the material of the lens has smaller variation in optical characteristics due to temperature than that of resin. In this embodiment, glass can be used as a material of the specified lens. Accordingly, even in a case where a lens surface of the specified lens is in contact with air, it is preferable because the variation in optical characteristics due to temperature is small.

In the optical system LS according to this embodiment, it is desirable that the specified lens be a glass lens. The secular change of the specified lens that is a glass lens is smaller than that of a resin lens. Accordingly, it is preferable because the variation in optical characteristics due to temperature is small.

Figure 22:
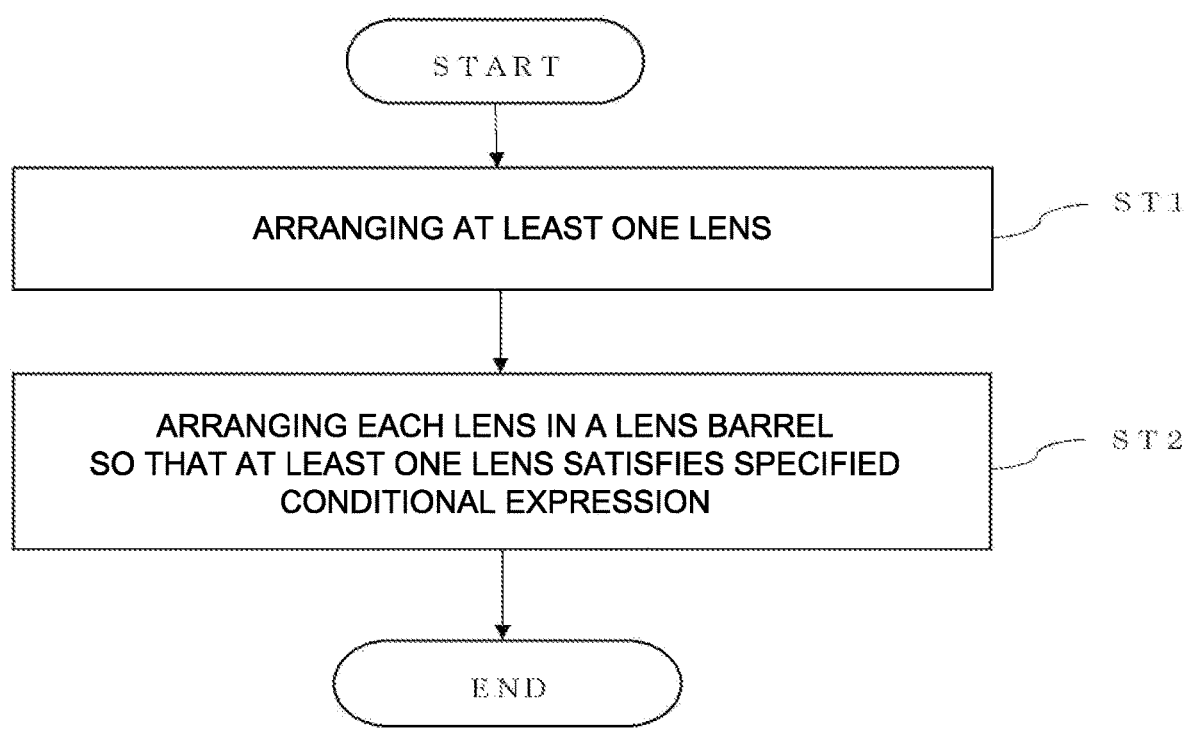
FIG. 22 is a flowchart showing a method of manufacturing the optical system according to this embodiment.

Subsequently, referring to FIG. 22, a method for manufacturing the optical system LS described above is schematically described. First, at least one lens is arranged (step ST1). At this time, each lens is arranged in a lens barrel so that at least one (specified lens) of the lenses satisfies the conditional expressions (1) to (4) and the like (step ST2). According to such a manufacturing method, the optical system where for correction of chromatic aberrations, in addition to primary achromatization, the secondary spectrum is favorably corrected can be manufactured.

EXAMPLES

Optical systems LS according to Examples of this embodiment are described with reference to the drawings. FIGS. 1, 3, 5, 7, 9, 11, 13, 15, 17 and 19 are sectional views showing the configurations and refractive power allocations of optical systems LS {LS(1) to LS(10)} according to First to Tenth Examples. In the sectional views of the optical systems LS(1) to LS(10) according to First to Tenth Examples, the moving direction upon focusing by each focusing lens group from the infinity to a short-distance object is indicated by an arrow accompanied by characters "FOCUSING". In the sectional views of the optical systems LS(2) to LS(9) according to Second to Ninth Examples, the moving direction of each lens group along the optical axis upon zooming from the wide angle end state (W) to the telephoto end state (T) is indicated by an arrow.

In FIGS. 1, 3, 5, 7, 9, 11, 13, 15, 17 and 19, each lens group is represented by a combination of a symbol G and a numeral, and each lens is represented by a combination of a symbol L and a numeral. In this case, to prevent complication due to increase in the types and numbers of symbols and numerals, the lens groups and the like are represented using the combinations of symbols and numerals independently on an Example-by-Example basis. Accordingly, even when the same combination of a symbol and a numeral is used among Examples, such usage does not mean the same configuration.

Tables 1 to 10 are shown below. Among the drawings, Table 1 is a table showing each data item in First Example, Table 2 is that in Second Example, Table 3 is that in Third Example, Table 4 is that in Fourth Example, Table 5 is that in Fifth Example, Table 6 is that in Sixth Example, Table 7 is that in Seventh Example, Table 8 is that in Eighth Example, Table 9 is that in Ninth Example, and Table 10 is that in Tenth Example. In each Example, as targets of calculation of aberration characteristics, d-line (wavelength λ=587.6 nm), g-line (wavelength λ=435.8 nm), C-line (wavelength λ=656.3 nm), and F-line (wavelength λ=486.1 nm) are selected.

In the table of [General Data], f indicates the focal length of the entire lens system, FNO indicates the f-number, 2ω indicates the angle of view (the unit is ° (degrees), and ω is the half angle of view), and Y indicates the image height. TL indicates a distance obtained by adding BF to the distance from the lens foremost surface to the lens last surface on the optical axis upon focusing on infinity. BF indicates the distance (back focus) from the lens last surface to the image surface I on the optical axis upon focusing on infinity. fF indicates the focal length of the front group, and fR indicates the focal length of the rear group. Note that in a case where the optical system is a zoom optical system, these values are indicated for each of zoom states at the wide-angle end (W), the intermediate focal length (M) and the telephoto end (T).

In the table of [Lens Data], Surface Number indicates the order of the optical surface from the object side along the direction in which the ray travels, R indicates the radius of curvature (the surface whose center of curvature resides on the image side is regarded to have a positive value) of each optical surface, D indicates the surface distance which is the distance to the next lens surface (or the image surface) from each optical surface on the optical axis, nd is the refractive index of the material of the optical member for d-line, vd indicates the Abbe number of the material of the optical member with respect to d-line, and θgF indicates the partial dispersion ratio of the material of the optical member. The radius of curvature "∞" indicates a plane or an opening. (Aperture Stop S) indicates an aperture stop S. The description of the air refractive index nd=1.00000 is omitted. In a case where the optical surface is an aspherical surface, the surface number is assigned * symbol, and the field of the radius of curvature R indicates the paraxial radius of curvature.

The refractive index of the optical member for g-line (wavelength λ=435.8 nm) is indicated by ng. The refractive index of the optical member for F-line (wavelength λ=486.1 nm) is indicated by nF. The refractive index of the optical member for C-line (wavelength λ=656.3 nm) is indicated by nC. Here, the partial dispersion ratio θgF of the material of the optical member is defined by the following expression (A).

$$\theta gF=(ng-nF)/(nF-nC) \quad (A)$$

In the table of [Aspherical Surface Data], the shape of the aspherical surface indicated in [Lens Data] is indicated by the following expression (B). X(y) indicates the distance (sag amount) from the tangent plane at the vertex of the aspherical surface to the position on the aspherical surface at the height y along the optical axis direction. R indicates the radius of curvature (paraxial radius of curvature) of the reference spherical surface. κ indicates the conic constant. Ai indicates the i-th aspherical coefficient. "E-n" indicates "×10$^{-n}$". For example, 1.234E-05=1.234×10$^{-5}$. Note that the second-order aspherical coefficient A2 is zero, and the description thereof is omitted.

$$X(y)=(y^2/R)/\{1+(1-\kappa \times y^2/R^2)^{1/2}\}+A4 \times y^4+A6 \times y^6+A8 \times y^8+A10 \times y^{10}+A12 \times y^{12} \quad (B)$$

In a case where the optical system is not a zoom optical system, f indicates the focal length of the entire lens system, and β indicates the photographing magnification, as [Variable Distance Data on Short-Distance Photographing]. The table of [Variable Distance Data on Short-Distance Photographing] indicates the surface distance at the surface number where the surface distance is "Variable" in [Lens Data] corresponding to each focal length and photographing magnification.

In the case where the optical system is the zoom optical system, the surface distance at the surface number where the surface distance is "Variable" in [Lens Data] corresponding to each of zooming states at the wide angle end (W), the intermediate focal length (M) and the telephoto end (T) are indicated as [Variable Distance Data on Zoom Photographing].

The table of [Lens Group Data] shows the first surface (the surface closest to the object) and the focal length of each lens group.

The table of [Conditional Expression Corresponding Value] shows the value corresponding to each conditional expression.

Hereinafter, at all the data values, the listed focal length f, the radius of curvature R, the surface distance D, other lengths and the like are represented with "mm" if not otherwise specified. However, even after subjected to proportional scaling in or out, the optical system can achieve equivalent optical performance. Accordingly, the representation is not limited thereto.

The descriptions of the tables so far are common to all the Examples. Redundant descriptions are hereinafter omitted.

First Example

First Example is described with reference to FIGS. 1 and 2A, 2B and 2C, and Table 1. FIG. 1 is a diagram showing a lens configuration of an optical system in a state upon focusing on infinity according to First Example of this embodiment. The optical system LS(1) according to First Example consists of, in order from the object: a first lens group G1 having a positive refractive power; a second lens group G2 having a negative refractive power; and a third lens group G3 having a positive refractive power. Upon focusing from the infinity object to the short-distant (finite distant) object, the second lens group G2 moves toward the object along the optical axis. The aperture stop S is disposed in the third lens group G3. A sign (+) or (−) assigned to each lens group symbol indicates the refractive power of each lens group. This indication similarly applies to all the following Examples.

The first lens group G1 consists of, in order from the object: a positive meniscus lens L11 having a convex surface facing the object; a biconvex positive lens L12; and a cemented lens consisting of a biconvex positive lens L13 and a biconcave negative lens L14.

The second lens group G2 consists of, in order from the object, a cemented lens consisting of a positive meniscus lens L21 having a concave surface facing the object, and a biconcave negative lens L22.

The third lens group G3 consists of, in order from the object: a biconvex positive lens L31; a cemented lens consisting of a biconvex positive lens L32 and a biconcave negative lens L33; a biconvex positive lens L34; a cemented lens consisting of a biconcave negative lens L35 and a biconvex positive lens L36; and a cemented lens consisting of a biconcave negative lens L37 and a biconvex positive lens L38. An aperture stop S is disposed between the negative lens L33 (of the cemented lens) and the positive lens L34 of the third lens group G3. An image surface I is disposed on the image side of the third lens group G3. In this Example, the positive lens L32 of the third lens group G3 corresponds to a specified lens that satisfies the conditional expressions (1) to (4) and the like.

In this Example, the positive meniscus lens L11, the positive lens L12, the cemented lens consisting of the positive lens L13 and the negative lens L14, the cemented lens consisting of the positive meniscus lens L21 and the negative lens L22, the positive lens L31, and the cemented lens consisting of the positive lens L32 and the negative lens L33 constitute the front group GF disposed closer to the object than the aperture stop S. The positive lens L34, the cemented lens consisting of the negative lens L35 and the positive lens L36, and the cemented lens consisting of the negative lens L37 and the positive lens 38 constitute the rear group GR disposed closer to the image than the aperture stop S.

The following Table 1 lists values of data on the optical system according to First Example.

TABLE 1

[General Data]

| | |
|---|---|
| f | 101.836 |
| FNO | 1.450 |
| 2ω | 23.858 |
| Y | 21.630 |
| TL | 150.819 |
| BF | 40.419 |
| fF | 183.828 |
| fR | 67.854 |

[Lens Data]

| Surface Number | R | D | nd | vd | θgF |
|---|---|---|---|---|---|
| 1 | 196.23220 | 5.196 | 1.59349 | 67.00 | 0.5366 |
| 2 | 2286.18150 | 0.100 | | | |
| 3 | 106.11310 | 8.799 | 1.49782 | 82.57 | 0.5386 |
| 4 | −590.58120 | 0.100 | | | |
| 5 | 69.87930 | 12.053 | 1.49782 | 82.57 | 0.5386 |
| 6 | −214.24630 | 3.500 | 1.72047 | 34.71 | 0.5834 |
| 7 | 180.96130 | D7(Variable) | | | |
| 8 | −154.49370 | 4.000 | 1.65940 | 26.87 | 0.6327 |
| 9 | −81.01520 | 2.500 | 1.48749 | 70.32 | 0.5291 |
| 10 | 47.84150 | D10(Variable) | | | |
| 11 | 60.72420 | 7.163 | 2.00100 | 29.13 | 0.5995 |
| 12 | −460.33830 | 0.100 | | | |
| 13 | 208.41160 | 7.434 | 1.65240 | 55.27 | 0.5607 |
| 14 | −53.40870 | 1.800 | 1.69895 | 30.13 | 0.6021 |
| 15 | 29.04580 | 5.561 | | | |
| 16 | ∞ | 1.600 | | (Aperture Stop S) | |
| 17 | 147.67940 | 6.054 | 1.59319 | 67.90 | 0.5440 |
| 18 | −46.44860 | 0.100 | | | |
| 19 | −46.85960 | 1.600 | 1.72047 | 34.71 | 0.5834 |
| 20 | 25.22680 | 8.064 | 1.77250 | 49.62 | 0.5518 |
| 21 | −295.74160 | 2.754 | | | |
| 22 | −48.05560 | 1.800 | 1.58144 | 40.98 | 0.5763 |
| 23 | 109.52130 | 5.418 | 2.00100 | 29.13 | 0.5995 |
| 24 | −58.12710 | BF | | | |

[Variable Distance Data on Short-Distance Photographing]

| | Upon focusing on infinity f = 101.836 | Upon focusing on an intermediate distance object β = −0.033 | Upon focusing on a short-distance object β = −0.134 |
|---|---|---|---|
| D7 | 7.730 | 10.644 | 19.730 |
| D10 | 16.973 | 14.059 | 4.973 |

[Lens Group Data]

| Group | First surface | Focal length |
|---|---|---|
| G1 | 1 | 91.612 |
| G2 | 8 | −80.287 |
| G3 | 11 | 78.292 |

[Conditional Expression Corresponding Value]
<Positive lens L32(fLZ = 65.904)>

Conditional Expression(1)
ndLZ − (2.015 − 0.0068 × vdLZ) = 0.013
Conditional Expression(2)vdLZ = 55.27
Conditional Expression(3), (3-1)θgFLZ = 0.5607
Conditional Expression(4), (4-1)
θgFLZ − (0.6418 − 0.00168 × vdLZ) = 0.0118
Conditional Expression(5)|fLZ|/fF = 0.359
Conditional Expression(7)|fLZ|/f = 0.647
Conditional Expression(8)DLZ = 7.434

Figure 2B:
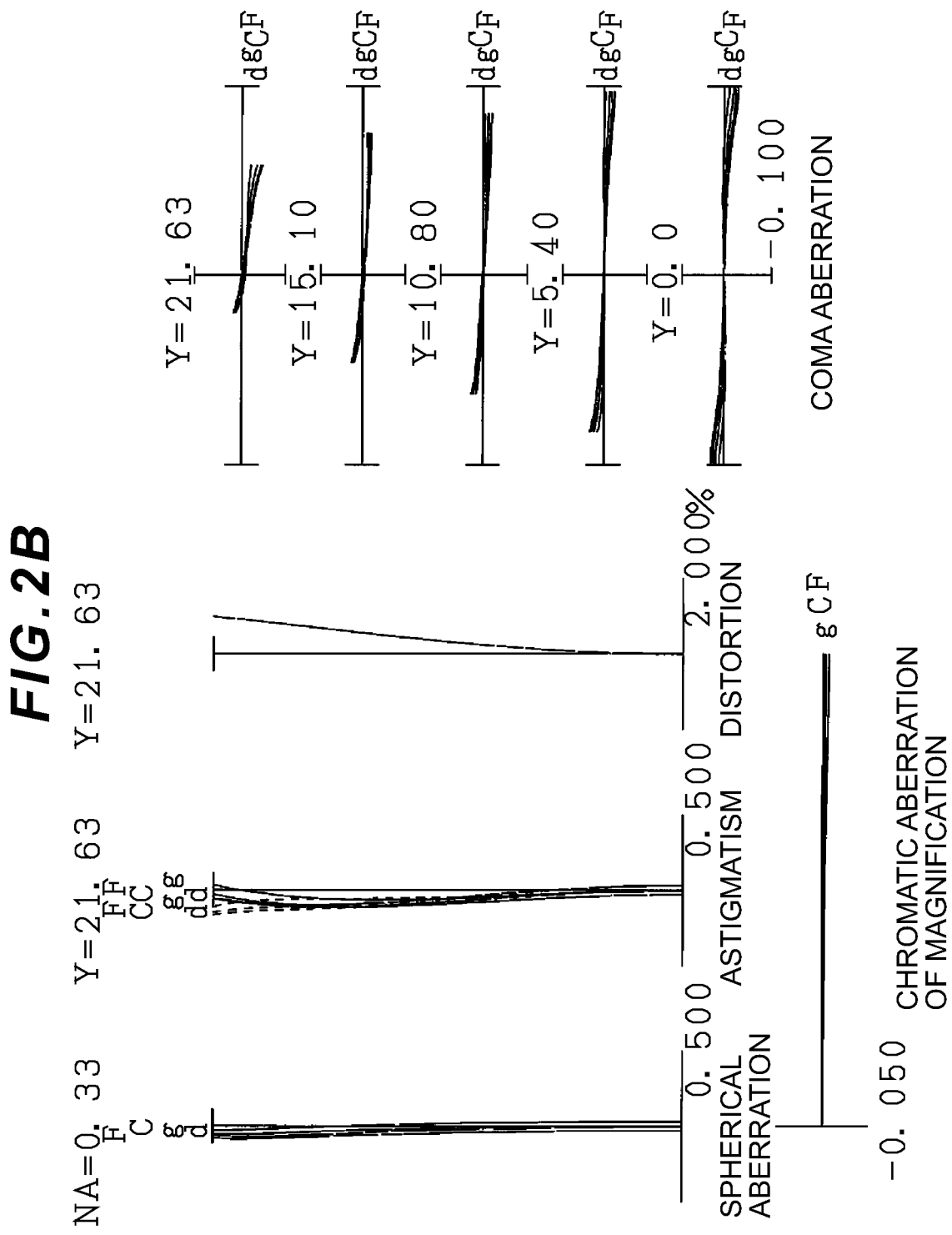

FIG. 2A shows various aberration graphs of the optical system according to First Example upon focusing on infinity. FIG. 2B shows various aberration graphs of the optical system according to First Example upon focusing on an intermediate distant object. FIG. 2C shows various aberration graphs of the optical system according to First Example upon focusing on a short-distant (very short distance) object. In each graph upon focusing on infinity, FNO indicates the f-number, and Y indicates the image height. In each aberration graph upon focusing on the intermediate distant object or focusing on the short distant object, NA indicates the numerical aperture, and Y indicates the image height. The spherical aberration graph indicates the value of the f-number or the numerical aperture that corresponds to the maximum diameter. The astigmatism graph and the distortion graph each indicate the maximum value of the image height. The coma aberration graph indicates the value of the corresponding image height. d indicates d-line (wavelength λ=587.6 nm), g indicates g-line (wavelength λ=435.8 nm), C indicates C-line (wavelength λ=656.3 nm), and F indicates F-line (wavelength λ=486.1 nm). In the astigmatism graph, a solid line indicates a sagittal image surface, and a broken line indicates a meridional image surface. Note that also in the following aberration graphs in each Example, symbols similar to those in this Example are used. Redundant description is omitted.

The various aberration graphs show that the optical system according to First Example has favorably corrected various aberrations, and exerts excellent imaging performance.

Second Example

Figure 3:
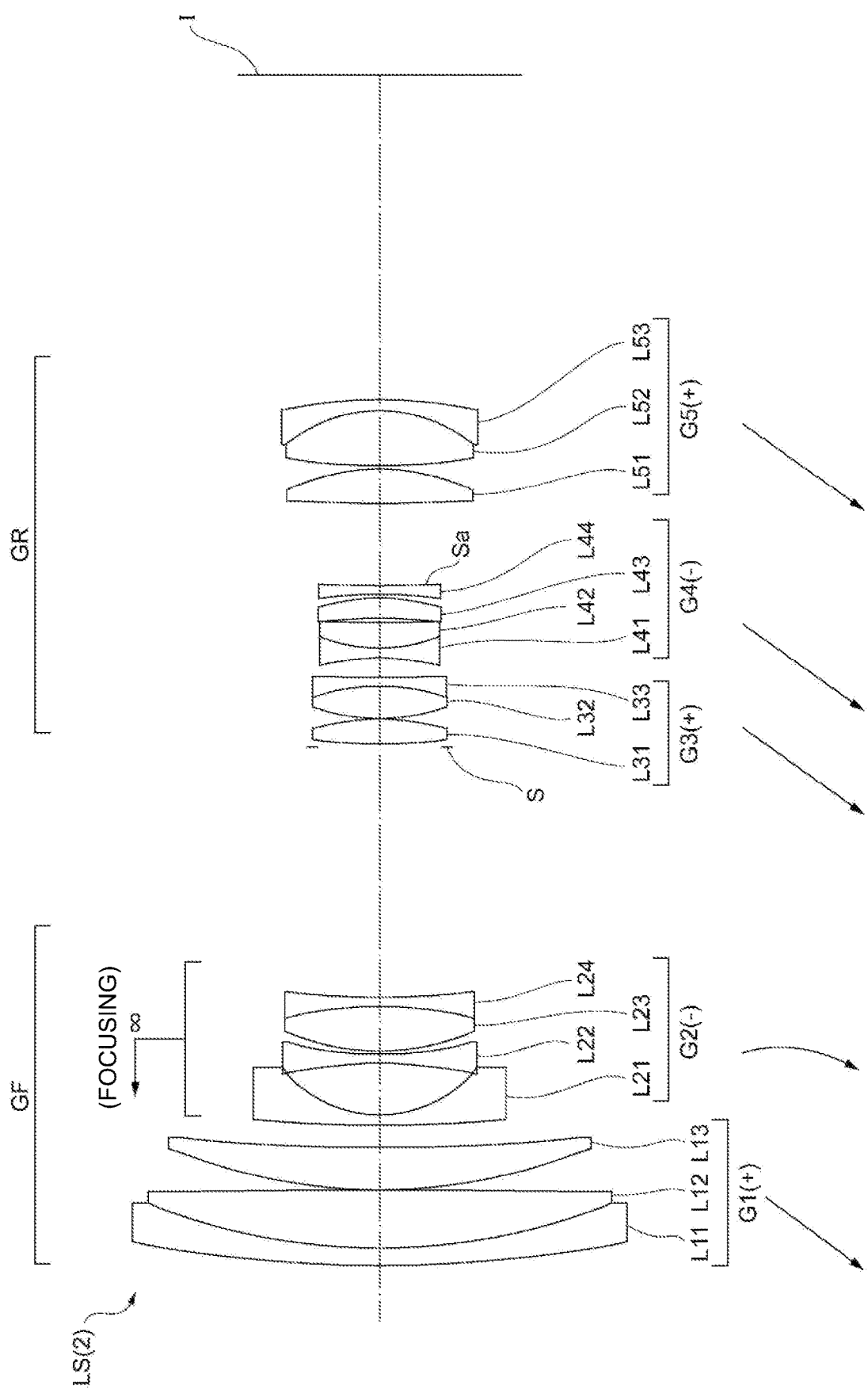
FIG. 3 is a lens configuration diagram of an optical system in a state upon focusing on infinity according to Second Example.

Second Example is described with reference to FIGS. 3 and 4A, 4B and 4C, and Table 2. FIG. 3 is a diagram showing a lens configuration of an optical system in a state upon focusing on infinity according to Second Example of this embodiment. The optical system LS(2) according to Second Example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in directions indicated by arrows in FIG. 3. The aperture stop S is disposed between the second lens group G2 and the third lens group G3.

The first lens group G1 consists of, in order from the object: a cemented lens consisting of a negative meniscus lens L11 having a convex surface facing the object, and a biconvex positive lens L12; and a positive meniscus lens L13 having a convex surface facing the object. In this Example, the positive meniscus lens L13 of the first lens group G1 corresponds to a specified lens that satisfies the conditional expressions (1) to (4) and the like.

The second lens group G2 consists of, in order from the object: a negative meniscus lens L21 having a convex surface facing the object; a biconcave negative lens L22; and a cemented lens consisting of a biconvex positive lens L23, and a biconcave negative lens L24. Upon focusing from the infinity object to the short-distant (finite distant) object, the second lens group G2 moves toward the object along the optical axis. The negative meniscus lens L21 is a hybrid type lens that includes a lens main body made of glass, and a resin layer provided on the object-side surface of the lens main body. The object-side surface of the resin layer is an aspherical surface. The negative meniscus lens L21 is a composite type aspherical surface lens. In [Lens Data] described later, the surface number 6 indicates the object-side surface of the resin layer, the surface number 7 indicates the image-side surface of the resin layer and the object-side surface of the lens main body (a surface on which both the elements are in contact), and the surface number 8 indicates the image-side surface of the lens main body.

The third lens group G3 consists of, in order from the object: a biconvex positive lens L31; and a cemented lens consisting of a biconvex positive lens L32 and a biconcave negative lens L33. The aperture stop S is disposed adjacent to the object side of the positive lens L31, and moves with the third lens group G3 upon zooming.

The fourth lens group G4 consists of, in order from the object: a cemented lens consisting of a biconcave negative lens L41 and a positive meniscus lens L42 having a convex surface facing the object; a positive meniscus lens L43 having a concave surface facing the object; and a biconcave negative lens L44. The fourth lens group G4 constitutes a vibration-proof lens group that is movable in a direction perpendicular to the optical axis, and corrects variation in imaging position due to a camera shake and the like (image blur on the image surface I). Note that a fixed aperture stop (flare cut stop) Sa is disposed adjacent to the image side of the negative lens L44.

The fifth lens group G5 consists of, in order from the object: a biconvex positive lens L51; and a cemented lens consisting of a biconvex positive lens L52 and a negative meniscus lens L53 having a concave surface facing the object. An image surface I is disposed on the image side of the fifth lens group G5.

In this Example, the cemented lens consisting of the negative meniscus lens L11 and the positive lens L12, the positive meniscus lens L13, the negative meniscus lens L21, the negative lens L22, the cemented lens consisting of the positive lens L23 and the negative lens L24 constitute the front group GF disposed closer to the object than the aperture stop S. The positive lens L31, the cemented lens consisting of the positive lens L32 and the negative lens L33, the cemented lens consisting of the negative lens L41 and the positive meniscus lens L42, the positive meniscus lens L43, the negative lens L44, the positive lens L51, and the cemented lens consisting of the positive lens L52 and the negative meniscus lens L53 constitute the rear group GR disposed closer to the image than the aperture stop S.

The following Table 2 lists values of data on the optical system according to Second Example.

TABLE 2

| [General Data] |
| Zooming ratio = 7.350 |

|  | W | M | T |
|---|---|---|---|
| f | 18.562 | 35.210 | 136.429 |
| FNO | 3.565 | 4.261 | 5.725 |
| 2ω | 79.728 | 43.847 | 11.914 |
| Y | 14.750 | 14.750 | 14.750 |
| TL | 147.043 | 159.329 | 197.172 |
| BF | 38.330 | 47.731 | 64.149 |
| fF | −21.071 | −26.512 | −62.674 |
| fR | 34.551 | 33.436 | 30.388 |

| [Lens Data] |

| Surface Number | R | D | nd | vd | θgF |
|---|---|---|---|---|---|
| 1 | 160.06970 | 2.000 | 1.80518 | 25.45 | 0.6157 |
| 2 | 72.85900 | 6.800 | 1.60311 | 60.69 | 0.5411 |
| 3 | −2257.79640 | 0.100 | | | |
| 4 | 65.68570 | 4.950 | 1.66106 | 56.09 | 0.5512 |
| 5 | 237.70390 | D5(Variable) | | | |
| 6* | 170.00150 | 0.150 | 1.55389 | 38.23 | 0.5985 |
| 7 | 152.15480 | 1.200 | 1.80610 | 40.97 | 0.5688 |
| 8 | 14.79840 | 6.030 | | | |
| 9 | −50.40310 | 1.000 | 1.80610 | 40.97 | 0.5688 |
| 10 | 41.82650 | 0.430 | | | |
| 11 | 28.25640 | 5.330 | 1.84666 | 23.78 | 0.6191 |
| 12 | −39.95900 | 1.000 | 1.77250 | 49.62 | 0.5518 |
| 13 | 103.33450 | D13(Variable) | | | |
| 14 | ∞ | 0.400 | | (Aperture Stop S) | |
| 15 | 66.90190 | 2.930 | 1.48749 | 70.31 | 0.5291 |
| 16 | −27.85660 | 0.100 | | | |
| 17 | 23.35290 | 3.850 | 1.59319 | 67.90 | 0.5440 |
| 18 | −23.34450 | 1.000 | 1.75520 | 27.57 | 0.6093 |
| 19 | 172.44420 | D19(Variable) | | | |
| 20 | −28.46170 | 1.180 | 1.77250 | 49.62 | 0.5518 |
| 21 | 18.92800 | 3.000 | 1.85026 | 32.35 | 0.5947 |

TABLE 2-continued

| | | | | | |
|---|---|---|---|---|---|
| 22 | 225.68110 | 0.500 | | | |
| 23 | −62.96650 | 2.400 | 1.75520 | 27.57 | 0.6093 |
| 24 | −23.41100 | 0.430 | | | |
| 25 | −55.81190 | 1.000 | 1.80610 | 40.97 | 0.5688 |
| 26 | 107.88980 | 0.800 | | | |
| 27 | ∞ | D27(Variable) | | | |
| 28 | 259.73390 | 4.030 | 1.54814 | 45.79 | 0.5686 |
| 29 | −24.93830 | 0.400 | | | |
| 30 | 69.14960 | 6.430 | 1.48749 | 70.31 | 0.5291 |
| 31 | −17.33550 | 1.300 | 1.90366 | 31.27 | 0.5948 |
| 32 | −57.92460 | BF | | | |

[Aspherical Surface Data]
6th Surface

κ = 1.000, A4 = 5.49E−06, A6 = −3.19E−08
A8 = 1.01E−10, A10 = −1.80E−13, A12 = 0.00E+00

[Variable Distance Data on Zoom Photographing]

| | W | M | T |
|---|---|---|---|
| D5 | 2.566 | 18.230 | 53.226 |
| D13 | 29.462 | 16.684 | 3.112 |
| D19 | 2.267 | 5.702 | 11.422 |
| D27 | 9.761 | 6.327 | 0.607 |

[Lens Group Data]

| Group | First surface | Focal length |
|---|---|---|
| G1 | 1 | 101.950 |
| G2 | 6 | −15.773 |
| G3 | 14 | 25.098 |
| G4 | 20 | −35.397 |
| G5 | 28 | 42.292 |

[Conditional Expression Corresponding Value]
<Positive meniscus lens L13(fLZ = 135.752)>

Conditional Expression(1)
ndLZ − (2.015 − 0.0068 × vdLZ) = 0.027
Conditional Expression(2)vdLZ = 56.09
Conditional Expression(3), (3-1)θgFLZ = 0.5512
Conditional Expression(4), (4-1)
θgFLZ − (0.6418 − 0.00168 × vdLZ) = 0.0036
Conditional Expression(5)|fLZ|/fF = −6.443
Conditional Expression(7)|fLZ|/f = 7.314
Conditional Expression(8)DLZ = 4.950

Figure 4B:
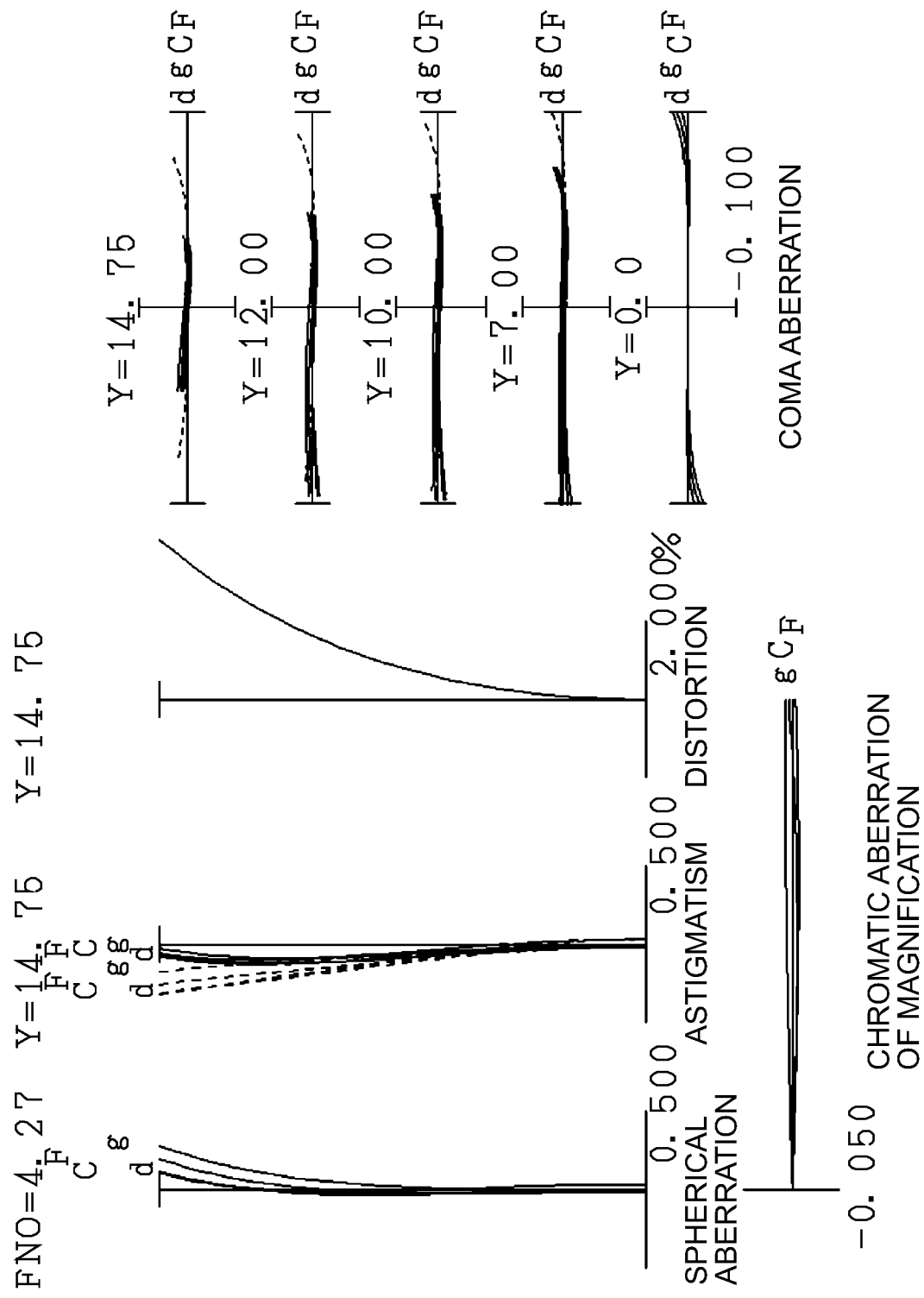

FIG. 4A shows various aberration graphs of the optical system according to Second Example upon focusing on infinity in the wide angle end state. FIG. 4B shows various aberration graphs of the optical system according to Second Example upon focusing on infinity in the intermediate focal length state. FIG. 4C shows various aberration graphs of the optical system according to Second Example upon focusing on infinity in the telephoto end state. The various aberration graphs show that the optical system according to Second Example has favorably corrected various aberrations, and exerts excellent imaging performance.

Third Example

Figure 5:
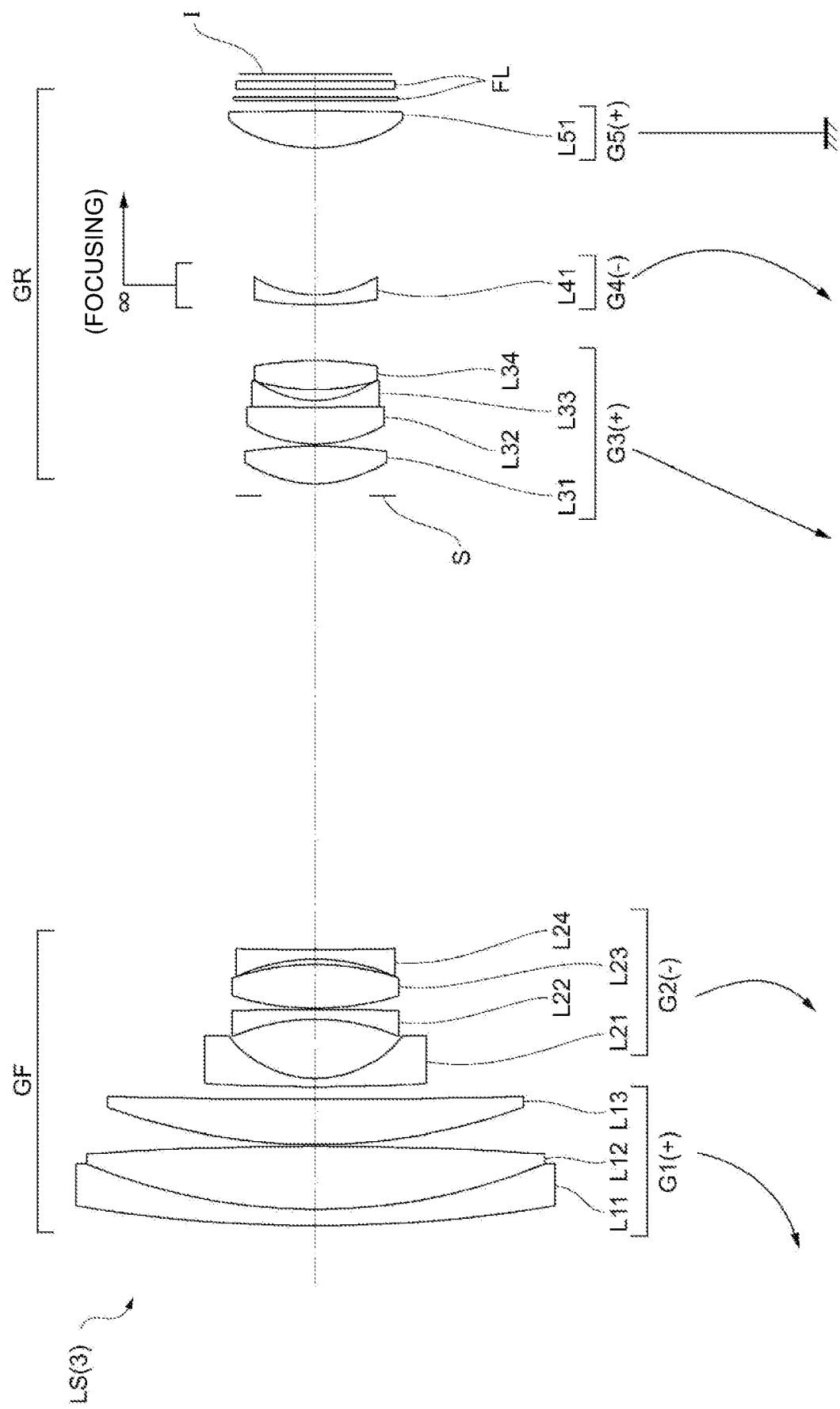
FIG. 5 is a lens configuration diagram of an optical system in a state upon focusing on infinity according to Third Example.

Third Example is described with reference to FIGS. 5 and 6A, 6B and 6C, and Table 3. FIG. 5 is a diagram showing a lens configuration of an optical system in a state upon focusing on infinity according to Third Example of this embodiment. The optical system LS(3) according to Third Example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fourth lens groups G1 to G4 move in directions indicated by arrows in FIG. 5. The aperture stop S is disposed between the second lens group G2 and the third lens group G3.

The first lens group G1 consists of, in order from the object: a cemented lens consisting of a negative meniscus lens L11 having a convex surface facing the object, and a biconvex positive lens L12; and a positive meniscus lens L13 having a convex surface facing the object. In this Example, the positive meniscus lens L13 of the first lens group G1 corresponds to a specified lens that satisfies the conditional expressions (1) to (4) and the like.

The second lens group G2 consists of, in order from the object: a negative meniscus lens L21 having a convex surface facing the object; a negative meniscus lens L22 having a concave surface facing the object; a biconvex positive lens L23; and a biconcave negative lens L24.

The third lens group G3 consists of, in order from the object: a biconvex positive lens L31; a cemented lens consisting of a positive meniscus lens L32 having a convex surface facing the object, and a negative meniscus lens L33 having a convex surface facing the object; and a biconvex positive lens L34. The third lens group G3 constitutes a vibration-proof lens group that is movable in a direction perpendicular to the optical axis, and corrects variation in imaging position due to a camera shake and the like (image blur on the image surface I). The aperture stop S is disposed adjacent to the object side of the positive lens L31, and moves with the third lens group G3 upon zooming. The positive lens L31 has opposite lens surfaces that are aspherical surfaces.

The fourth lens group G4 consists of a negative meniscus lens L41 having a convex surface facing the object. Upon focusing from the infinity object to the short-distant (finite distant) object, the fourth lens group G4 moves toward the image along the optical axis.

The fifth lens group G5 consists of a biconvex positive lens L51. An image surface I is disposed on the image side of the fifth lens group G5. The positive lens L51 has an object-side lens surface that is an aspherical surface. An optical filter FL is disposed between the fifth lens group G5 and the image surface I. The optical filter FL may be, for example, an NC filter (neutral color filter), a color filter, a polarizing filter, an ND filter (neutral density filter), an IR filter (infrared cutoff filter) or the like.

In this Example, the cemented lens consisting of the negative meniscus lens L11 and the positive lens L12, the positive meniscus lens L13, the negative meniscus lens L21, the negative meniscus lens L22, the positive lens L23, and the negative lens L24 constitute the front group GF disposed closer to the object than the aperture stop S. The positive lens L31, the cemented lens consisting of the positive meniscus lens L32 and the negative meniscus lens L33, the positive lens L34, the negative meniscus lens L41, and the positive lens L51 constitute the rear group GR disposed closer to the image than the aperture stop S.

The following Table 3 lists values of data on the optical system according to Third Example.

TABLE 3

[General Data]
Zooming ratio = 32.853

| | W | M | T |
|---|---|---|---|
| f | 4.432 | 10.612 | 145.612 |
| FNO | 3.517 | 4.350 | 7.648 |
| 2ω | 85.088 | 40.382 | 3.059 |
| Y | 3.300 | 4.000 | 4.000 |
| TL | 68.023 | 68.791 | 99.945 |
| BF | 0.400 | 0.400 | 0.400 |
| fF | −7.489 | −9.624 | −57.480 |
| fR | 19.941 | 22.639 | −39.152 |

[Lens Data]

| Surface Number | R | D | nd | vd | θgF |
|---|---|---|---|---|---|
| 1 | 85.30695 | 0.950 | 1.85026 | 32.35 | 0.5947 |
| 2 | 35.10887 | 3.750 | 1.49700 | 81.73 | 0.5371 |
| 3 | −199.02101 | 0.100 | | | |
| 4 | 35.51343 | 2.650 | 1.62731 | 59.30 | 0.5583 |
| 5 | 407.61568 | D5(Variable) | | | |
| 6 | 119.76222 | 0.500 | 1.78800 | 47.35 | 0.5559 |
| 7 | 6.54053 | 3.500 | | | |
| 8 | −12.14658 | 0.550 | 1.90366 | 31.31 | 0.5947 |
| 9 | −539.42059 | 0.100 | | | |
| 10 | 17.08985 | 2.600 | 1.92286 | 20.88 | 0.6390 |
| 11 | −15.28142 | 0.315 | | | |
| 12 | −11.12109 | 0.550 | 1.80440 | 39.61 | 0.5719 |
| 13 | 165.37200 | D13(Variable) | | | |
| 14 | ∞ | 0.700 | (Aperture Stop S) | | |
| 15* | 7.30358 | 2.200 | 1.49710 | 81.56 | 0.5385 |
| 16* | −22.98363 | 0.100 | | | |
| 17 | 7.85006 | 2.200 | 1.53172 | 48.78 | 0.5622 |
| 18 | 274.32025 | 0.400 | 1.91082 | 35.25 | 0.5822 |
| 19 | 5.97566 | 0.650 | | | |
| 20 | 14.69669 | 1.700 | 1.49700 | 81.73 | 0.5371 |
| 21 | −20.28040 | D21(Variable) | | | |
| 22 | 20.19905 | 0.600 | 1.49700 | 81.73 | 0.5371 |
| 23 | 6.78416 | D23(Variable) | | | |
| 24* | 10.00000 | 2.200 | 1.53113 | 55.75 | 0.5628 |
| 25 | −164.68126 | 0.600 | | | |
| 26 | ∞ | 0.210 | 1.51680 | 63.88 | 0.5360 |
| 27 | ∞ | 0.450 | | | |
| 28 | ∞ | 0.500 | 1.51680 | 63.88 | 0.5360 |
| 29 | ∞ | BF | | | |

[Aspherical Surface Data]

15th Surface

κ = 0.896, A4 = 1.84310E−04, A6 = −1.16172E−06
A8 = 0.00000E+00, A10 = 0.00000E+00, A12 = 0.00000E+00

16th Surface

κ = 1.000, A4 = 1.84659E−04, A6 = −7.65864E−07
A8 = 4.06410E−08, A10 = 0.00000E+00, A12 = 0.00000E+00

24th Surface

κ = 2.716 , A4 = −3.76188E−05, A6 = −3.07675E−07
A8 = 0.00000E+00, A10 = 0.00000E+00, A12 = 0.00000E+00

[Variable Distance Data on Zoom Photographing]

| | W | M | T |
|---|---|---|---|
| D5 | 0.742 | 10.482 | 38.914 |
| D13 | 26.839 | 13.689 | 2.261 |
| D21 | 3.294 | 9.196 | 14.996 |
| D23 | 8.674 | 6.949 | 15.300 |

TABLE 3-continued

[Lens Group Data]

| Group | First surface | Focal length |
|---|---|---|
| G1 | 1 | 53.961 |
| G2 | 6 | −6.091 |
| G3 | 14 | 11.902 |
| G4 | 22 | −20.863 |
| G5 | 24 | 17.828 |

[Conditional Expression Corresponding Value]
<Positive meniscus lens L13(fLZ = 61.845)>

Conditional Expression(1)
ndLZ − (2.015 − 0.0068 × vdLZ) = 0.016
Conditional Expression(2)vdLZ = 59.30
Conditional Expression(3), (3-1)θgFLZ = 0.5583
Conditional Expression(4), (4-1)
θgFLZ − (0.6418 − 0.00168 × vdLZ) = 0.0161
Conditional Expression(5)|fLZ|/fF = −8.258
Conditional Expression(7)|fLZ|/f = 13.954
Conditional Expression(8)DLZ = 2.650

Figure 6B:
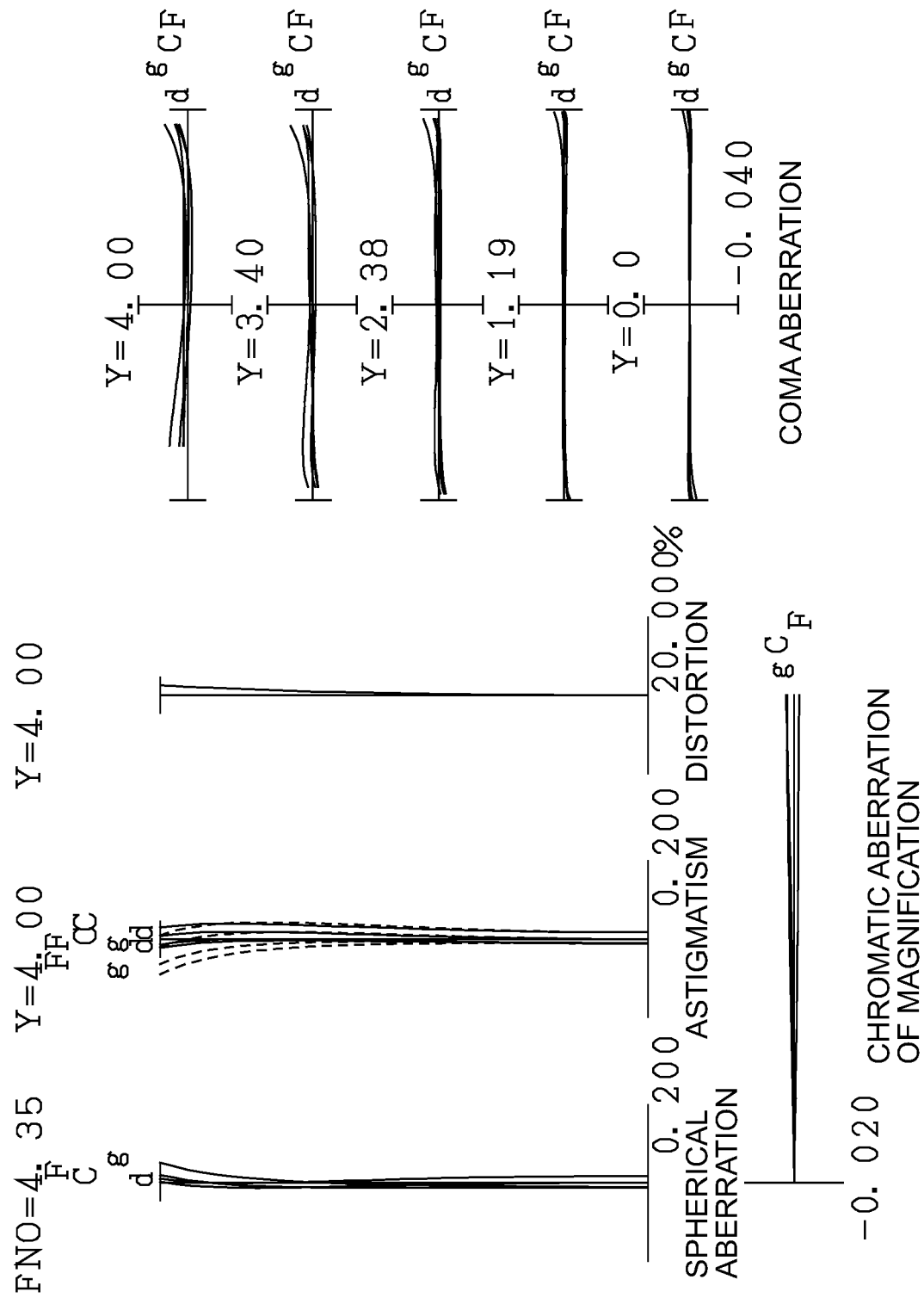

FIG. 6A shows various aberration graphs of the optical system according to Third Example upon focusing on infinity in the wide angle end state. FIG. 6B shows various aberration graphs of the optical system according to Third Example upon focusing on infinity in the intermediate focal length state. FIG. 6C shows various aberration graphs of the optical system according to Third Example upon focusing on infinity in the telephoto end state. The various aberration graphs show that the optical system according to Third Example has favorably corrected various aberrations, and exerts excellent imaging performance.

Fourth Example

Figure 7:
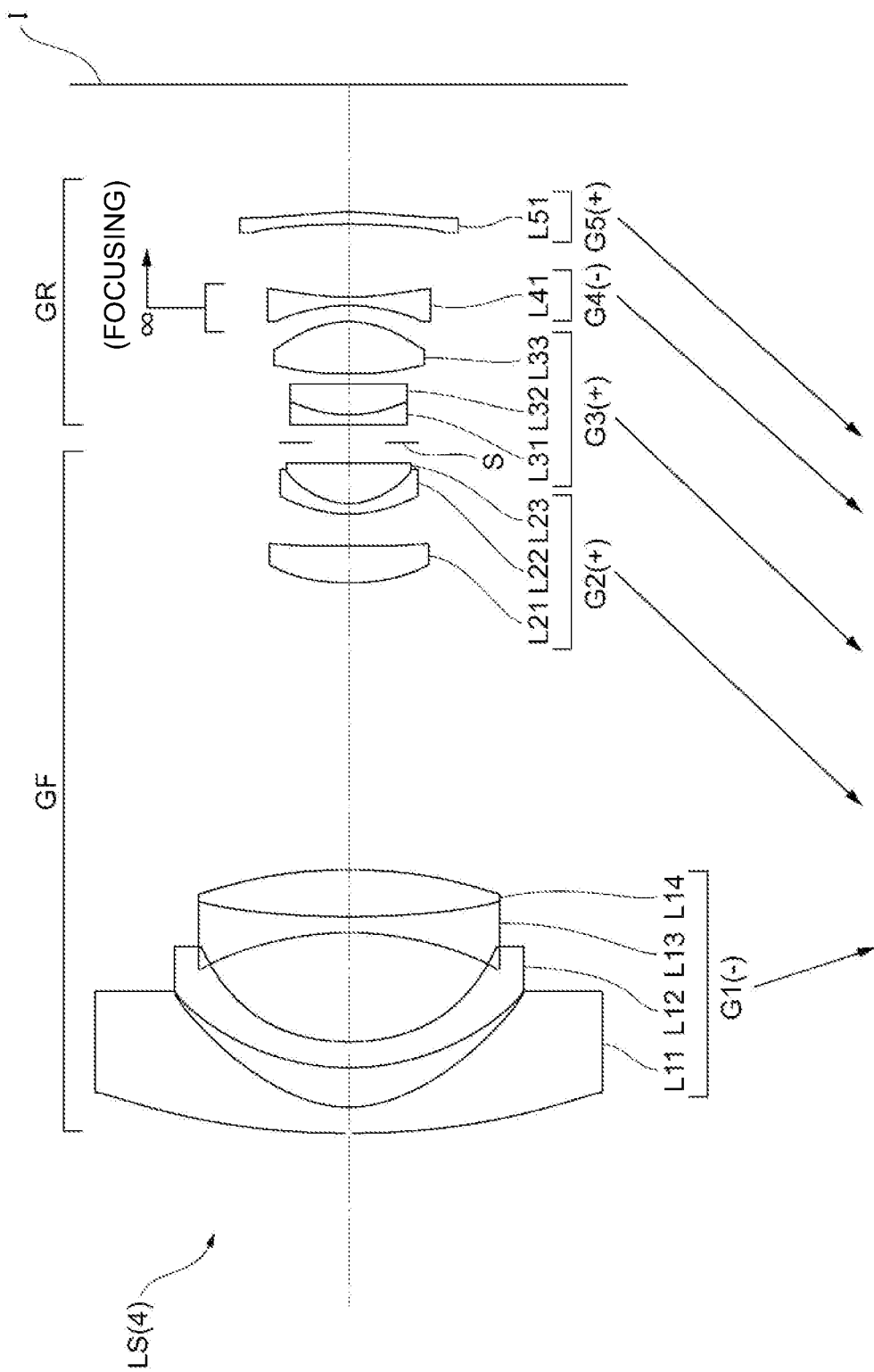
FIG. 7 is a lens configuration diagram of an optical system in a state upon focusing on infinity according to Fourth Example.

Fourth Example is described with reference to FIGS. 7 and 8A, 8B and 8C, and Table 4. FIG. 7 is a diagram showing a lens configuration of an optical system in a state upon focusing on infinity according to Fourth Example of this embodiment. The optical system LS(4) according to Fourth Example consists of, in order from the object: a first lens group G1 having a negative refractive power; a second lens group G2 having a positive refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in directions indicated by arrows in FIG. 7. The aperture stop S is disposed between the second lens group G2 and the third lens group G3.

The first lens group G1 consists of, in order from the object: a negative meniscus lens L11 having a convex surface facing the object; a negative meniscus lens L12 having a convex surface facing the object; a biconcave negative lens L13; and a biconvex positive lens L14. In this Example, the negative meniscus lens L11, the negative meniscus lens L12 and the negative lens L13 of the first lens group G1 correspond to a specified lens that satisfies the conditional expressions (1) to (4) and the like. The negative meniscus lens L11 has an image-side lens surface that is an aspherical surface. The negative meniscus lens L12 has an image-side lens surface that is an aspherical surface.

The second lens group G2 consists of, in order from the object: a positive meniscus lens L21 having a convex surface facing the object; and a cemented lens consisting of a negative meniscus lens L22 having a convex surface facing the object, and a positive meniscus lens L23 having a convex surface facing the object. The aperture stop S is disposed adjacent to the image side of the positive meniscus lens L23, and moves with the second lens group G2 upon zooming.

The third lens group G3 consists of, in order from the object: a cemented lens consisting of a biconcave negative lens L31 and a biconvex positive lens L32; and a biconvex positive lens L33. The positive lens L32 has an image-side lens surface that is an aspherical surface.

The fourth lens group G4 consists of a biconcave negative lens L41. Upon focusing from the infinity object to the short-distant (finite distant) object, the fourth lens group G4 moves toward the image along the optical axis.

The fifth lens group G5 consists of a positive meniscus lens L51 having a concave surface facing the object. An image surface I is disposed on the image side of the fifth lens group G5. The positive meniscus lens L51 has an image-side lens surface that is an aspherical surface.

In this Example, the negative meniscus lens L11, the negative meniscus lens L12, the negative lens L13, the positive lens L14, the positive meniscus lens L21, and the cemented lens consisting of the negative meniscus lens L22 and the positive meniscus lens L23 constitute the front group GF disposed closer to the object than the aperture stop S. The cemented lens consisting of the negative lens L31 and the positive lens L32, the positive lens L33, the negative lens L41, and the positive meniscus lens L51 constitute the rear group GR disposed closer to the image than the aperture stop S.

The following Table 4 lists values of data on the optical system according to Fourth Example.

TABLE 4

[General Data]
Zooming ratio = 2.018

|  | W | M | T |
|---|---|---|---|
| f | 14.420 | 20.000 | 29.100 |
| FNO | 4.073 | 4.072 | 4.066 |
| 2ω | 115.788 | 91.602 | 67.988 |
| Y | 20.500 | 20.500 | 20.500 |
| TL | 121.803 | 110.314 | 103.827 |
| BF | 15.000 | 23.093 | 30.403 |
| fF | 12.336 | 18.020 | 29.688 |
| fR | −249.182 | −357.800 | −1948.200 |

[Lens Data]

| Surface Number | R | D | nd | vd | θgF |
|---|---|---|---|---|---|
| 1 | 92.62990 | 3.000 | 1.68348 | 54.80 | 0.5501 |
| 2* | 15.67070 | 4.579 | | | |
| 3 | 28.37140 | 2.900 | 1.68348 | 54.80 | 0.5501 |
| 4* | 21.12170 | 12.704 | | | |
| 5 | −37.55490 | 1.900 | 1.68348 | 54.80 | 0.5501 |
| 6 | 88.75380 | 0.100 | | | |
| 7 | 98.47090 | 5.412 | 1.86109 | 34.82 | 0.5864 |
| 8 | −53.58090 | D8(Variable) | | | |
| 9 | 20.49420 | 4.232 | 1.59349 | 67.00 | 0.5358 |
| 10 | 164.24190 | 3.859 | | | |
| 11 | 16.69960 | 1.200 | 1.88300 | 40.66 | 0.5668 |
| 12 | 8.68950 | 4.536 | 1.52748 | 56.00 | 0.5481 |
| 13 | 180.51560 | 2.500 | | | |
| 14 | ∞ | D14(Variable) | | (Aperture Stop S) | |
| 15 | −357.35260 | 1.100 | 1.81600 | 46.59 | 0.5567 |
| 16 | 14.59730 | 3.507 | 1.49782 | 82.57 | 0.5386 |
| 17* | −561.45740 | 1.192 | | | |
| 18 | 36.97580 | 6.029 | 1.49782 | 82.57 | 0.5386 |
| 19 | −12.85510 | D19(Variable) | | | |
| 20 | −20.05630 | 1.000 | 1.55199 | 62.60 | 0.5377 |
| 21 | 48.74520 | D21(Variable) | | | |
| 22 | −64.12910 | 1.200 | 1.51680 | 63.88 | 0.5360 |
| 23* | −53.18510 | BF | | | |

[Aspherical Surface Data]

2nd Surface

κ = 0.000, A4 = −9.16E−07, A6 = 3.00E−08
A8 = −1.16E−10, A10 = 1.53E−13, A12 = 0.00E+00

4th Surface

κ = 0.000, A4 = 3.15E−05, A6 = −2.15E−08
A8 = 4.46E−10, A10 = −1.10E−12, A12 = 2.22E−15

17th Surface

κ = 1.000, A4 = 5.91E−05, A6 = 1.04E−07
A8 = 3.02E−09, A10 = −4.09E−11, A12 = 0.00E+00

23rd Surface

κ = 1.000, A4 = 3.06E−05, A6 = 2.73E−08
A8 = −4.72E−11, A10 = 7.08E−13, A12 = 0.00E+00

[Variable Distance Data on Zoom Photographing]

|  | W | M | T |
|---|---|---|---|
| D8 | 33.229 | 16.105 | 1.500 |
| D14 | 2.125 | 2.115 | 2.279 |
| D19 | 2.000 | 2.982 | 4.774 |
| D21 | 8.500 | 5.069 | 3.922 |

[Lens Group Data]

| Group | First surface | Focal length |
|---|---|---|
| G1 | 1 | −23.700 |
| G2 | 9 | 28.300 |
| G3 | 15 | 28.700 |
| G4 | 20 | −25.600 |
| G5 | 22 | 581.300 |

[Conditional Expression Corresponding Value]

<Negative meniscus lens L11(fLZ = −28.041)>

Conditional Expression(1)
ndLZ − (2.015 − 0.0068 × vdLZ) = 0.041
Conditional Expression(2)vdLZ = 54.80
Conditional Expression(3), (3-1)θgFLZ = 0.5501
Conditional Expression(4), (4-1)
θgFLZ − (0.6418 − 0.00168 × vdLZ) = 0.0004
Conditional Expression(5)|fLZ|/fF = 2.273
Conditional Expression(7)|fLZ|/f = 1.945
Conditional Expression(8)DLZ = 3.000

<Negative meniscus lens L12(fLZ = −144.389)>

Conditional Expression(1)
ndLZ − (2.015 − 0.0068 × vdLZ) = 0.041
Conditional Expression(2)vdLZ = 54.80
Conditional Expression(3), (3-1)θgFLZ = 0.5501
Conditional Expression(4), (4-1)
θgFLZ − (0.6418 − 0.00168 × vdLZ) = 0.0004
Conditional Expression(5)|fLZ|/fF = 11.705
Conditional Expression(7)|fLZ|/f = 10.013
Conditional Expression(8)DLZ = 2.900

<Negative lens L13(fLZ = −38.375)>

Conditional Expression(1)
ndLZ − (2.015 − 0.0068 × vdLZ) = 0.041
Conditional Expression(2)vdLZ = 54.80
Conditional Expression(3), (3-1)θgFLZ = 0.5501
Conditional Expression(4), (4-1)
θgFLZ − (0.6418 − 0.00168 × vdLZ) = 0.0004
Conditional Expression(5)|fLZ|/fF = 3.111
Conditional Expression(7)|fLZ|/f = 2.661
Conditional Expression(8)DLZ = 1.900

Figure 8B:
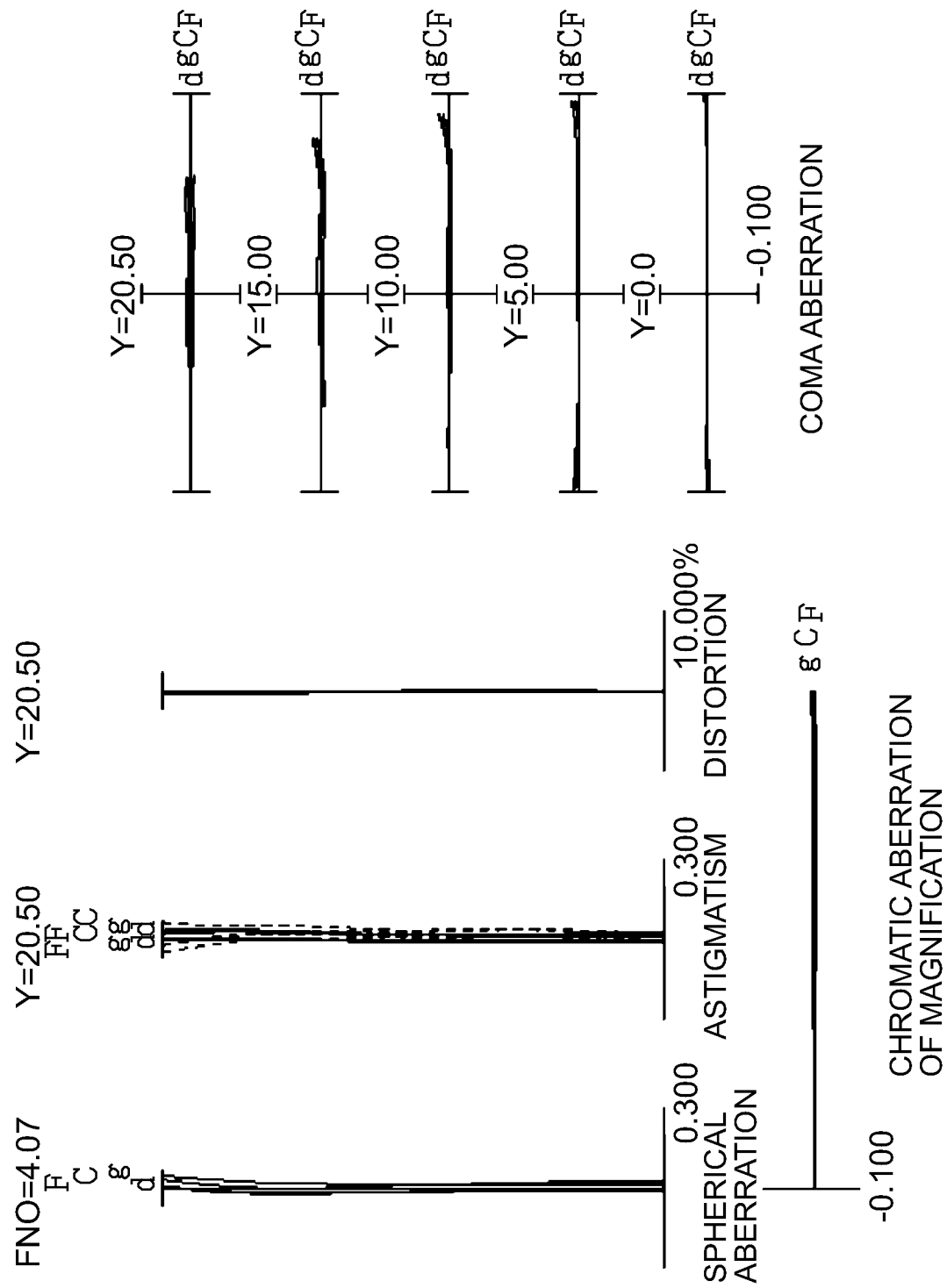

FIG. 8A shows various aberration graphs of the optical system according to Fourth Example upon focusing on infinity in the wide angle end state. FIG. 8B shows various aberration graphs of the optical system according to Fourth Example upon focusing on infinity in the intermediate focal length state. FIG. 8C shows various aberration graphs of the optical system according to Fourth Example upon focusing on infinity in the telephoto end state. The various aberration graphs show that the optical system according to Fourth Example has favorably corrected various aberrations, and exerts excellent imaging performance.

Fifth Example

Figure 9:
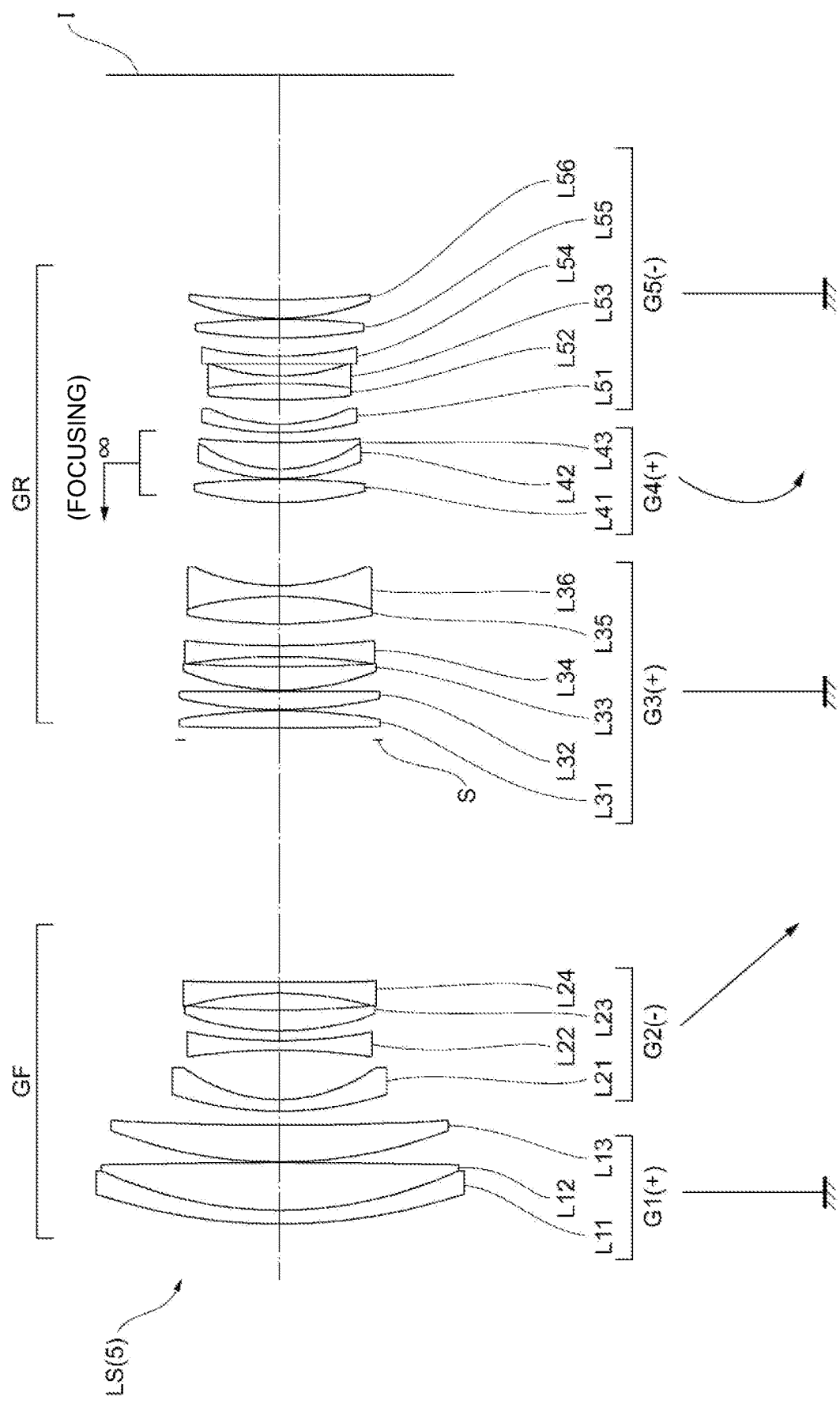
FIG. 9 is a lens configuration diagram of an optical system in a state upon focusing on infinity according to Fifth Example.

Fifth Example is described with reference to FIGS. 9 and 10A, 10B and 10C and Table 5. FIG. 9 is a diagram showing a lens configuration of an optical system in a state upon focusing on infinity according to Fifth Example of this embodiment. The optical system LS(5) according to Fifth Example consists of, in order from the object: a first lens group G1 having a positive refractive power; a second lens group G2 having a negative refractive power; a third lens group G3 having a positive refractive power; a fourth lens group G4 having a positive refractive power; and a fifth lens group G5 having a negative refractive power. Upon zooming from the wide-angle end state (W) to the telephoto end state (T), the second lens groups G2 and the fourth lens group G4 move in directions indicated by arrows in FIG. 9. The aperture stop S is disposed between the second lens group G2 and the third lens group G3.

The first lens group G1 consists of, in order from the object: a cemented lens consisting of a negative meniscus lens L11 having a convex surface facing the object, and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a positive meniscus lens L23 having a convex surface facing the object; and a biconcave negative lens L24. In this Example, the negative meniscus lens L21, the negative lens L22 and the negative lens L24 of the second lens group G2 correspond to a specified lens that satisfies the conditional expressions (1) to (4) and the like.

The third lens group G3 consists of, in order from the object: a biconvex positive lens L31; a plano-convex positive lens L32 having a convex surface facing the object; a positive meniscus lens L33 having a convex surface facing the object; a biconcave negative lens L34; and a cemented lens consisting of a biconvex positive lens L35, and a biconcave negative lens L36. The aperture stop S is disposed adjacent to the object side of the positive lens L31, and moves with the third lens group G3 upon zooming.

The fourth lens group G4 consists of, in order from the object: a biconvex positive lens L41; and a cemented lens consisting of a negative meniscus lens L42 having a convex surface facing the object, and a positive meniscus lens L43 having a convex surface facing the object. Upon focusing from the infinity object to the short-distant (finite distant) object, the fourth lens group G4 moves toward the object along the optical axis.

The fifth lens group G5 consists of, in order from the object: a negative meniscus lens L51 having a convex surface facing the object; a cemented lens consisting of a biconvex positive lens L52, and a biconcave negative lens L53; a plano-concave negative lens L54 having a concave surface facing the image; a biconvex positive lens L55; and a positive meniscus lens L56 having a convex surface facing the object. An image surface I is disposed on the image side of the fifth lens group G5. The cemented lens consisting of the positive lens L52 and the negative lens L53, and the negative lens L54 of the fifth lens group G5 constitute a vibration-proof lens group (partial group) that is movable in a direction perpendicular to the optical axis, and corrects variation in imaging position due to a camera shake and the like (image blur on the image surface I).

In this Example, the cemented lens consisting of the negative meniscus lens L11 and the positive lens L12, the positive meniscus lens L13, the negative meniscus lens L21, the negative lens L22, the positive meniscus lens L23, and the negative lens L24 constitute the front group GF disposed closer to the object than the aperture stop S. The positive lens L31, the positive lens L32, the positive meniscus lens L33, the negative lens L34, the cemented lens consisting of the positive lens L35 and the negative lens L36, the positive lens L41, the cemented lens consisting of the negative meniscus lens L42 and the positive meniscus lens L43, the negative meniscus lens L51, the cemented lens consisting of the positive lens L52 and the negative lens L53, the negative lens L54, the positive lens L55, and the positive meniscus lens L56 constitute the rear group GR disposed closer to the image than the aperture stop S.

The following Table 5 lists values of data on the optical system according to Fifth Example.

TABLE 5

[General Data]
Zooming ratio = 2.745

| | W | M | T |
|---|---|---|---|
| f | 71.400 | 140.000 | 196.000 |
| FNO | 2.865 | 2.937 | 2.862 |
| 2ω | 33.666 | 17.094 | 12.198 |
| Y | 21.600 | 21.600 | 21.600 |
| TL | 245.880 | 245.880 | 245.880 |
| BF | 53.818 | 53.818 | 53.818 |
| fF | −86.769 | −153.380 | −238.187 |
| fR | 67.044 | 63.889 | 67.044 |

[Lens Data]

| Surface Number | R | D | nd | νd | θgF |
|---|---|---|---|---|---|
| 1 | 120.99680 | 2.800 | 1.95000 | 29.37 | 0.6002 |
| 2 | 87.12840 | 9.900 | 1.49782 | 82.57 | 0.5386 |
| 3 | −1437.70340 | 0.100 | | | |
| 4 | 97.36390 | 7.700 | 1.45600 | 91.37 | 0.5342 |
| 5 | 657.25840 | D5(Variable) | | | |
| 6 | 73.32110 | 2.400 | 1.68348 | 54.80 | 0.5501 |
| 7 | 33.43260 | 10.250 | | | |
| 8 | −134.27600 | 2.000 | 1.62731 | 59.30 | 0.5584 |
| 9 | 104.31770 | 2.000 | | | |
| 10 | 55.93640 | 4.400 | 1.84666 | 23.78 | 0.6192 |
| 11 | 193.35670 | 3.550 | | | |
| 12 | −72.87930 | 2.200 | 1.62731 | 59.30 | 0.5584 |
| 13 | 610.02530 | D13(Variable) | | | |
| 14 | ∞ | 2.500 | | (Aperture Stop S) | |
| 15 | 667.50610 | 3.700 | 1.83481 | 42.73 | 0.5648 |
| 16 | −127.34870 | 0.200 | | | |
| 17 | 91.74030 | 3.850 | 1.59319 | 67.90 | 0.5440 |
| 18 | ∞ | 0.200 | | | |
| 19 | 52.70200 | 4.900 | 1.49782 | 82.57 | 0.5386 |
| 20 | 340.98300 | 2.120 | | | |
| 21 | −123.54810 | 2.200 | 2.00100 | 29.13 | 0.5995 |
| 22 | 172.97240 | 4.550 | | | |
| 23 | 104.97670 | 5.750 | 1.90265 | 35.72 | 0.5804 |
| 24 | −70.95230 | 2.200 | 1.58144 | 40.98 | 0.5763 |
| 25 | 42.96180 | D25(Variable) | | | |

TABLE 5-continued

| | | | | | |
|---|---|---|---|---|---|
| 26 | 69.69710 | 4.800 | 1.49782 | 82.57 | 0.5386 |
| 27 | −171.29750 | 0.100 | | | |
| 28 | 43.33010 | 2.000 | 1.95000 | 29.37 | 0.6002 |
| 29 | 28.62160 | 5.550 | 1.59319 | 67.90 | 0.5440 |
| 30 | 175.11530 | D30(Variable) | | | |
| 31 | 59.19620 | 1.800 | 1.80400 | 46.60 | 0.5575 |
| 32 | 33.42540 | 5.150 | | | |
| 33 | 127.38170 | 3.350 | 1.84666 | 23.78 | 0.6192 |
| 34 | −127.38220 | 1.600 | 1.68348 | 54.80 | 0.5501 |
| 35 | 43.09820 | 2.539 | | | |
| 36 | ∞ | 1.600 | 1.95375 | 32.32 | 0.5901 |
| 37 | 71.19380 | 3.750 | | | |
| 38 | 107.03200 | 3.850 | 1.59319 | 67.90 | 0.5440 |
| 39 | −166.05150 | 0.150 | | | |
| 40 | 49.83700 | 3.900 | 1.71999 | 50.27 | 0.5527 |
| 41 | 161.11230 | BF | | | |

[Variable Distance Data on Zoom Photographing]

| | W | M | T |
|---|---|---|---|
| D5 | 2.882 | 35.671 | 50.879 |
| D13 | 50.300 | 17.511 | 2.303 |
| D25 | 17.270 | 14.466 | 17.270 |
| D30 | 2.000 | 4.804 | 2.000 |

[Lens Group Data]

| Group | First surface | Focal length |
|---|---|---|
| G1 | 1 | 143.763 |
| G2 | 6 | −45.569 |
| G3 | 14 | 90.760 |
| G4 | 26 | 60.061 |
| G5 | 31 | −112.026 |

[Conditional Expression Corresponding Value]

<Negative meniscus lens L21(fLZ = −92.166)>

Conditional Expression(1)
ndLZ − (2.015 − 0.0068 × vdLZ) = 0.041
Conditional Expression(2)vdLZ = 54.80
Conditional Expression(3), (3-1)θgFLZ = 0.5501
Conditional Expression(4), (4-1)
θgFLZ − (0.6418 − 0.00168 × vdLZ) = 0.0004
Conditional Expression(5)|fLZ|/fF = −1.062
Conditional Expression(7)|fLZ|/f = 1.291
Conditional Expression(8)DLZ = 2.400

<Negative lens L22(fLZ = −93.285)>

Conditional Expression(1)
ndLZ − (2.015 − 0.0068 × vdLZ) = 0.016
Conditional Expression(2)vdLZ = 59.30
Conditional Expression(3), (3-1)θgFLZ = 0.5584
Conditional Expression(4), (4-1)
θgFLZ − (0.6418 − 0.00168 × vdLZ) = 0.0162
Conditional Expression(5)|fLZ|/fF = −1.075
Conditional Expression(7)|fLZ|/f = 1.307
Conditional Expression(8)DLZ = 2.000

<Negative lens L24(fLZ = −103.650)>

Conditional Expression(1)
ndLZ − (2.015 − 0.0068 × vdLZ) = 0.016
Conditional Expression(2)vdLZ = 59.30
Conditional Expression(3), (3-1)θgFLZ = 0.5584
Conditional Expression(4), (4-1)
θgFLZ − (0.6418 − 0.00168 × vdLZ) = 0.0162
Conditional Expression(5)|fLZ|/fF = −1.195
Conditional Expression(7)|fLZ|/f = 1.452
Conditional Expression(8)DLZ = 2.200

FIG. 10A shows various aberration graphs of the optical system according to Fifth Example upon focusing on infinity in the wide angle end state. FIG. 10B shows various aberration graphs of the optical system according to Fifth Example upon focusing on infinity in the intermediate focal length state. FIG. 10C shows various aberration graphs of the optical system according to Fifth Example upon focusing on infinity in the telephoto end state. The various aberration graphs show that the optical system according to Fifth Example has favorably corrected various aberrations, and exerts excellent imaging performance.

Sixth Example

Figure 11:
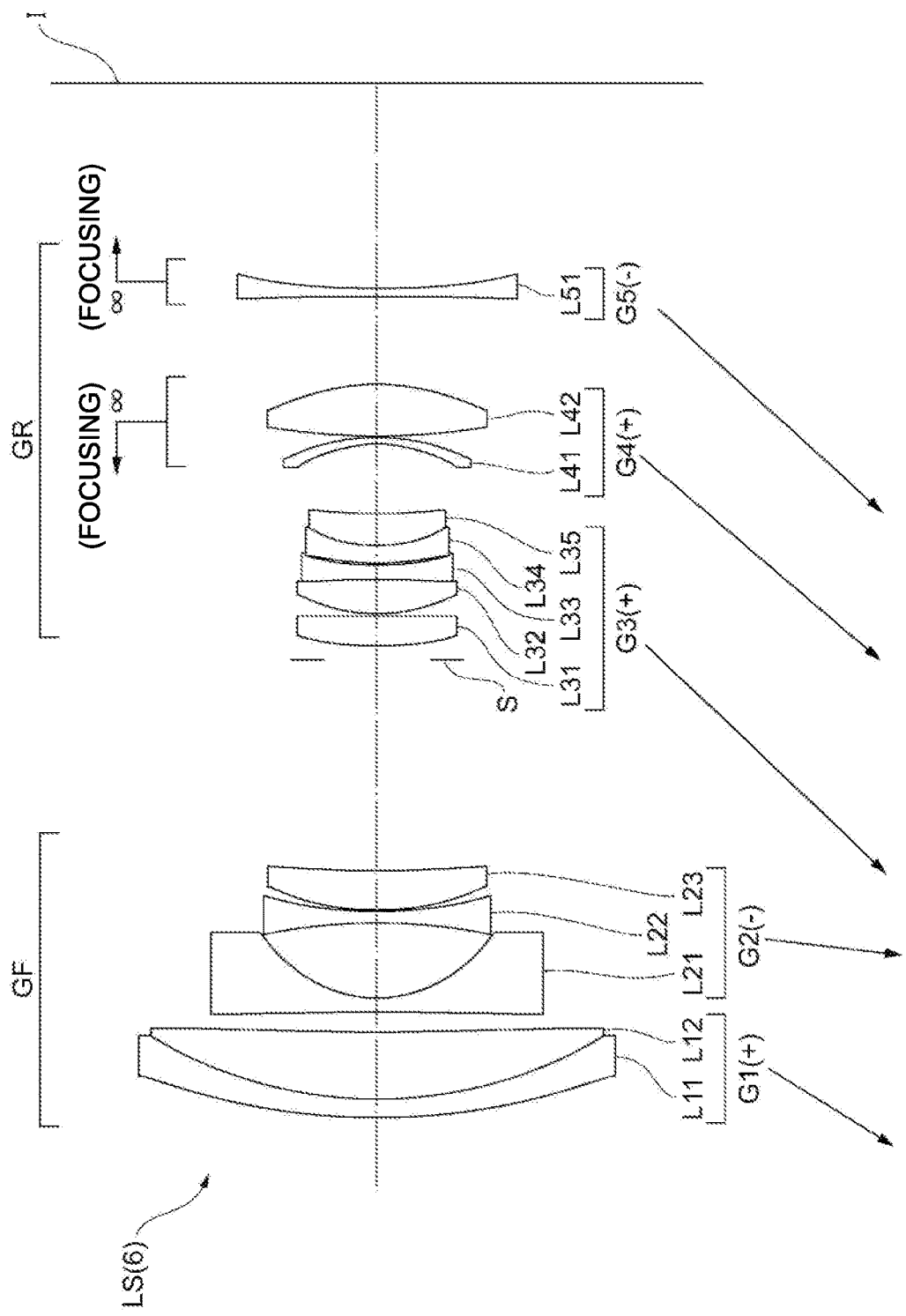
FIG. 11 is a lens configuration diagram of an optical system in a state upon focusing on infinity according to Sixth Example.

Sixth Example is described with reference to FIGS. 11 and 12A, 12B and 12C, and Table 6. FIG. 11 is a diagram showing a lens configuration of an optical system in a state upon focusing on infinity according to Sixth Example of this embodiment. The optical system LS(6) according to Sixth Example consists of, in order from the object: a first lens group G1 having a positive refractive power; a second lens group G2 having a negative refractive power; a third lens group G3 having a positive refractive power; a fourth lens group G4 having a positive refractive power; and a fifth lens group G5 having a negative refractive power. Upon zooming from the wide-angle end state (W) to the telephoto end state (T), the first to fifth lens groups G1 to G5 move in directions indicated by arrows in FIG. 11. The aperture stop S is disposed between the second lens group G2 and the third lens group G3.

The first lens group G1 consists of, in order from the object, a cemented lens consisting of a negative meniscus lens L11 having a convex surface facing the object, and a positive meniscus lens L12 having a convex surface facing the object.

The second lens group G2 consists of, in order from the object: a biconcave negative lens L21; a biconcave negative lens L22; and a positive meniscus lens L23 having a convex surface facing the object. The negative meniscus lens L21 has an object-side lens surface that is an aspherical surface. The negative lens L21 has an image-side lens surface that is an aspherical surface.

The third lens group G3 consists of, in order from the object: a biconvex positive lens L31; a cemented lens consisting of a biconvex positive lens L32 and a biconcave negative lens L33; and a cemented lens consisting of a negative meniscus lens L34 having a convex surface facing the object, and a positive meniscus lens L35 having a convex surface facing the object. The aperture stop S is disposed adjacent to the object side of the positive lens L31, and moves with the third lens group G3 upon zooming. In this Example, the positive lens L31 of the third lens group G3 corresponds to a specified lens that satisfies the conditional expressions (1) to (4) and the like. The positive lens L31 has an object-side lens surface that is an aspherical surface.

The fourth lens group G4 consists of, in order from the object: a negative meniscus lens L41 having a concave surface facing the object; and a biconvex positive lens L42. Upon focusing from the infinity object to the short-distant (finite distant) object, the fourth lens group G4 moves toward the object along the optical axis, and the fifth lens group G5 moves toward the image along the optical axis. The positive lens L42 has an image-side lens surface that is an aspherical surface.

The fifth lens group G5 consists of a biconcave negative lens L51. An image surface I is disposed on the image side of the fifth lens group G5. The positive lens L51 has an image-side lens surface that is an aspherical surface.

In this Example, the cemented lens consisting of the negative meniscus lens L11 and the positive meniscus lens L12, the negative lens L21, the negative lens L22, and the positive meniscus lens L23 constitute the front group GF disposed closer to the object than the aperture stop S. The positive lens L31, the cemented lens consisting of the positive lens L32 and the negative lens L33, the cemented lens consisting of the negative meniscus lens L34 and the positive meniscus lens L35, the negative meniscus lens L41, the positive lens L42, and the negative lens L51 constitute the rear group GR disposed closer to the image than the aperture stop S.

The following Table 6 lists values of data on the optical system according to Sixth Example.

TABLE 6

[General Data]
Zooming ratio = 2.747

|  | W | M | T |
|---|---|---|---|
| f | 24.720 | 50.011 | 67.898 |
| FNO | 4.074 | 4.107 | 4.075 |
| 2ω | 84.838 | 44.346 | 32.369 |
| Y | 20.735 | 21.600 | 21.600 |
| TL | 122.000 | 132.823 | 150.965 |
| BF | 24.245 | 49.372 | 55.721 |
| fF | −35.120 | −41.087 | −52.774 |
| fR | 32.395 | 33.090 | 34.250 |

[Lens Data]

| Surface Number | R | D | nd | vd | θgF |
|---|---|---|---|---|---|
| 1 | 79.38040 | 2.150 | 1.84666 | 23.80 | 0.6215 |
| 2 | 51.02390 | 8.034 | 1.75500 | 52.33 | 0.5475 |
| 3 | 1073.05060 | D3(Variable) | | | |
| 4 | −787.39720 | 1.800 | 1.65550 | 46.34 | 0.5651 |
| 5* | 15.02170 | 8.908 | | | |
| 6 | −58.26290 | 1.350 | 1.49782 | 82.57 | 0.5138 |
| 7 | 54.06630 | 0.100 | | | |
| 8 | 30.99440 | 4.650 | 1.77396 | 24.31 | 0.6142 |
| 9 | 194.90020 | D9(Variable) | | | |
| 10 | ∞ | 1.500 | | (Aperture Stop S) | |
| 11* | 32.88300 | 3.765 | 1.68348 | 54.80 | 0.5501 |
| 12 | −482.16640 | 0.102 | | | |
| 13 | 20.12780 | 4.081 | 1.59319 | 67.90 | 0.5440 |
| 14 | −99.80710 | 1.500 | 1.76634 | 38.61 | 0.5791 |
| 15 | 25.27260 | 0.342 | | | |
| 16 | 34.24310 | 2.000 | 1.95375 | 32.33 | 0.5916 |
| 17 | 14.97810 | 3.842 | 1.56992 | 38.72 | 0.5789 |
| 18 | 73.96770 | D9(Variable) | | | |
| 19 | −17.50130 | 0.900 | 1.80415 | 28.31 | 0.6015 |
| 20 | −23.09180 | 0.100 | | | |
| 21 | 77.91830 | 6.224 | 1.59201 | 67.02 | 0.5358 |
| 22* | −22.62830 | D22(Variable) | | | |
| 23 | −344.21280 | 0.900 | 1.63563 | 48.44 | 0.5614 |
| 24* | 92.95460 | BF | | | |

[Aspherical Surface Data]

5th Surface

κ = 0.000, A4 = 2.68E−05, A6 = 3.48E−08
A8 = 1.69E−10, A10 = 0.00E+00, A12 = 0.00E+00

11th Surface

κ = 1.000, A4 = −9.83E−07, A6 = −4.69E−09
A8 = 2.28E−10, A10 = −1.34E−12, A12 = 0.00E+00

22nd Surface

κ = 1.000, A4 = 2.57E−05, A6 = −7.85E−09
A8 = 1.82E−10, A10 = −5.72E−13, A12 = 0.00E+00

24th Surface

κ = 1.000, A4 = −2.86E−06, A6 = 3.10E−08
A8 = −9.24E−11, A10 = 2.91E−13, A12 = 0.00E+00

TABLE 6-continued

[Variable Distance Data on Zoom Photographing]

|  | W | M | T |
|---|---|---|---|
| D3 | 2.143 | 14.848 | 31.406 |
| D9 | 24.905 | 6.054 | 3.035 |
| D18 | 8.153 | 5.745 | 6.556 |
| D22 | 10.307 | 4.557 | 2.000 |

[Lens Group Data]

| Group | First surface | Focal length |
|---|---|---|
| G1 | 1 | 121.600 |
| G2 | 4 | −25.300 |
| G3 | 10 | 43.600 |
| G4 | 19 | 40.800 |
| G5 | 23 | −115.100 |

[Conditional Expression Corresponding Value]
<Positive lens L31(fLZ = 45.174)>

Conditional Expression(1)
ndLZ − (2.015 − 0.0068 × vdLZ) = 0.041
Conditional Expression(2)vdLZ = 54.80
Conditional Expression(3), (3−1)θgFLZ = 0.5501
Conditional Expression(4), (4−1)
θgFLZ − (0.6418 − 0.00168 × vdLZ) = 0.0004
Conditional Expression(6)|fLZ|/fR = 1.394
Conditional Expression(7)|fLZ|/f = 1.827
Conditional Expression(8)DLZ = 3.765

Figure 12A:
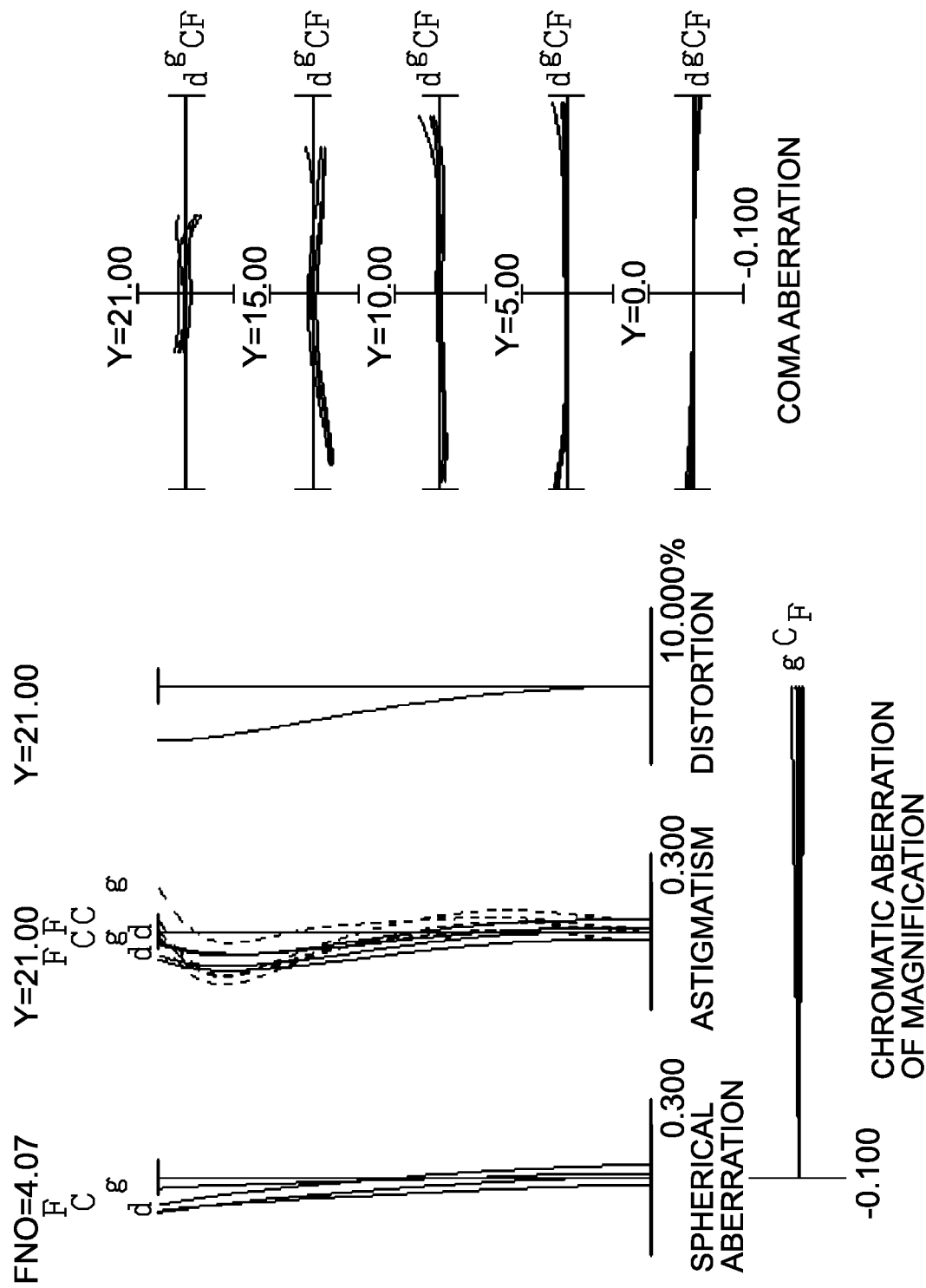

FIG. 12A shows various aberration graphs of the optical system according to Sixth Example upon focusing on infinity in the wide angle end state. FIG. 12B shows various aberration graphs of the optical system according to Sixth Example upon focusing on infinity in the intermediate focal length state. FIG. 12C shows various aberration graphs of the optical system according to Sixth Example upon focusing on infinity in the telephoto end state. The various aberration graphs show that the optical system according to Sixth Example has favorably corrected various aberrations, and exerts excellent imaging performance.

Seventh Example

Figure 13:
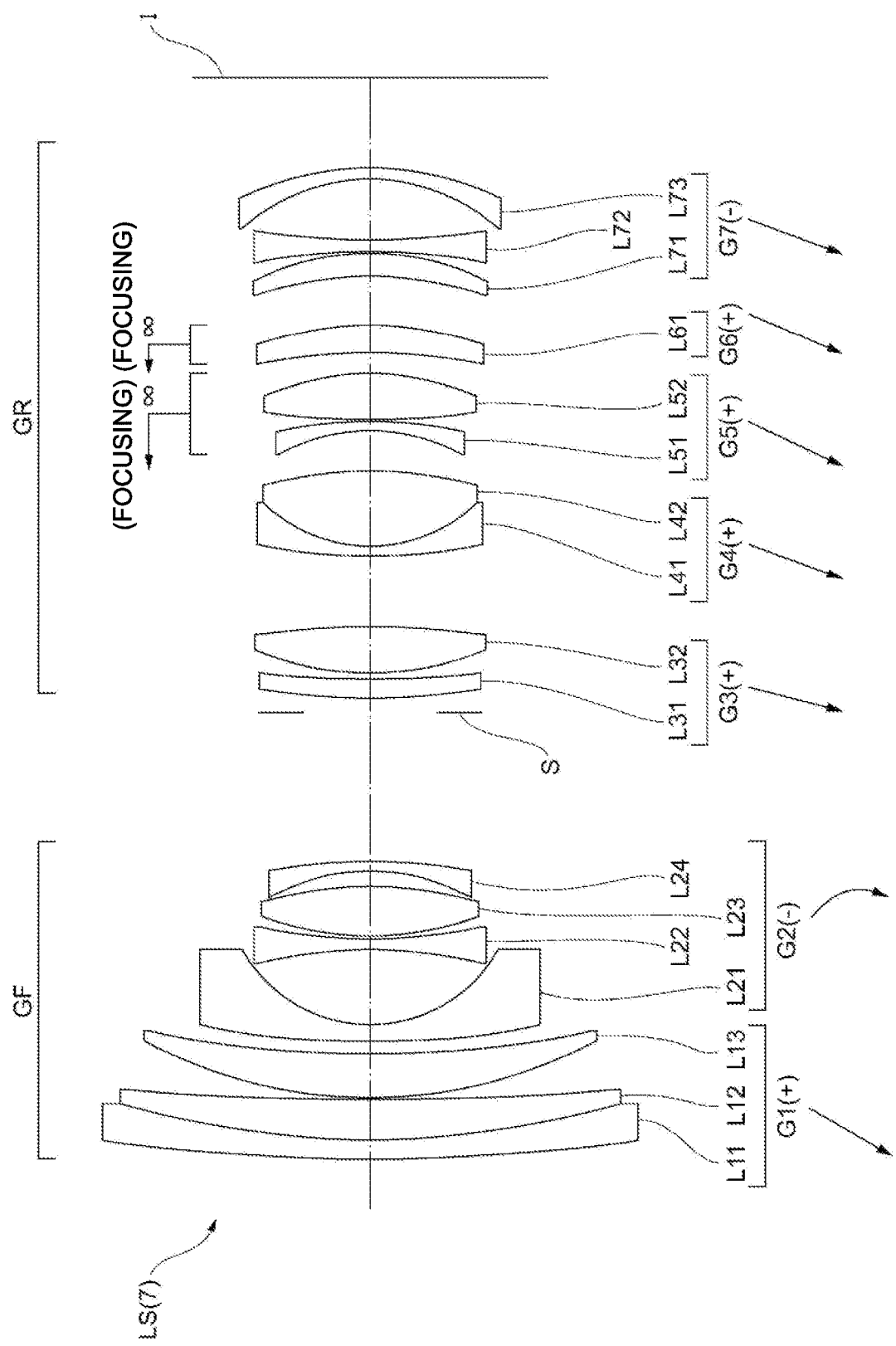
FIG. 13 is a lens configuration diagram of an optical system in a state upon focusing on infinity according to Seventh Example.

Seventh Example is described with reference to FIGS. 13 and 14A, 14B and 14C, and Table 7. FIG. 13 is a diagram showing a lens configuration of an optical system in a state upon focusing on infinity according to Seventh Example of this embodiment. The optical system LS(7) according to Seventh Example consists of, in order from the object: a first lens group G1 having a positive refractive power; a second lens group G2 having a negative refractive power; a third lens group G3 having a positive refractive power; a fourth lens group G4 having a positive refractive power; a fifth lens group G5 having a positive refractive power; a sixth lens group G6 having a positive refractive power; and a seventh lens group G7 having a negative refractive power. Upon zooming from the wide-angle end state (W) to the telephoto end state (T), the first to seventh lens groups G1 to G7 move in directions indicated by arrows in FIG. 13. The aperture stop S is disposed between the second lens group G2 and the third lens group G3.

The first lens group G1 consists of, in order from the object: a cemented lens consisting of a negative meniscus lens L11 having a convex surface facing the object, and a positive meniscus lens L12 having a convex surface facing the object; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. The negative meniscus lens L21 has an object-side lens surface that is an aspherical surface.

The third lens group G3 consists of, in order from the object: a positive meniscus lens L31 having a convex surface facing the object; and a biconvex positive lens L32. The aperture stop S is disposed adjacent to the object side of the positive meniscus lens L31, and moves with the third lens group G3 upon zooming. The positive meniscus lens L31 has an object-side lens surface that is an aspherical surface.

The fourth lens group G4 consists of, in order from the object, a cemented lens consisting of a negative meniscus lens L41 having a convex surface facing the object, and a biconvex positive lens L42.

The fifth lens group G5 consists of, in order from the object: a negative meniscus lens L51 having a concave surface facing the object; and a biconvex positive lens L52. Upon focusing from the infinity object to the short-distant (finite distant) object, the fifth lens group G5 and the sixth lens group G6 move toward the object along the optical axis by different amounts of movement.

The sixth lens group G6 consists of a positive meniscus lens L61 having a concave surface facing the object. The positive meniscus lens L61 has an image-side lens surface that is an aspherical surface.

The seventh lens group G7 consists of, in order from the object: a positive meniscus lens L71 having a concave surface facing the object; a biconcave negative lens L72; and a negative meniscus lens L73 having a concave surface facing the object. An image surface I is disposed on the image side of the seventh lens group G7. In this Example, the negative meniscus lens L73 of the seventh lens group G7 corresponds to a specified lens that satisfies the conditional expressions (1) to (4) and the like. The negative lens L72 has an object-side lens surface that is an aspherical surface.

In this Example, the cemented lens consisting of the negative meniscus lens L11 and the positive meniscus lens L12, the positive meniscus lens L13, the negative meniscus lens L21, the negative lens L22, the positive lens L23, and the negative meniscus lens L24 constitute the front group GF disposed closer to the object than the aperture stop S. The positive meniscus lens L31, the positive lens L32, the cemented lens consisting of the negative meniscus lens L41 and the biconvex positive lens L42, the negative meniscus lens L51, the biconvex positive lens L52, the positive meniscus lens L61, the positive meniscus lens L71, the negative lens L72, and the negative meniscus lens L73 constitute the rear group GR disposed closer to the image than the aperture stop S.

The following Table 7 lists values of data on the optical system according to Seventh Example.

TABLE 7

[General Data]
Zooming ratio = 2.743

|  | W | M | T |
|---|---|---|---|
| f | 24.750 | 35.000 | 67.880 |
| FNO | 2.918 | 2.919 | 2.919 |
| 2ω | 85.363 | 62.867 | 33.986 |
| Y | 21.600 | 21.600 | 21.600 |

TABLE 7-continued

| TL | 139.342 | 144.390 | 169.148 |
|---|---|---|---|
| BF | 11.701 | 15.449 | 28.388 |
| fF | −30.791 | −34.682 | −46.133 |
| fR | 28.627 | 28.934 | 30.359 |

[Lens Data]

| Surface Number | R | D | nd | νd | θgF |
|---|---|---|---|---|---|
| 1 | 234.38730 | 2.500 | 1.84666 | 23.80 | 0.6215 |
| 2 | 109.51800 | 5.200 | 1.75500 | 52.34 | 0.5476 |
| 3 | 389.68520 | 0.200 | | | |
| 4 | 59.06270 | 5.700 | 1.77250 | 49.62 | 0.5518 |
| 5 | 135.36490 | D5(Variable) | | | |
| 6* | 218.44200 | 2.000 | 1.74389 | 49.53 | 0.5533 |
| 7 | 18.69570 | 9.658 | | | |
| 8 | −59.68560 | 1.300 | 1.77250 | 49.62 | 0.5518 |
| 9 | 59.68560 | 0.442 | | | |
| 10 | 39.20990 | 6.400 | 1.72825 | 28.38 | 0.6069 |
| 11 | −48.67310 | 1.933 | | | |
| 12 | −26.40650 | 1.300 | 1.61800 | 63.34 | 0.5411 |
| 13 | −71.76120 | D13(Variable) | | | |
| 14 | ∞ | 1.712 | | (Aperture Stop S) | |
| 15* | 71.88760 | 2.500 | 1.69370 | 53.32 | 0.5475 |
| 16 | 127.64110 | 0.716 | | | |
| 17 | 38.74920 | 5.900 | 1.59319 | 67.90 | 0.5440 |
| 18 | −105.42740 | D18(Variable) | | | |
| 19 | 67.02760 | 1.300 | 1.73800 | 32.33 | 0.5900 |
| 20 | 19.51260 | 9.700 | 1.49782 | 82.57 | 0.5386 |
| 21 | −50.56090 | D21(Variable) | | | |
| 22 | −23.92370 | 1.200 | 1.72047 | 34.71 | 0.5834 |
| 23 | −56.20810 | 0.200 | | | |
| 24 | 103.17490 | 5.900 | 1.59349 | 67.00 | 0.5358 |
| 25 | −33.01970 | D25(Variable) | | | |
| 26 | −70.62880 | 3.500 | 1.79189 | 45.04 | 0.5596 |
| 27* | −38.21530 | D27(Variable) | | | |
| 28 | −44.77940 | 3.000 | 1.94595 | 17.98 | 0.6544 |
| 29 | −32.36650 | 0.200 | | | |
| 30* | −90.76890 | 1.500 | 1.85207 | 40.15 | 0.5685 |
| 31 | 89.91740 | 7.847 | | | |
| 32 | −24.20670 | 1.400 | 1.65240 | 55.27 | 0.5607 |
| 33 | −38.83480 | BF | | | |

[Aspherical Surface Data]

6th Surface

κ = 1.000, A4 = 5.28E−06, A6 = −5.42E−09
A8 = 1.33E−11, A10 = −2.05E−14, A12 = 2.05E−17

15th Surface

κ = 1.000, A4 = −4.56E−06, A6 = −1.40E−10
A8 = −8.81E−13, A10 = −8.43E−15, A12 = 0.00E+00

27th Surface

κ = 1.000, A4 = 1.10E−05, A6 = −2.36E−08
A8 = 1.43E−10, A10 = −5.03E−13, A12 = 7.52E−16

30th Surface

κ = 1.000, A4 = −2.11E−06, A6 = −2.12E−08
A8 = 3.23E−11, A10 = −8.72E−14, A12 = 0.00E+00

[Variable Distance Data on Zoom Photographing]

|  | W | M | T |
|---|---|---|---|
| D5 | 1.780 | 11.383 | 30.246 |
| D13 | 19.285 | 9.934 | 2.013 |
| D18 | 9.167 | 6.537 | 1.493 |
| D21 | 5.179 | 7.338 | 19.018 |
| D25 | 2.679 | 3.818 | 2.616 |
| D27 | 6.344 | 6.725 | 2.168 |

TABLE 7-continued

[Lens Group Data]

| Group | First surface | Focal length |
|---|---|---|
| G1 | 1 | 119.124 |
| G2 | 6 | -22.126 |
| G3 | 15 | 40.880 |
| G4 | 19 | 115.687 |
| G5 | 22 | 124.717 |
| G6 | 26 | 100.365 |
| G7 | 28 | -47.354 |

[Conditional Expression Corresponding Value]
<Negative meniscus lens L73(fLZ = -102.373)>

Conditional Expression(1)
ndLZ − (2.015 − 0.0068 × vdLZ) = 0.013
Conditional Expression(2)vdLZ = 55.27
Conditional Expression(3), (3−1)θgFLZ = 0.5607
Conditional Expression(4), (4-1)
θgFLZ − (0.6418 − 0.00168 × vdLZ) = 0.0118
Conditional Expression(5)|fLZ|/fR = 3.576
Conditional Expression(7)|fLZ|/f = 4.136
Conditional Expression(8)DLZ = 1.400

Figure 14A:
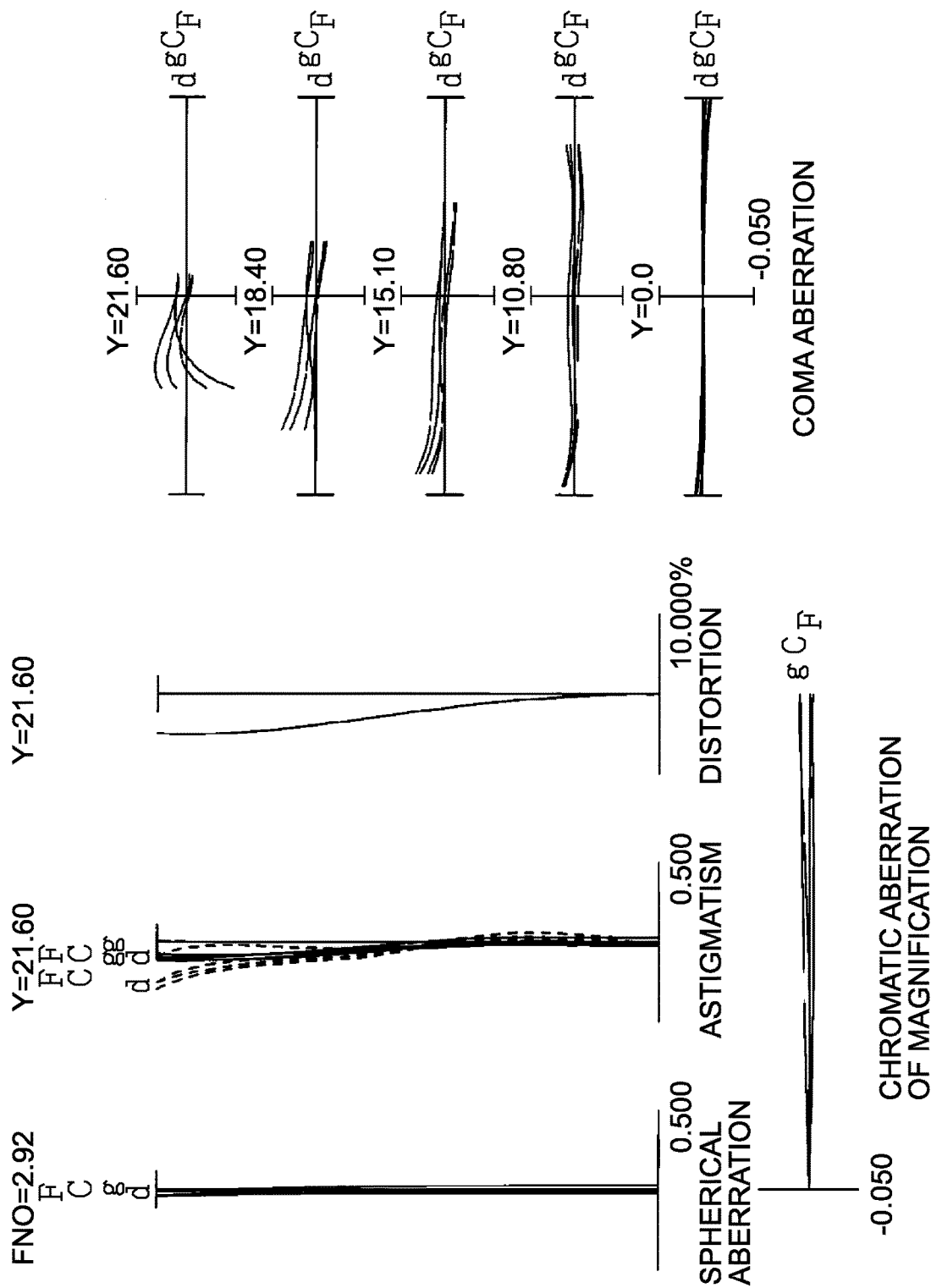

FIG. 14A shows various aberration graphs of the optical system according to Seventh Example upon focusing on infinity in the wide angle end state. FIG. 14B shows various aberration graphs of the optical system according to Seventh Example upon focusing on infinity in the intermediate focal length state. FIG. 14C shows various aberration graphs of the optical system according to Seventh Example upon focusing on infinity in the telephoto end state. The various aberration graphs show that the optical system according to Seventh Example has favorably corrected various aberrations, and exerts excellent imaging performance.

Eighth Example

Eighth Example is described with reference to FIGS. 15 and 16A, 16B and 16C, and Table 8. FIG. 15 is a diagram showing a lens configuration of an optical system in a state upon focusing on infinity according to Eighth Example of this embodiment. The optical system LS(8) according to Eighth Example consists of, in order from the object: a first lens group G1 having a positive refractive power; a second lens group G2 having a negative refractive power; a third lens group G3 having a positive refractive power; a fourth lens group G4 having a negative refractive power; and a fifth lens group G5 having a positive refractive power. Upon zooming from the wide-angle end state (W) to the telephoto end state (T), the first to fifth lens groups G1 to G5 move in directions indicated by arrows in FIG. 15. The aperture stop S is disposed in the third lens group G3.

The first lens group G1 consists of, in order from the object: a cemented lens consisting of a negative meniscus lens L11 having a convex surface facing the object, and a biconvex positive lens L12; and a positive meniscus lens L13 having a convex surface facing the object.

The second lens group G2 consists of, in order from the object: a negative meniscus lens L21 having a convex surface facing the object; a biconcave negative lens L22; a biconvex positive lens L23; and a negative meniscus lens L24 having a concave surface facing the object. Upon focusing from the infinity object to the short-distant (finite distant) object, the second lens group G2 moves toward the object along the optical axis. The negative meniscus lens L21 has an object-side lens surface that is an aspherical surface. The negative meniscus lens L24 has an image-side lens surface that is an aspherical surface.

The third lens group G3 consists of, in order from the object: a biconvex positive lens L31; a cemented lens consisting of a negative meniscus lens L32 having a convex surface facing the object, and a biconvex positive lens L33; and a biconvex positive lens L34. An aperture stop S is disposed between the positive lens L31 and the negative meniscus lens L32 (of the cemented lens) of the third lens group G3.

The fourth lens group G4 consists of, in order from the object: a cemented lens consisting of a positive meniscus lens L41 having a concave surface facing the object, and a negative meniscus lens L42 having a concave surface facing the object; and a biconcave negative lens L43. In this Example, the negative lens L43 of the fourth lens group G4 corresponds to a specified lens that satisfies the conditional expressions (1) to (4) and the like.

The fifth lens group G5 consists of, in order from the object: a biconvex positive lens L51; and a cemented lens consisting of a biconvex positive lens L52, and a biconcave negative lens L53. An image surface I is disposed on the image side of the fifth lens group G5. The positive lens L51 has an object-side lens surface that is an aspherical surface.

In this Example, the cemented lens consisting of the negative meniscus lens L11 and the positive lens L12, the positive meniscus lens L13, the negative meniscus lens L21, the negative lens L22, the positive lens L23, the negative meniscus lens L24, and the positive lens L31 constitute the front group GF disposed closer to the object than the aperture stop S. The cemented lens consisting of the negative meniscus lens L32 and the positive lens L33, the positive lens L34, the cemented lens consisting of the positive meniscus lens L41 and the negative meniscus lens L42, the negative lens L43, the positive lens L51, and the cemented lens consisting of the positive lens L52 and the negative lens L53 constitute the rear group GR disposed closer to the image than the aperture stop S.

The following Table 8 lists values of data on the optical system according to Eighth Example.

TABLE 8

[General Data]
Zooming ratio = 4.708

|  | W | M | T |
|---|---|---|---|
| f | 24.720 | 49.985 | 116.383 |
| FNO | 4.070 | 4.067 | 4.075 |
| 2ω | 86.259 | 43.985 | 19.680 |
| Y | 21.600 | 21.600 | 21.600 |
| TL | 147.198 | 161.190 | 192.200 |
| BF | 32.884 | 42.859 | 55.059 |
| fF | 110.031 | -646.229 | -317.953 |
| fR | 67.056 | 67.484 | 65.974 |

[Lens Data]

| Surface Number | R | D | nd | vd | θgF |
|---|---|---|---|---|---|
| 1 | 200.00000 | 1.200 | 1.84944 | 22.29 | 0.6222 |
| 2 | 112.14330 | 7.349 | 1.49782 | 82.57 | 0.5138 |
| 3 | -312.82020 | 0.100 |  |  |  |
| 4 | 58.25030 | 5.717 | 1.59159 | 54.50 | 0.5508 |
| 5 | 133.86910 | D5(Variable) |  |  |  |
| 6* | 68.14700 | 1.050 | 1.95375 | 32.33 | 0.5916 |
| 7 | 17.41650 | 6.493 |  |  |  |
| 8 | -50.35820 | 1.200 | 1.66903 | 45.08 | 0.5674 |
| 9 | 35.82750 | 0.100 |  |  |  |
| 10 | 36.58470 | 6.379 | 1.84706 | 22.34 | 0.6220 |

TABLE 8-continued

| | | | | | |
|---|---|---|---|---|---|
| 11 | −41.51350 | 0.788 | | | |
| 12 | −27.90490 | 1.200 | 1.61571 | 50.69 | 0.5574 |
| 13* | −1318.72980 | D13(Variable) | | | |
| 14 | 42.13090 | 3.781 | 1.62079 | 50.23 | 0.5583 |
| 15 | −94.85060 | 0.100 | | | |
| 16 | ∞ | 0.100 | | (Aperture Stop S) | |
| 17 | 39.33600 | 1.200 | 1.93546 | 24.49 | 0.6135 |
| 18 | 18.65160 | 5.400 | 1.49996 | 81.44 | 0.5151 |
| 19 | −167.55480 | 0.100 | | | |
| 20 | 47.06670 | 2.967 | 1.59687 | 53.64 | 0.5523 |
| 21 | −353.88140 | D21(Variable) | | | |
| 22 | −35.39840 | 3.883 | 1.92286 | 20.88 | 0.6286 |
| 23 | −18.10590 | 1.200 | 1.68303 | 40.83 | 0.5750 |
| 24 | −151.76460 | 2.275 | | | |
| 25 | −61.36760 | 1.200 | 1.67769 | 52.63 | 0.5546 |
| 26 | 323.52730 | D26(Variable) | | | |
| 27* | 128.28980 | 5.951 | 1.50114 | 80.83 | 0.5161 |
| 28 | −24.91200 | 0.100 | | | |
| 29 | 72.70400 | 7.368 | 1.69764 | 43.43 | 0.5703 |
| 30 | −24.43980 | 4.083 | 1.89451 | 29.27 | 0.5989 |
| 31 | 82.68200 | BF | | | |

[Aspherical Surface Data]

6th Surface

κ = 1.000, A4 = −3.63E−06, A6 = −9.23E−09
A8 = 2.66E−11, A10 = −7.08E−14, A12 = 0.00E+00

13th Surface

κ = 1.000, A4 = −1.30E−05, A6 = −9.67E−09
A8 = −4.06E−11, A10 = 0.00E+00, A12 = 0.00E+00

27th Surface

κ = 1.000, A4 = −1.50E−05, A6 = 9.99E−09
A8 = −2.45E−11, A10 = 3.21E−14, A12 = 0.00E+00

[Variable Distance Data on Zoom Photographing]

| | W | M | T |
|---|---|---|---|
| D5 | 1.500 | 19.687 | 47.442 |
| D13 | 24.608 | 10.433 | 1.500 |
| D21 | 2.869 | 10.044 | 14.916 |
| D26 | 14.054 | 6.884 | 2.000 |

[Lens Group Data]

| Group | First surface | Focal length |
|---|---|---|
| G1 | 1 | 116.400 |
| G2 | 6 | −18.800 |
| G3 | 14 | 27.200 |
| G4 | 22 | −46.400 |
| G5 | 27 | 55.800 |

[Conditional Expression Corresponding Value]
<Negative lens L43(fLZ = −76.021)>

Conditional Expression (1)
ndLZ − (2.015 − 0.0068 × vdLZ) = 0.021
Conditional Expression(2)vdLZ = 52.63
Conditional Expression(3), (3−1)θgFLZ = 0.5546
Conditional Expression(4), (4−1)
θgFLZ − (0.6418 − 0.00168 × vdLZ) = 0.0012
Conditional Expression(6)|fLZ|/fR = 1.134
Conditional Expression(7)|fLZ|/f = 3.075
Conditional Expression(8)DLZ = 1.200

Figure 16A:
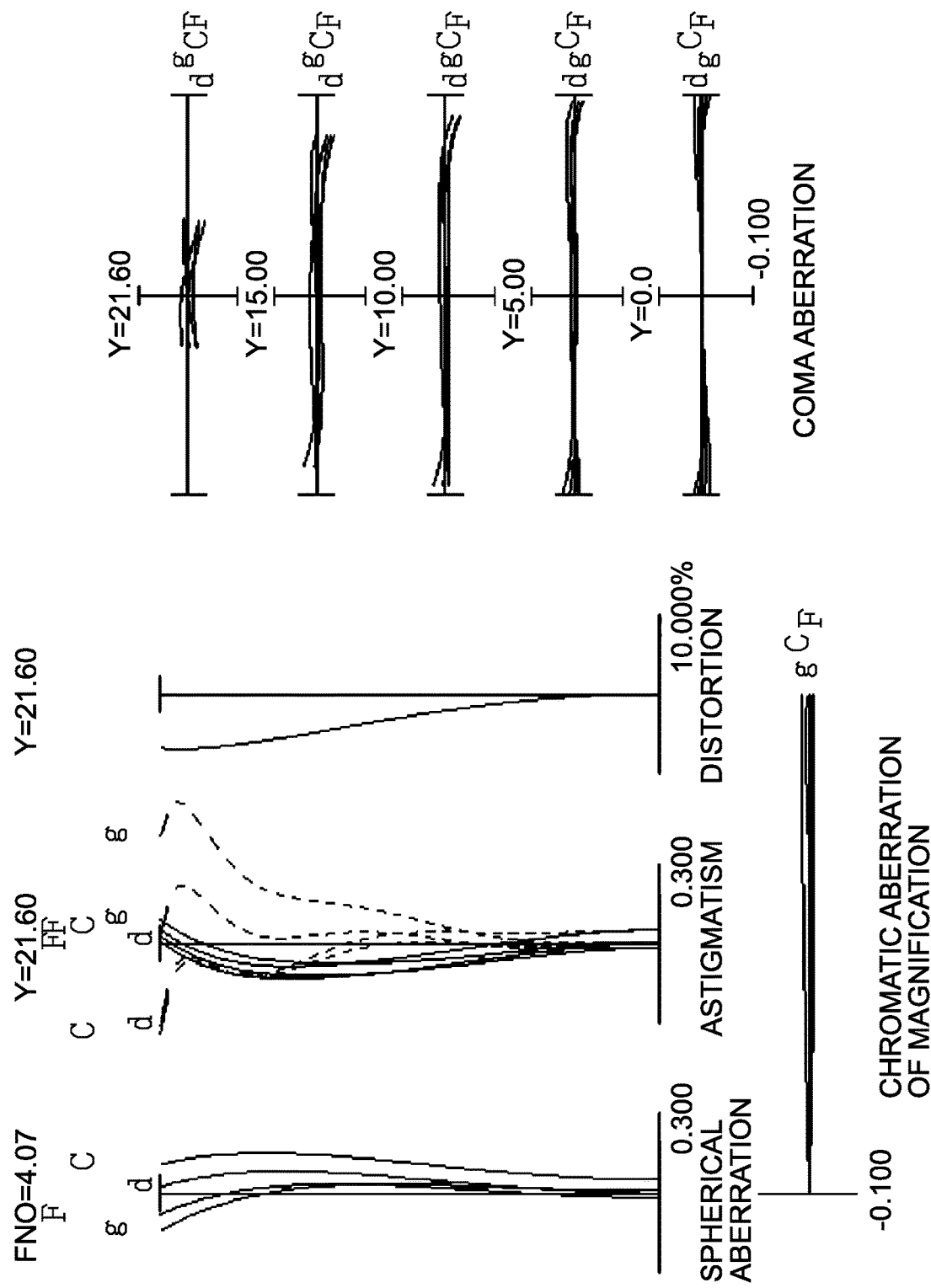
FIGS. 16A, 16B and 16C are graphs respectively showing various aberrations of the optical system according to Eighth Example upon focusing on infinity in the wide-angle end state, the intermediate focal length state and the telephoto end state.
Figure 16B:
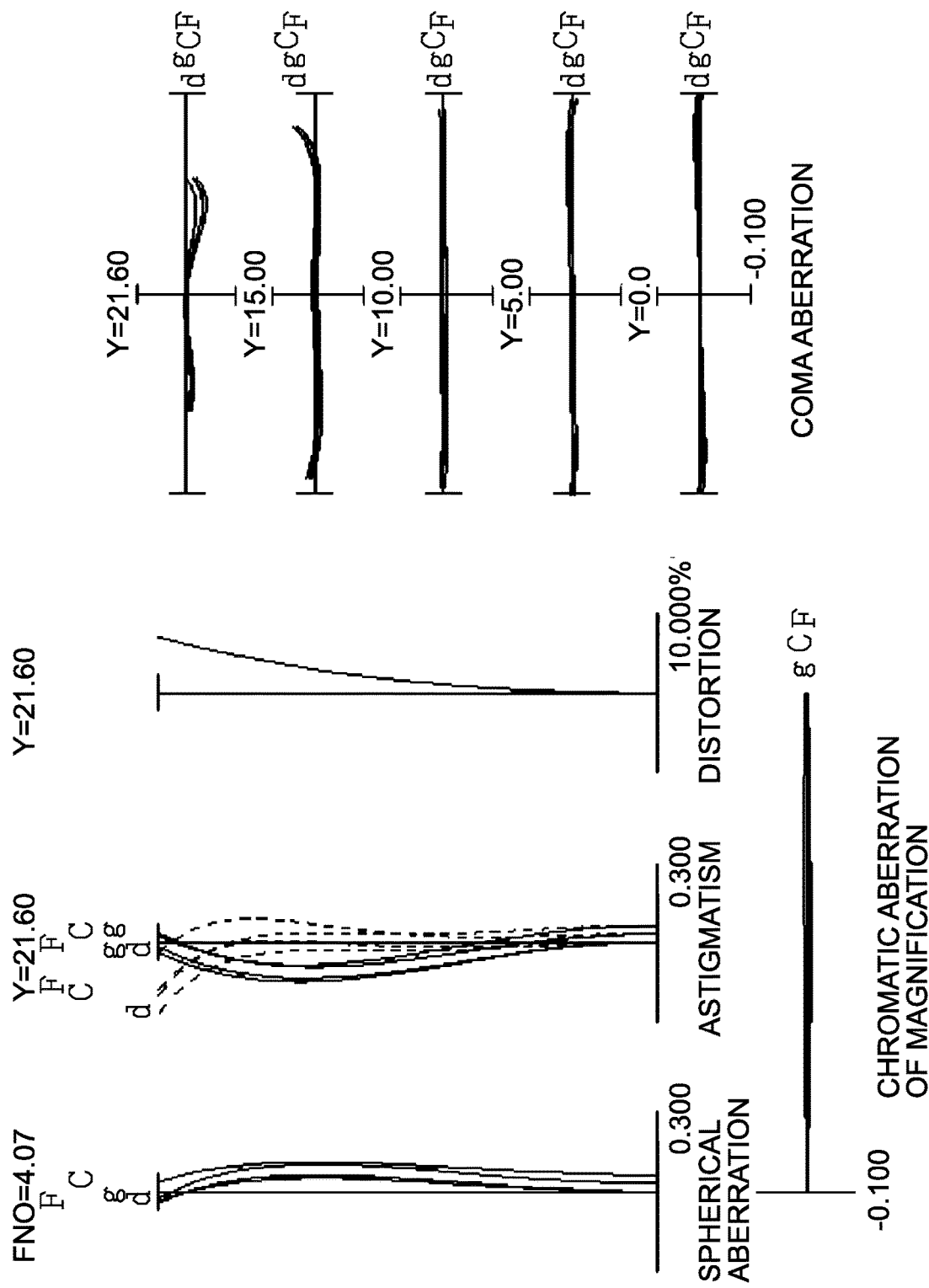
Figure 16C:
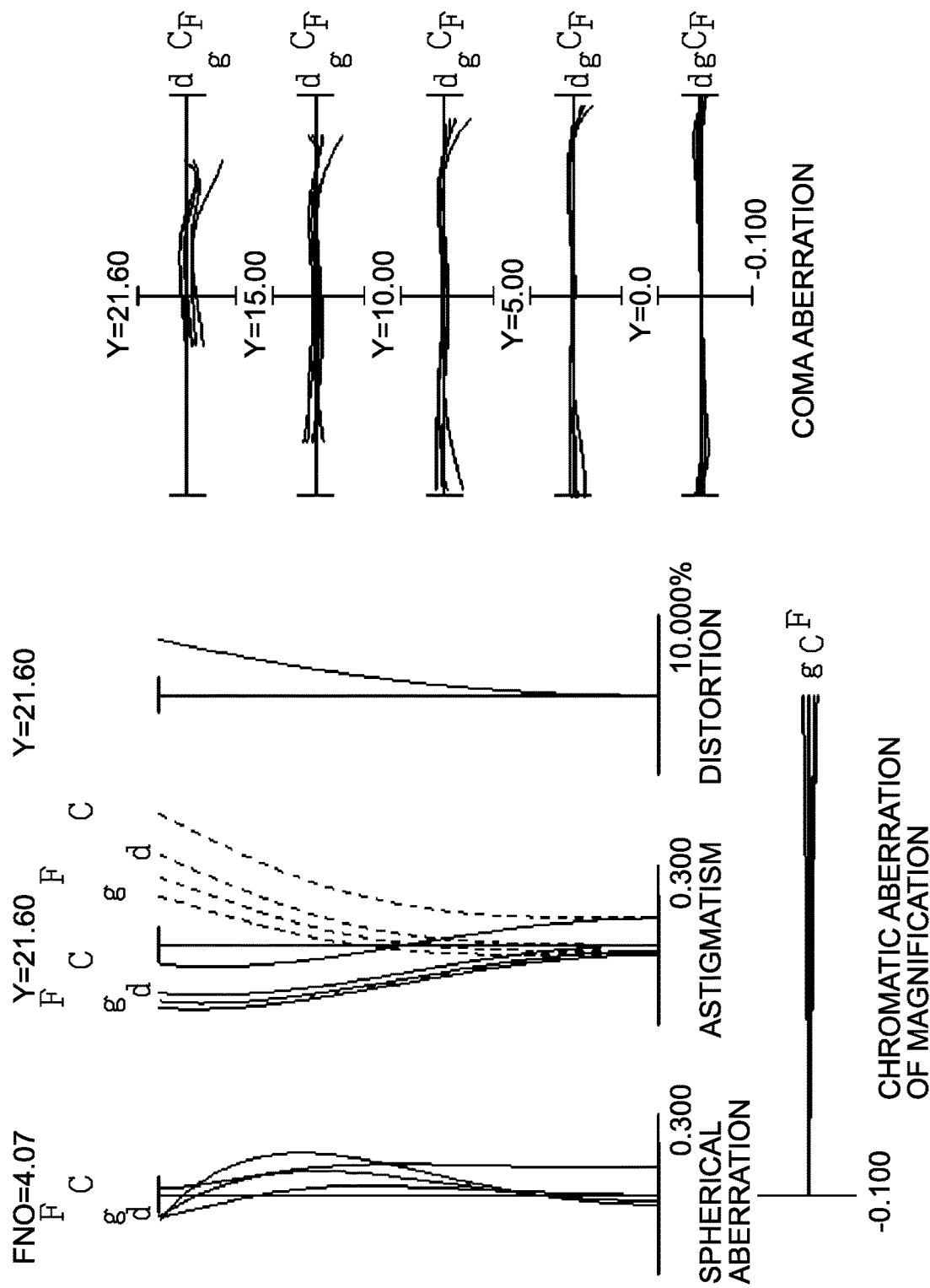

FIG. 16A shows various aberration graphs of the optical system according to Eighth Example upon focusing on infinity in the wide angle end state. FIG. 16B shows various aberration graphs of the optical system according to Eighth Example upon focusing on infinity in the intermediate focal length state. FIG. 16C shows various aberration graphs of the optical system according to Eighth Example upon focusing on infinity in the telephoto end state. The various aberration graphs show that the optical system according to Eighth Example has favorably corrected various aberrations, and exerts excellent imaging performance.

Ninth Example

Figure 17:
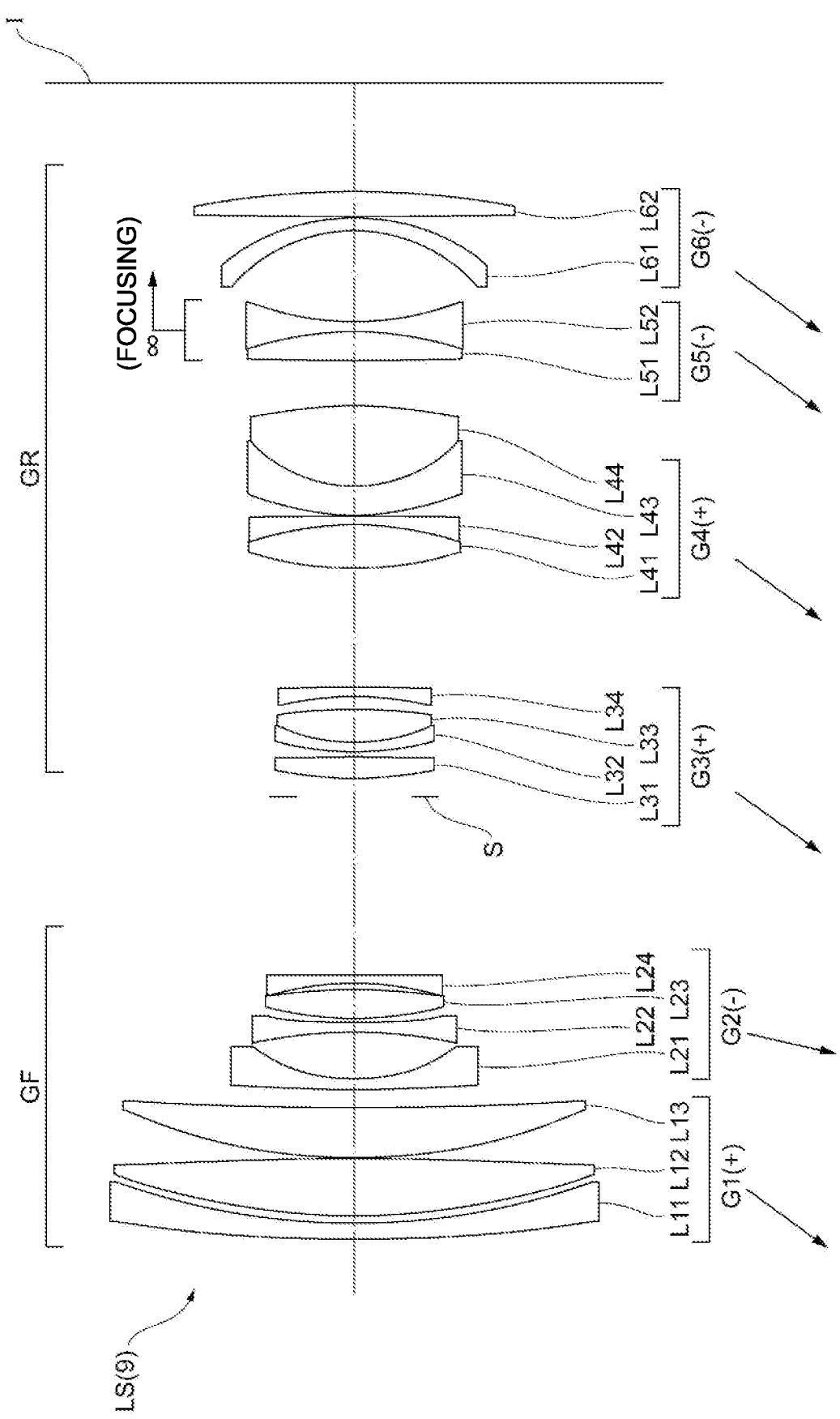
FIG. 17 is a lens configuration diagram of an optical system in a state upon focusing on infinity according to Ninth Example.

Ninth Example is described with reference to FIGS. 17 and 18A, 18B and 18C, and Table 9. FIG. 17 is a diagram showing a lens configuration of an optical system in a state upon focusing on infinity according to Ninth Example of this embodiment. The optical system LS(9) according to Ninth Example consists of, in order from the object: a first lens group G1 having a positive refractive power; a second lens group G2 having a negative refractive power; a third lens group G3 having a positive refractive power; a fourth lens group G4 having a positive refractive power; a fifth lens group G5 having a negative refractive power; and a sixth lens group G6 having a negative refractive power. Upon zooming from the wide-angle end state (W) to the telephoto end state (T), the first to sixth lens groups G1 to G6 move in directions indicated by arrows in FIG. 17. The aperture stop S is disposed between the second lens group G2 and the third lens group G3.

The first lens group G1 consists of, in order from the object: a negative meniscus lens L11 having a convex surface facing the object; a biconvex positive lens L12; and a positive meniscus lens L13 having a convex surface facing the object.

The second lens group G2 consists of, in order from the object: a negative meniscus lens L21 having a convex surface facing the object; biconcave negative lens L22; a biconvex positive lens L23; and a negative meniscus lens L24 having a concave surface facing the object.

The third lens group G3 consists of, in order from the object: a biconvex positive lens L31; a cemented lens consisting of a negative meniscus lens L32 having a convex surface facing the object, and a biconvex positive lens L33; and a negative meniscus lens L34 having a concave surface facing the object. The aperture stop S is disposed adjacent to the object side of the positive lens L31, and moves with the third lens group G3 upon zooming. The cemented lens consisting of the negative meniscus lens L32 and the positive lens L33 of the third lens group G3 constitutes a vibration-proof lens group (partial group) that is movable in a direction perpendicular to the optical axis, and corrects variation in imaging position due to a camera shake and the like (image blur on the image surface I).

The fourth lens group G4 consists of, in order from the object: a cemented lens consisting of a biconvex positive lens L41, and a negative meniscus lens L42 having a concave surface facing the object; and a cemented lens consisting of a negative meniscus lens L43 having a convex surface facing the object, and a biconvex positive lens L44. The positive lens L44 has an image-side lens surface that is an aspherical surface.

The fifth lens group G5 consists of, in order from the object: a cemented lens consisting of a biconvex positive lens L51, and a biconcave negative lens L52. Upon focusing from the infinity object to the short-distant (finite distant) object, the fifth lens group G5 moves toward the image along the optical axis. The negative lens L52 has an image-side lens surface that is an aspherical surface.

The sixth lens group G6 consists of, in order from the object: a negative meniscus lens L61 having a concave surface facing the object; and a biconvex positive lens L62. An image surface I is disposed on the image side of the sixth lens group G6. In this Example, the negative meniscus lens L61 of the sixth lens group G6 corresponds to a specified lens that satisfies the conditional expressions (1) to (4) and the like. The negative meniscus lens L61 has an image-side lens surface that is an aspherical surface.

In this Example, the negative meniscus lens L11, the positive lens L12, the positive meniscus lens L13, the negative meniscus lens L21, the negative lens L22, the positive lens L23, and the negative meniscus lens L24 constitute the front group GF disposed closer to the object than the aperture stop S. The positive lens L31, the cemented lens consisting of the negative meniscus lens L32 and the positive lens L33, the negative meniscus lens L34, the cemented lens consisting of the positive lens L41 and the negative meniscus lens L42, the cemented lens consisting of the negative meniscus lens L43 and the positive lens L44, the cemented lens consisting of the positive lens L51 and the negative lens L52, the negative meniscus lens L61, and the positive lens L62 constitute the rear group GR disposed closer to the image than the aperture stop S.

The following Table 9 lists values of data on the optical system according to Ninth Example.

TABLE 9

[General Data]
Zooming ratio = 7.848

| | W | M | T |
|---|---|---|---|
| f | 24.720 | 50.000 | 194.001 |
| FNO | 4.120 | 5.578 | 7.747 |
| 2ω | 85.978 | 44.803 | 12.176 |
| Y | 21.379 | 21.700 | 21.700 |
| TL | 133.622 | 151.172 | 196.635 |
| BF | 11.869 | 21.707 | 38.749 |
| fF | −22.437 | −28.257 | −22.437 |
| fR | 25.992 | 24.661 | 25.992 |

[Lens Data]

| Surface Number | R | D | nd | vd | θgF |
|---|---|---|---|---|---|
| 1 | 185.39670 | 1.700 | 1.90366 | 31.27 | 0.5948 |
| 2 | 76.46580 | 0.861 | | | |
| 3 | 79.26480 | 6.196 | 1.59319 | 67.90 | 0.5440 |
| 4 | −565.11920 | 0.100 | | | |
| 5 | 63.45420 | 5.498 | 1.59319 | 67.90 | 0.5440 |
| 6 | 434.75200 | D6(Variable) | | | |
| 7 | 203.01440 | 1.100 | 1.90265 | 35.72 | 0.5804 |
| 8 | 19.06950 | 5.142 | | | |
| 9 | −53.01680 | 1.000 | 1.75500 | 52.33 | 0.5475 |
| 10 | 58.98300 | 0.511 | | | |
| 11 | 37.16720 | 3.158 | 1.92286 | 20.88 | 0.6390 |
| 12 | −70.22260 | 0.694 | | | |
| 13 | −33.57890 | 0.903 | 1.81600 | 46.59 | 0.5567 |
| 14 | −1345.01350 | D14(Variable) | | | |
| 15 | ∞ | 2.000 | | (Aperture Stop S) | |
| 16 | 40.44850 | 2.345 | 1.90265 | 35.72 | 0.5804 |
| 17 | −316.98760 | 0.605 | | | |
| 18 | 35.70840 | 1.000 | 2.00100 | 29.12 | 0.5996 |
| 19 | 20.49290 | 3.549 | 1.57957 | 53.74 | 0.5519 |
| 20 | −74.86330 | 1.410 | | | |
| 21 | −37.16210 | 1.047 | 1.95375 | 32.33 | 0.5905 |
| 22 | −418.77410 | D22(Variable) | | | |
| 23 | 37.79500 | 4.737 | 1.83481 | 42.73 | 0.5648 |
| 24 | −37.79500 | 1.004 | 1.90366 | 31.27 | 0.5948 |
| 25 | −353.80920 | 0.100 | | | |
| 26 | 31.05870 | 3.102 | 1.95375 | 32.33 | 0.5905 |
| 27 | 15.35540 | 8.795 | 1.49710 | 81.49 | 0.5377 |
| 28* | −42.90350 | D28(Variable) | | | |
| 29 | 474.24510 | 3.208 | 1.84666 | 23.80 | 0.6215 |
| 30 | −34.68120 | 1.002 | 1.85135 | 40.13 | 0.5685 |
| 31* | 31.38060 | D31(Variable) | | | |
| 32 | −17.69750 | 1.400 | 1.68348 | 54.80 | 0.5501 |

TABLE 9-continued

| 33* | −23.26090 | 0.100 | | | |
|---|---|---|---|---|---|
| 34 | 1014.6406 | 2.7385 | 1.68376 | 37.57 | 0.5782 |
| 35 | −99.7136 | BF | | | |

[Aspherical Surface Data]

28th Surface

κ = 1.000, A4 = 2.96E−05, A6 = −1.43E−07
A8 = 1.92E−09, A10 = −1.38E−11, A12 = 3.3122E−14

31st Surface

κ = 1.000, A4 = −5.38E−06, A6 = 1.47E−07
A8 = −2.09E−09, A10 = 1.45E−11, A12 = −3.5486E−14

33rd Surface

κ = 1.000, A4 = −2.59E−06, A6 = −1.89E−08
A8 = 8.54E−11, A10 = −2.37E−13, A12 = 0.00E+00

[Variable Distance Data on Zoom Photographing]

| | W | M | T |
|---|---|---|---|
| D6 | 1.982 | 18.089 | 56.429 |
| D14 | 19.455 | 11.059 | 1.140 |
| D22 | 13.005 | 6.692 | 1.483 |
| D28 | 4.951 | 4.074 | 1.900 |
| D31 | 9.993 | 17.182 | 24.566 |

[Lens Group Data]

| Group | First surface | Focal length |
|---|---|---|
| G1 | 1 | 103.302 |
| G2 | 7 | −16.985 |
| G3 | 15 | 48.485 |
| G4 | 23 | 29.299 |
| G5 | 29 | −39.415 |
| G6 | 32 | −2329.811 |

[Conditional Expression Corresponding Value]
<Negative meniscus lens L61(fLZ = −120.581)>

Conditional Expression(1)
ndLZ − (2.015 − 0.0068 × vdLZ) = 0.041
Conditional Expression(2)vdLZ = 54.80
Conditional Expression(3), (3−1)gFLZ = 0.5501
Conditional Expression(4), (4-1)
θgFLZ − (0.6418 − 0.00168 × vdLZ) = 0.0004
Conditional Expression(6)|fLZ|/fR = 4.639
Conditional Expression(7)|fLZ|/f = 4.878
Conditional Expression(8)DLZ = 1.400

Figure 18A:
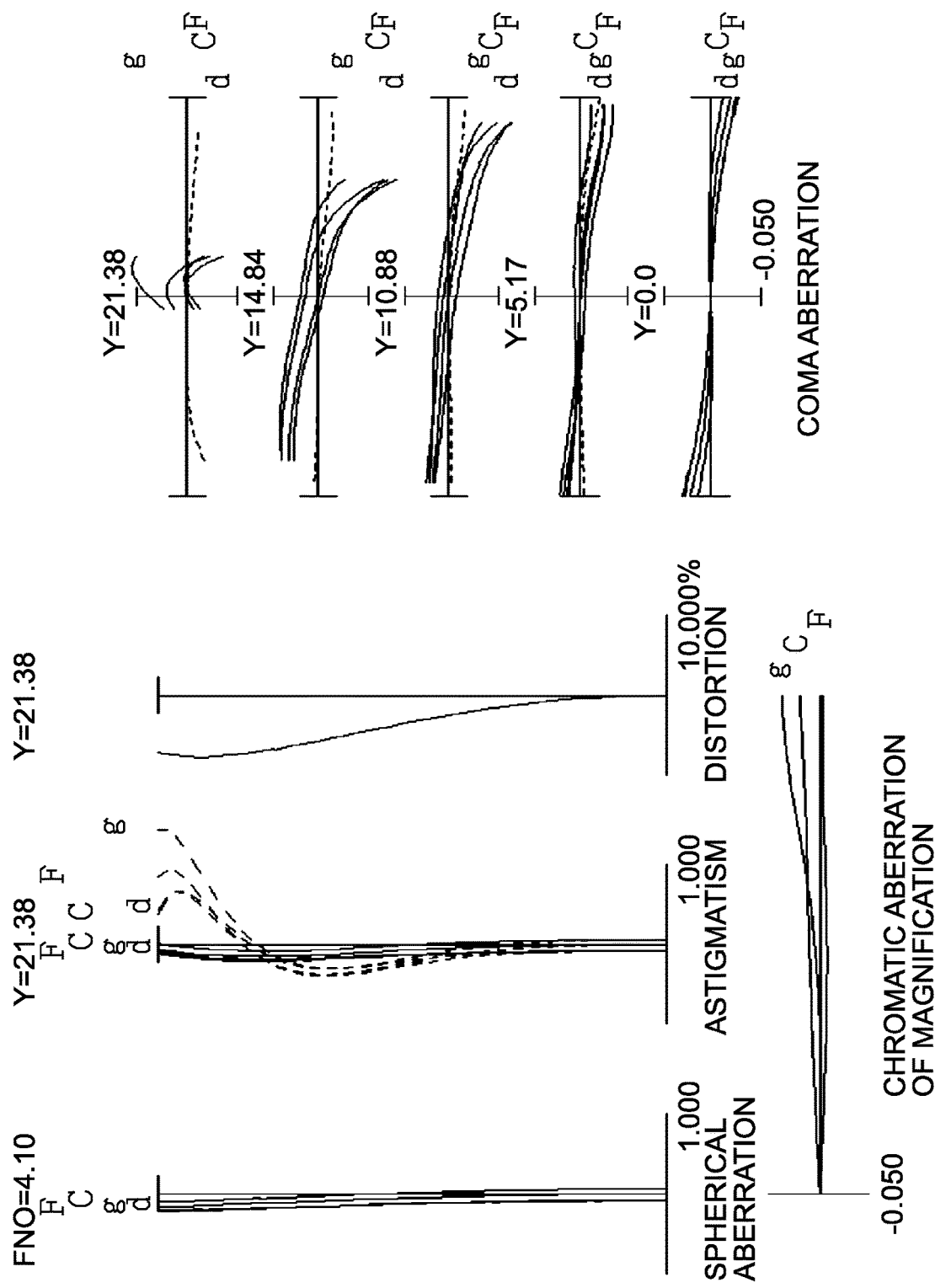
FIGS. 18A, 18B and 18C are graphs respectively showing various aberrations of the optical system according to Ninth Example upon focusing on infinity in the wide-angle end state, the intermediate focal length state and the telephoto end state.
Figure 18B:
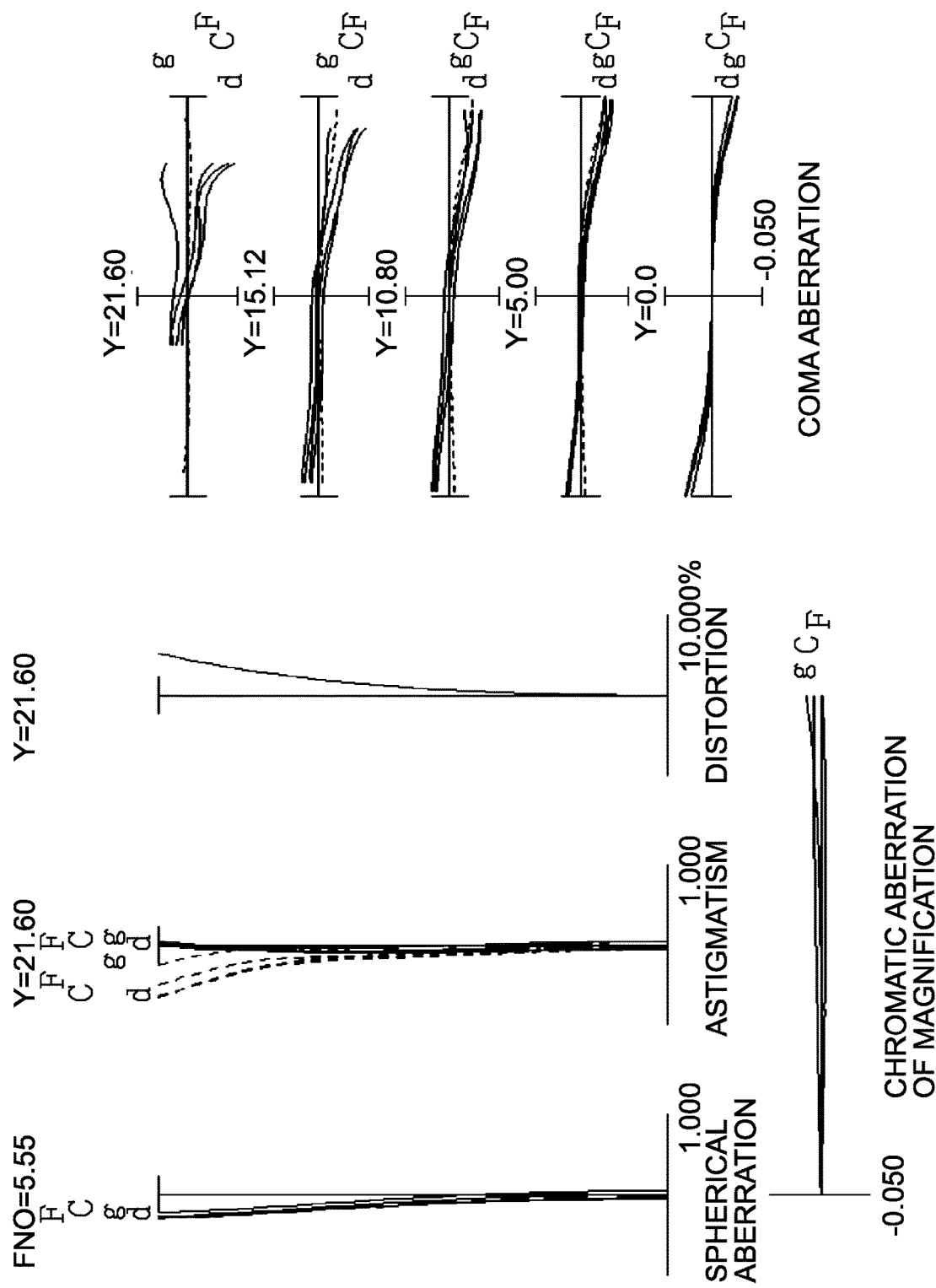
Figure 18C:
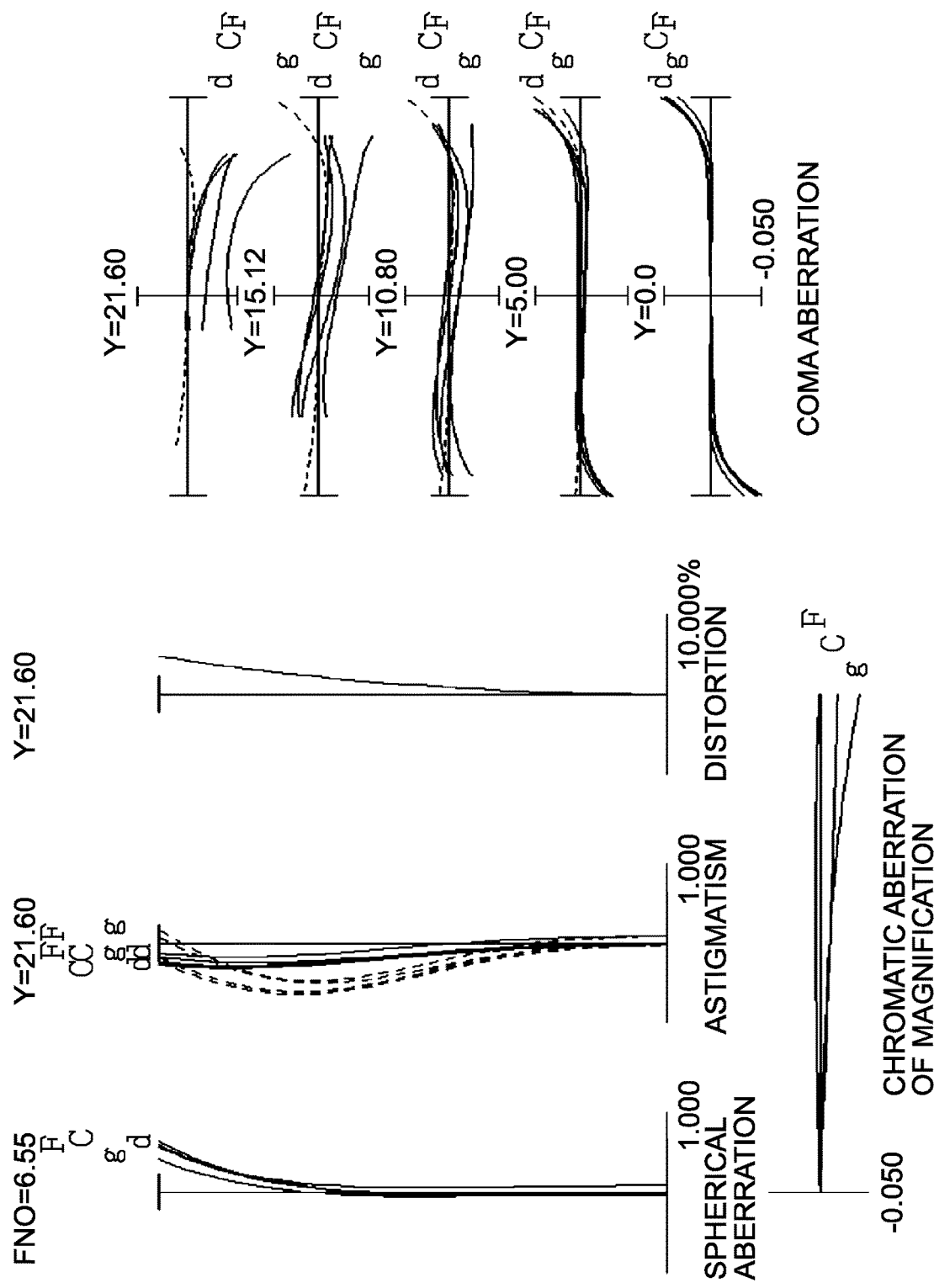

FIG. 18A shows various aberration graphs of the optical system according to Ninth Example upon focusing on infinity in the wide angle end state. FIG. 18B shows various aberration graphs of the optical system according to Ninth Example upon focusing on infinity in the intermediate focal length state. FIG. 18C shows various aberration graphs of the optical system according to Ninth Example upon focusing on infinity in the telephoto end state. The various aberration graphs show that the optical system according to Ninth Example has favorably corrected various aberrations, and exerts excellent imaging performance.

Tenth Example

Figure 19:
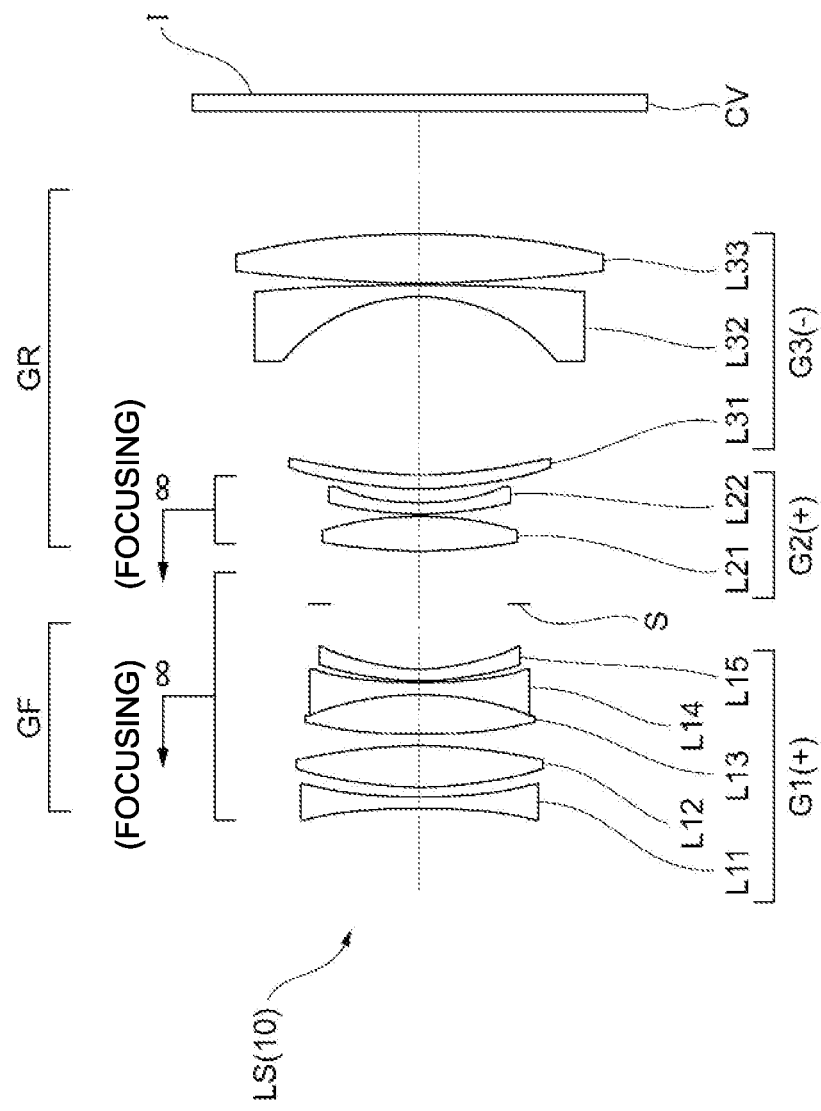
FIG. 19 is a lens configuration diagram of an optical system in a state upon focusing on infinity according to Tenth Example.

Tenth Example is described with reference to FIGS. 19 and 20A, 20B and 20C, and Table 10. FIG. 19 is a diagram showing a lens configuration of an optical system in a state upon focusing on infinity according to Tenth Example of this embodiment. The optical system LS(10) according to Tenth Example consists of, in order from the object: a first lens group G1 having a positive refractive power; a second lens group G2 having a positive refractive power; and a third lens group G3 having a negative refractive power. Upon focusing from the infinity object to the short-distant (finite distant) object, the first lens group G1 and the second lens group G2 move toward the object along the optical axis by different amounts of movement. The aperture stop S is disposed between the first lens group G1 and the second lens group G2.

The first lens group G1 consists of, in order from the object: a biconcave negative lens L11; a biconvex positive lens L12; a cemented lens consisting of a biconvex positive lens L13 and a biconcave negative lens L14; and a negative meniscus lens L15 having a convex surface facing the object. The aperture stop S is disposed adjacent to the image side of the negative meniscus lens L15, and moves with the first lens group G1 upon focusing. The negative lens L11 has an image-side lens surface that is an aspherical surface.

The second lens group G2 consists of, in order from the object: a biconvex positive lens L21; and a negative meniscus lens L22 having a convex surface facing the object.

The third lens group G3 consists of, in order from the object: a positive meniscus lens L31 having a convex surface facing the object; a negative meniscus lens L32 having a concave surface facing the object; and a biconvex positive lens L33. An image surface I is disposed on the image side of the third lens group G3. In this Example, the negative meniscus lens L32 of the third lens group G3 corresponds to a specified lens that satisfies the conditional expressions (1) to (4) and the like. The positive meniscus lens L31 has an image-side lens surface that is an aspherical surface. A cover glass CV is disposed between the third lens group G3 and the image surface I.

In this Example, the negative lens L11, the positive lens L12, the cemented lens consisting of the positive lens L13 and the negative lens L14, and the negative lens L15 constitute the front group GF disposed closer to the object than the aperture stop S. The positive lens L21, the negative meniscus lens L22, the positive meniscus lens L31, the negative meniscus lens L32, and the positive lens L33 constitute the rear group GR disposed closer to the image than the aperture stop S.

The following Table 10 lists values of data on the optical system according to Tenth Example.

TABLE 10

[General Data]

| | |
|---|---|
| f | 58.203 |
| FNO | 2.825 |
| 2ω | 40.539 |
| Y | 21.700 |
| TL | 71.506 |
| BF | 0.100 |
| fF | 193.264 |
| fR | 41.152 |

[Lens Data]

| Surface Number | R | D | nd | vd | θgF |
|---|---|---|---|---|---|
| 1 | −63.99090 | 1.200 | 1.73077 | 40.51 | 0.5727 |
| 2* | 71.71180 | 1.000 | | | |
| 3 | 42.93270 | 4.064 | 1.95375 | 32.33 | 0.5905 |
| 4 | −51.23440 | 1.082 | | | |
| 5 | 49.88300 | 4.042 | 1.59319 | 67.90 | 0.5440 |
| 6 | −30.98750 | 1.200 | 1.73800 | 32.26 | 0.5899 |
| 7 | 45.45620 | 0.200 | | | |

TABLE 10-continued

| | | | | |
|---|---|---|---|---|
| 8 | 31.62520 | 1.200 | 1.80518 | 25.45 | 0.6157 |
| 9 | 22.75910 | 6.464 | | | |
| 10 | ∞ | D10(Variable) | | (Aperture Stop S) | |
| 11 | 54.06210 | 3.455 | 1.59349 | 67.00 | 0.5358 |
| 12 | −32.76480 | 0.200 | | | |
| 13 | 31.23990 | 1.200 | 1.67300 | 38.15 | 0.5754 |
| 14 | 22.30120 | D14(Variable) | | | |
| 15 | 43.39570 | 1.373 | 1.51680 | 64.13 | 0.5357 |
| 16* | 43.24690 | 17.859 | | | |
| 17 | −17.25440 | 1.200 | 1.68348 | 54.80 | 0.5501 |
| 18 | −176.84520 | 0.200 | | | |
| 19 | 159.39470 | 4.819 | 1.95375 | 32.33 | 0.5905 |
| 20 | 83.44720 | 12.310 | | | |
| 21 | ∞ | 1.600 | 1.51680 | 64.13 | 0.5357 |
| 22 | ∞ | BF | | | |

[Aspherical Surface Data]

2nd Surface

κ = 1.000, A4 = 1.39250E−05, A6 = 3.07014E−09
A8 = −6.46165E−12, A10 = 0.00000E+00, A12 = 0.00000E+00

16th Surface

κ = 1.000, A4 = −1.14801E−05, A6 = −6.50435E−09
A8 = −1.06124E−10, A10 = 0.00000E+00, A12 = 0.00000E+00

[Variable Distance Data on Short-Distance Photographing]

| | Upon focusing on infinity f = 58.203 | Upon focusing on an intermediate distance object β = −0.500 | Upon focusing on a short-distance object β = −1.000 |
|---|---|---|---|
| D10 | 5.331 | 5.445 | 5.684 |
| D14 | 1.412 | 18.266 | 35.060 |

[Lens Group Data]

| Group | First surface | Focal length |
|---|---|---|
| G1 | 1 | 193.264 |
| G2 | 11 | 46.831 |
| G3 | 15 | −60.650 |

[Conditional Expression Corresponding Value]
<Negative meniscus lens L32(fLZ = −28.060)>

Conditional Expression(1)
ndLZ − (2.015 − 0.0068 × vdLZ) = 0.041
Conditional Expression(2)vdLZ = 54.80
Conditional Expression(3), (3-1)θgFLZ = 0.5501
Conditional Expression(4), (4-1)
θgFLZ − (0.6418 − 0.00168 × vdLZ) = 0.0004
Conditional Expression(6)|fLZ|/fR = 0.682
Conditional Expression(7)|fLZ|/f = 0.482
Conditional Expression(8)DLZ = 1.200

Figure 20A:
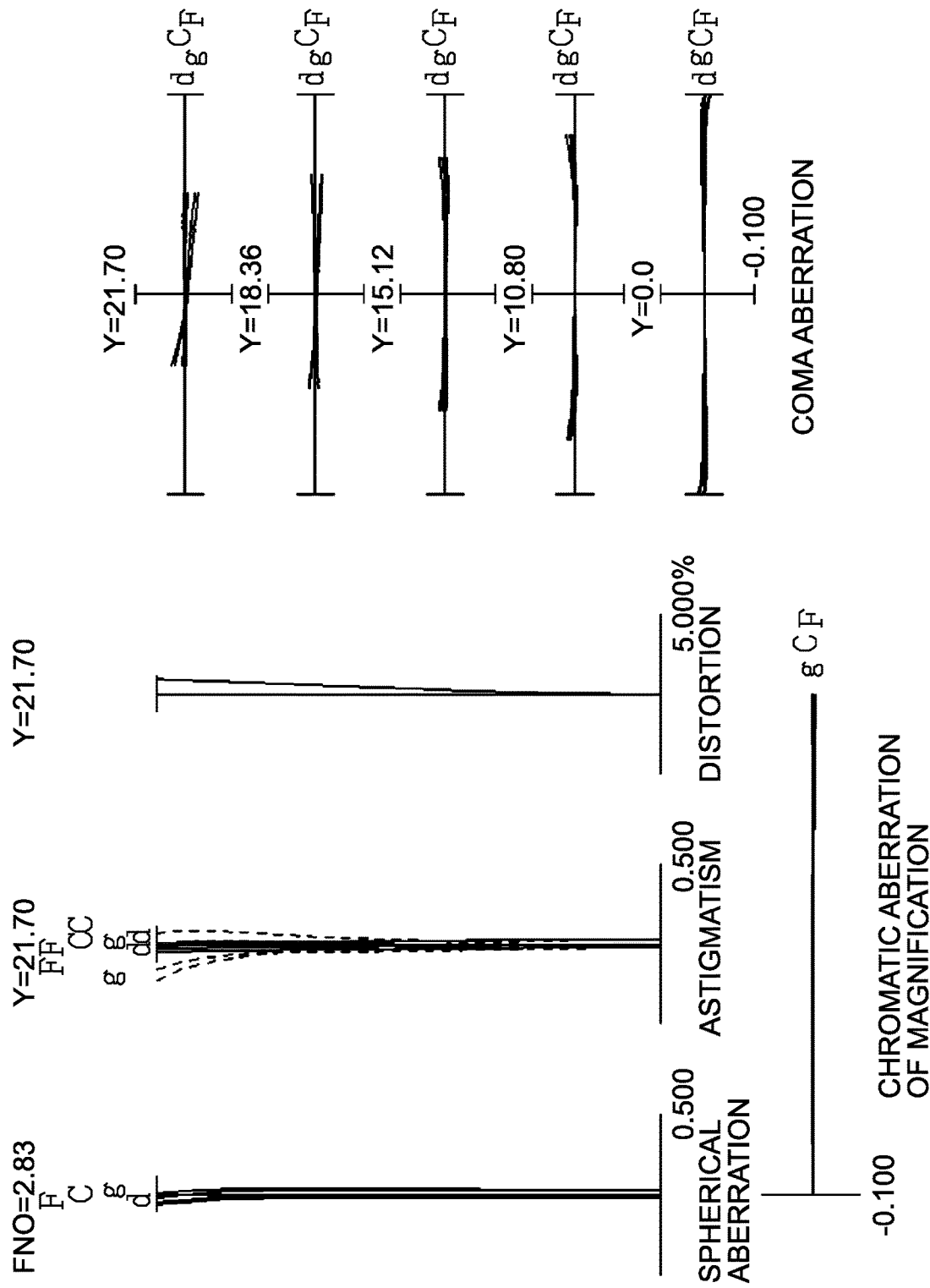
FIGS. 20A, 20B and 20C are graphs respectively showing various aberrations of the optical system according to Tenth Example upon focusing on infinity, upon focusing on an intermediate distant object and upon focusing on a short distant object.
Figure 20B:
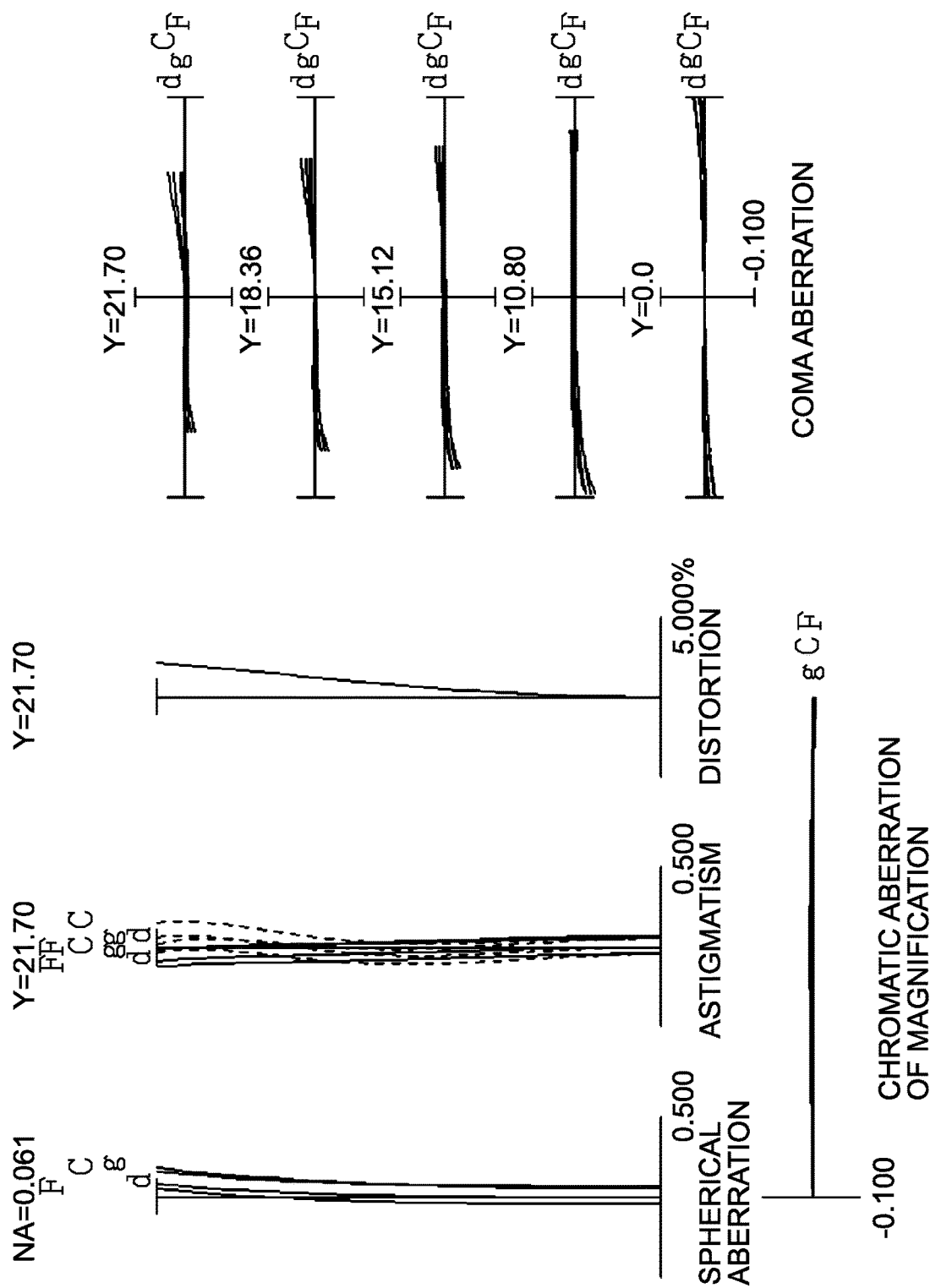
Figure 20C:
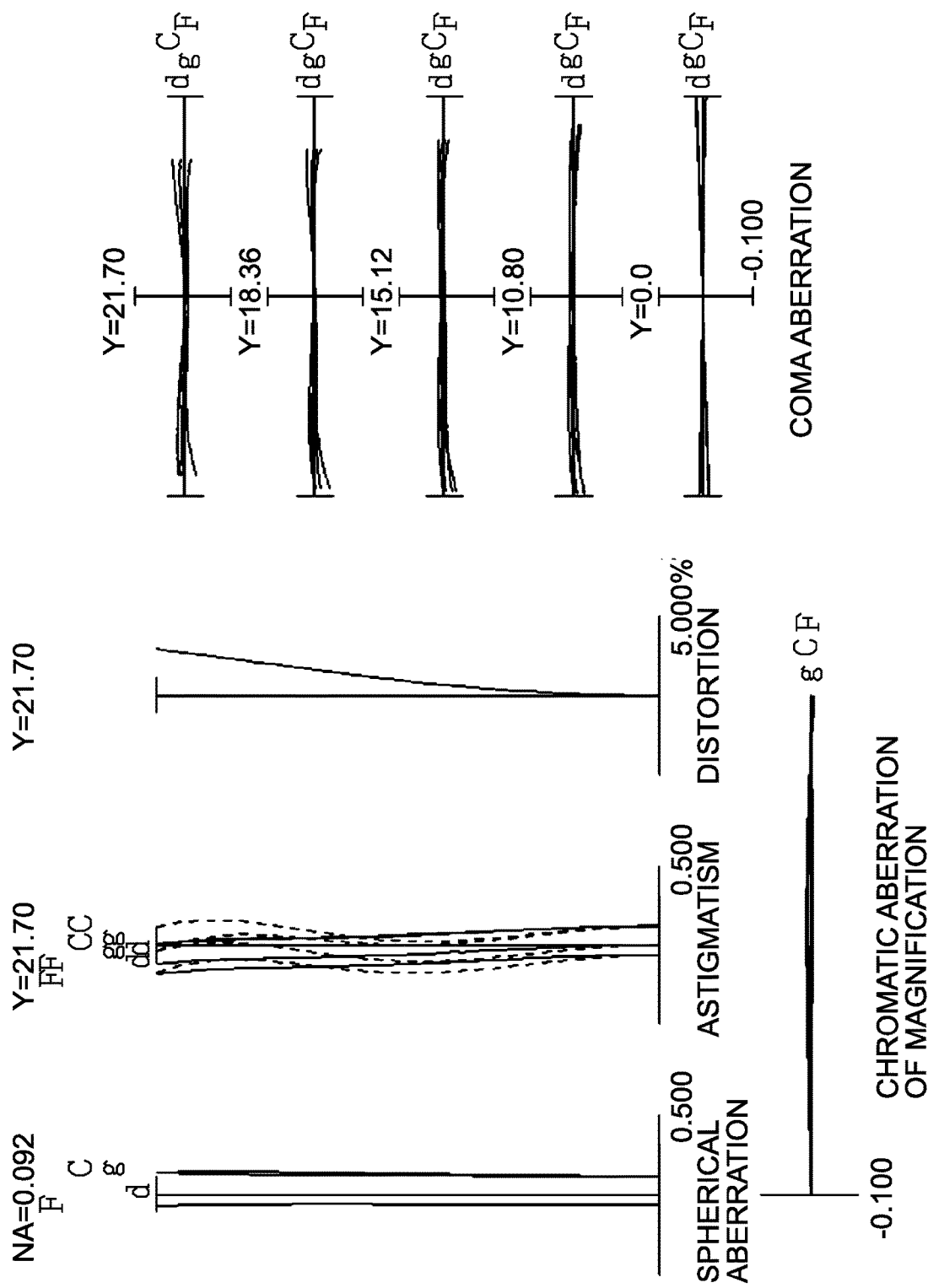

FIG. 20A shows various aberration graphs of the optical system according to Tenth Example upon focusing on infinity. FIG. 20B shows various aberration graphs of the optical system according to Tenth Example upon focusing on an intermediate distant object. FIG. 20C shows various aberration graphs of the optical system according to Tenth Example upon focusing on a short-distant (very short distance) object. The various aberration graphs show that the optical system according to Tenth Example has favorably corrected various aberrations, and exerts excellent imaging performance.

According to each Example, the optical system where for correction of chromatic aberrations, in addition to primary achromatization, the secondary spectrum is favorably corrected can be achieved.

Here, Examples described above show specific examples of the invention of the present application. The invention of the present application is not limited to these Examples.

Note that the following content can be adopted in a range without impairing the optical performance of the optical system of this embodiment.

The focusing lens group is assumed to indicate a portion that includes at least one lens separated by air distances changing upon focusing. That is, a focusing lens group may be adopted that moves a single or multiple lens groups, or a partial lens group in the optical axis direction to achieve focusing from the infinity object to the short-distant object. The focusing lens group is also applicable to autofocusing, and is suitable also for motor drive for autofocusing (using an ultrasonic motor).

In Eighth to Eleventh Examples, the configurations having the vibration-proof function are described. However, the present application is not limited thereto, and may adopt a configuration having no vibration-proof function. The other Examples having no vibration-proof function may have a configuration having the vibration-proof function.

The lens surface may be made of a spherical surface or a planar surface, or an aspherical surface. A case where the lens surface is a spherical surface or a planar surface is preferable because lens processing, and assembling and adjustment are facilitated, and the optical performance degradation due to errors caused by processing and assembling and adjustment can be prevented. Furthermore, it is preferable because the degradation in representation performance even with the image surface being misaligned is small.

In a case where the lens surface is an aspherical surface, the aspherical surface may be any of an aspherical surface made by a grinding process, a glass mold aspherical surface made by forming glass into an aspherical shape with a mold, and a composite type aspherical surface made by forming a resin on a surface of glass into an aspherical shape. The lens surface may be a diffractive surface. The lens may be a gradient-index lens (GRIN lens), or a plastic lens.

An antireflection film having a high transmissivity in a wide wavelength region may be applied onto each lens surface in order to reduce flares and ghosts and achieve optical performances having a high contrast. Accordingly, flares and ghosts can be reduced, and high optical performances having a high contrast can be achieved.

EXPLANATION OF NUMERALS AND CHARACTERS

| | |
|---|---|
| G1 First lens group | G2 Second lens group |
| G3 Third lens group | G4 Fourth lens group |
| G5 Fifth lens group | |
| I Image surface | S Aperture stop |

The invention claimed is:

1. An optical system comprising:
an aperture stop; and
a lens provided closer to an object than the aperture stop, the lens satisfying the following conditional expressions:

$$50.00 < vdLZ < 65.00,$$

$$0.545 < \theta gFLZ \le 0.5583,$$

$$-0.010 < \theta gFLZ - (0.6418 - 0.00168 \times vdLZ)$$

where
vdLZ: a refractive index of the lens for d-line,
vdLZ: an Abbe number of the lens with reference to d-line, and
θgFLZ: a partial dispersion ratio of the lens, defined by a following expression when a refractive index of the lens for g-line is ngLZ, a refractive index of the lens for F-line is nFLZ, and a refractive index of the lens for C-line is nCLZ:

$$\theta gFLZ = (ngLZ - nFLZ)/(nFLZ - nCLZ).$$

2. The optical system according to claim 1, consisting of:
the aperture stop; a front lens group disposed closer to an object than the aperture stop; and a rear lens group disposed closer to an image than the aperture stop,
wherein the front lens group includes the lens and satisfies the following conditional expression:

$$-10.00 < fLZ/fF < 10.00$$

where fLZ: a focal length of the lens, and
fF: a focal length of the front lens group; in a case where the optical system is a zoom optical system, the focal length of the front lens group in the wide angle end state.

3. The optical system according to claim 1,
wherein the lens satisfies the following conditional expression:

$$0.10 < |fLZ|/f < 15.00$$

where fLZ: a focal length of the lens, and
f: a focal length of the optical system; in a case where the optical system is a zoom optical system, the focal length of the optical system in a wide angle end state.

4. The optical system according to claim 1,
wherein the lens satisfies the following conditional expression:

$$0.555 < \theta gFLZ \le 0.5583.$$

5. The optical system according to claim 1,
wherein the lens satisfies the following conditional expression:

$$0.010 < \theta gFLZ - (0.6418 - 0.00168 \times vdLZ).$$

6. The optical system according to claim 1,
wherein the lens satisfies the following conditional expression:

$$DLZ > 0.400 \text{ [mm]}$$

where DLZ: a thickness of the lens on an optical axis.

7. The optical system according to claim 1, wherein the lens is a single lens, or one lens of two lenses of a cemented lens consisting of the two lenses cemented to each other.

8. The optical system according to claim 1, wherein at least one lens surface of an object-side lens surface and an image-side lens surface of the lens is in contact with air.

9. The optical system according to claim 1, wherein the lens is a glass lens.

10. An optical apparatus comprising the optical system according to claim 1.

11. The optical system according to claim 1, wherein the lens is a positive lens included in a lens group having positive refractive power, the lens group being provided closer to the object than the aperture stop.

12. The optical system according to claim 1, wherein the lens is a negative lens included in a lens group having negative refractive power, the lens group being provided closer to the object than the aperture stop.

13. The optical system according to claim 1, further comprising a first lens group having a positive refractive power provided closest to the object, a second lens group, and a third lens group, the first, second and third lens groups being provided closer to the object than the aperture stop, wherein the lens is one of a positive lens included in the first lens group, a negative lens included in the second lens group, or a positive lens included in the third lens group.

14. The optical system according to claim 1, further comprising a first lens group having a negative refractive power, the first lens group being provided closest to the object, wherein the lens is a negative lens included in the first lens group.

15. A method for manufacturing an optical system, the method comprising:

a step of arranging an aperture stop and at least one lens in a lens barrel so that the lens is provided closer to an object than the aperture stop, the lens satisfying the following conditional expressions:

$$50.00 < vdLZ < 65.00,$$

$$0.545 < \theta gFLZ \leq 0.5583,$$

$$-0.010 < \theta gFLZ - (0.6418 - 0.00168 \times vdLZ)$$

where
vdLZ: a refractive index of the lens for d-line,
vdLZ: an Abbe number of the lens with reference to d-line, and
θgFLZ: a partial dispersion ratio of the lens, defined by a following expression when a refractive index of the lens for g-line is ngLZ, a refractive index of the lens for F-line is nFLZ, and a refractive index of the lens for C-line is nCLZ:

$$\theta gFLZ = (ngLZ - nFLZ)/(nFLZ - nCLZ).$$

* * * * *